United States Patent
Woo et al.

(10) Patent No.: US 11,962,367 B2
(45) Date of Patent: Apr. 16, 2024

(54) ANTENNA FOR TRANSFER OF INFORMATION OR ENERGY

(71) Applicant: 3M INNOVATIVE PROPERTIES COMPANY, St. Paul, MN (US)

(72) Inventors: Seong-Woo Woo, Gwangju-si (KR); Jinwook Kim, Hwaseong-si (KR); Jung Ju Suh, Seocho-gu (KR); Jennifer J. Sokol, Mahtomedi, MN (US); Charles L Bruzzone, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 99 days.

(21) Appl. No.: 17/800,384

(22) PCT Filed: Feb. 24, 2021

(86) PCT No.: PCT/IB2021/051556
§ 371 (c)(1),
(2) Date: Aug. 17, 2022

(87) PCT Pub. No.: WO2021/171204
PCT Pub. Date: Sep. 2, 2021

(65) Prior Publication Data
US 2023/0077474 A1    Mar. 16, 2023

Related U.S. Application Data

(60) Provisional application No. 62/982,774, filed on Feb. 28, 2020.

(51) Int. Cl.
*H04B 5/79*    (2024.01)
*H01F 5/00*    (2006.01)
(Continued)

(52) U.S. Cl.
CPC ............... *H04B 5/79* (2024.01); *H01F 5/003* (2013.01); *H01F 27/2804* (2013.01);
(Continued)

(58) Field of Classification Search
CPC .. H04B 5/79; H04B 5/26; H01F 5/003; H01F 27/2804; H01F 38/14; H02J 50/10
(Continued)

(56) References Cited

U.S. PATENT DOCUMENTS 7,643,298 B2    1/2010   Kendall
9,490,656 B2    11/2016  Kurz et al.
(Continued)

FOREIGN PATENT DOCUMENTS

DE    102007045946 A1    4/2009
EP        2056309 A1    5/2009
(Continued)

OTHER PUBLICATIONS

International Search Report for PCT International Application No. PCT/IB2021/051556, dated May 18, 2021, 3 pages.

*Primary Examiner* — Alfonso Perez Borroto
(74) *Attorney, Agent, or Firm* — Robert S. Moshrefzadeh

(57)    ABSTRACT

An antenna for transfer of information or energy is described. The antenna includes an electrically conductive first layer having a width in a thickness direction of the antenna and extending longitudinally along a length of the first layer between first and second longitudinal ends of the first layer, and an electrically insulative thermally conductive second layer bonded to the first layer along the length of the first layer. The first and second layers are wound to form a plurality of substantially concentric loops. A width and a length of the second layer are substantially co-extensive with the respective width and length of the first layer so as to expose opposing longitudinal edge surfaces of (Continued)

the first layer along the length of the first layer. Coils and assemblies useful for making coils are also described.

11 Claims, 46 Drawing Sheets

(51) Int. Cl.
    *H01F 27/28*     (2006.01)
    *H01F 38/14*     (2006.01)
    *H04B 5/26*     (2024.01)
    *H02J 50/10*     (2016.01)

(52) U.S. Cl.
    CPC .............. *H01F 38/14* (2013.01); *H04B 5/26* (2024.01); *H02J 50/10* (2016.02)

(58) Field of Classification Search
    USPC ........................................................ 307/104
    See application file for complete search history.

(56) References Cited

U.S. PATENT DOCUMENTS

| | | | |
|---|---|---|---|
| 9,853,483 B2 | 12/2017 | Kurz et al. | |
| 9,859,052 B2 * | 1/2018 | Kurz | ................. H01F 27/366 |
| 10,374,464 B2 | 8/2019 | Kurz et al. | |
| 10,886,047 B2 | 1/2021 | Kurz et al. | |
| 2015/0145635 A1 * | 5/2015 | Kurz | ................. H01F 27/366 |
| | | | 336/232 |
| 2018/0211771 A1 * | 7/2018 | Kurz | ................. H01F 27/2847 |
| 2018/0211772 A1 * | 7/2018 | Kurz | ................. H01F 38/14 |
| 2021/0125760 A1 | 4/2021 | Kurz et al. | |

FOREIGN PATENT DOCUMENTS

| | | |
|---|---|---|
| JP | 2014107422 A | 6/2014 |
| KR | 101449123 B1 | 10/2014 |
| KR | 101548277 B1 | 8/2015 |
| KR | 101622557 B1 | 5/2016 |
| KR | 102035382 B1 | 11/2019 |
| WO | 2014017352 A1 | 1/2014 |
| WO | 2020044203 A1 | 3/2020 |

* cited by examiner

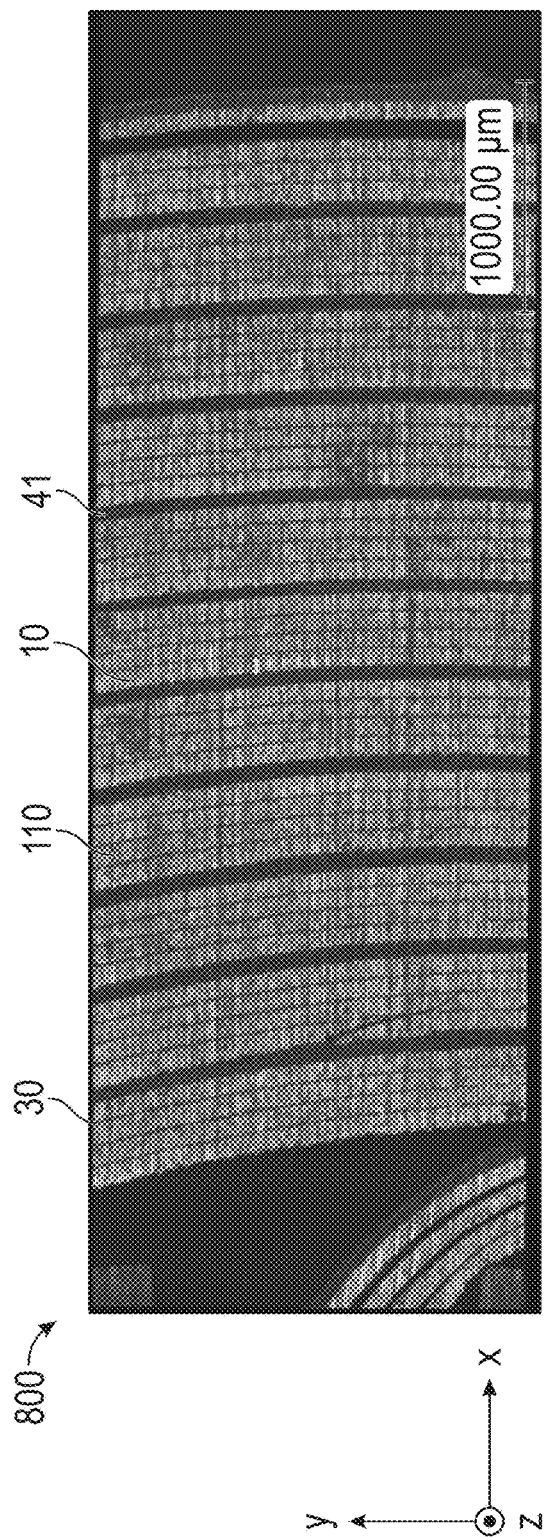
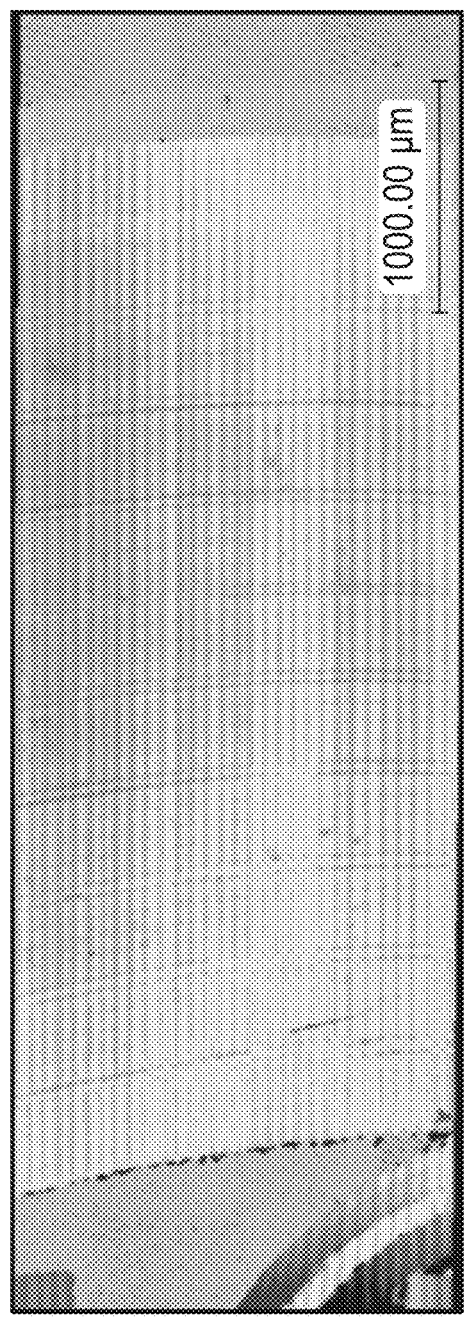
FIG. 8A
FIG. 8B

ANTENNA FOR TRANSFER OF INFORMATION OR ENERGY

CROSS REFERENCE TO RELATED APPLICATIONS

This application is a national stage filing under 35 U.S.C. 371 of PCT/IB2021/051556, filed Feb. 24, 2021, which claims the benefit of U.S. Application No. 62/982,774, filed Feb. 28, 2020, the disclosure of which is incorporated by reference in its/their entirety herein.

BACKGROUND

Coils used in antennas are known. Inductive coupling between coils can be used in wireless power systems. In this approach, a transmitter coil in one device transmits electric power across a short distance to a receiver coil in another device.

SUMMARY

In some aspects of the present description, an antenna for transfer of information or energy is provided. The antenna includes an electrically conductive first layer having a width in a thickness direction of the antenna and extending longitudinally along a length of the first layer between first and second longitudinal ends of the first layer, and an electrically insulative thermally conductive second layer bonded to the first layer along the length of the first layer. The first and second layers are wound to form a plurality of substantially concentric loops. A width and a length of the second layer are substantially co-extensive with the respective width and length of the first layer so as to expose opposing longitudinal edge surfaces of the first layer along the length of the first layer.

In some aspects of the present description, a coil including a multilayer film wound to form a plurality of substantially concentric loops is provided. The multilayer film includes an electrically conductive first layer and an electrically insulative thermally conductive second layer bonded to the first layer. The first and second layers are substantially co-extensive with each other in width and length so that opposing longitudinal edge surfaces of the first layer are not covered by the second layer.

In some aspects of the present description, a coil including a plurality of substantially concentric loops is provided. Each loop includes a metal layer substantially concentric with an electrically insulative thermally conductive layer and an adhesive layer. The metal layer, the thermally conductive layer and the adhesive layer are substantially co-extensive with each other in width and length. In a plan view, the coil includes a regular pattern of substantially parallel grooves extending across at least a plurality of adjacent loops in the plurality of substantially concentric loops.

In some aspects of the present description, an antenna for transfer of information or energy is provided. The antenna includes a multilayer film having a substantially rectangular or substantially square shape in a cross-section substantially perpendicular to a length thereof. The multilayer film is wound along the length thereof to form a plurality of substantially concentric loops. The multilayer film includes an electrically conductive first layer; an electrically insulative thermally conductive second layer; and an adhesive third layer.

In some aspects of the present description, a substantially planar coil for transfer of information or energy is provided. The coil includes an electrically conductive first layer; an electrically insulative thermally conductive second layer; and an adhesive third layer. The second and third layers are disposed on and bonded to the first layer and substantially co-extensive in length and width of the first layer so as to not cover edge surfaces of the first layer.

In some aspects of the present description, a coil including a multilayer film wound to form a plurality of substantially concentric loops is provided. Each loop includes at least three layers which include an electrically conductive first layer; an electrically insulative thermally conductive second layer; and an adhesive third layer. Each layer has opposing first surfaces substantially perpendicular to a radial direction of the coil, and opposing second surfaces substantially parallel to the radial direction of the coil, such that for each loop, the corresponding second surfaces of the first, second and third layers are substantially co-planar.

In some aspects of the present description, an assembly including a rod and a multilayer film wound around a plurality of consecutive turns substantially concentric with the rod is provided. The multilayer film includes a metal first layer and an electrically insulative thermally conductive second layer disposed on and bonded to the metal first layer.

These and other aspects will be apparent from the following detailed description. In no event, however, should this brief summary be construed to limit the claimable subject matter.

BRIEF DESCRIPTION OF THE DRAWINGS

FIGS. 8A-8B are a laser intensity image and a topographical map, respectively, of a first region of a coil;

DETAILED DESCRIPTION

Figure 1A:
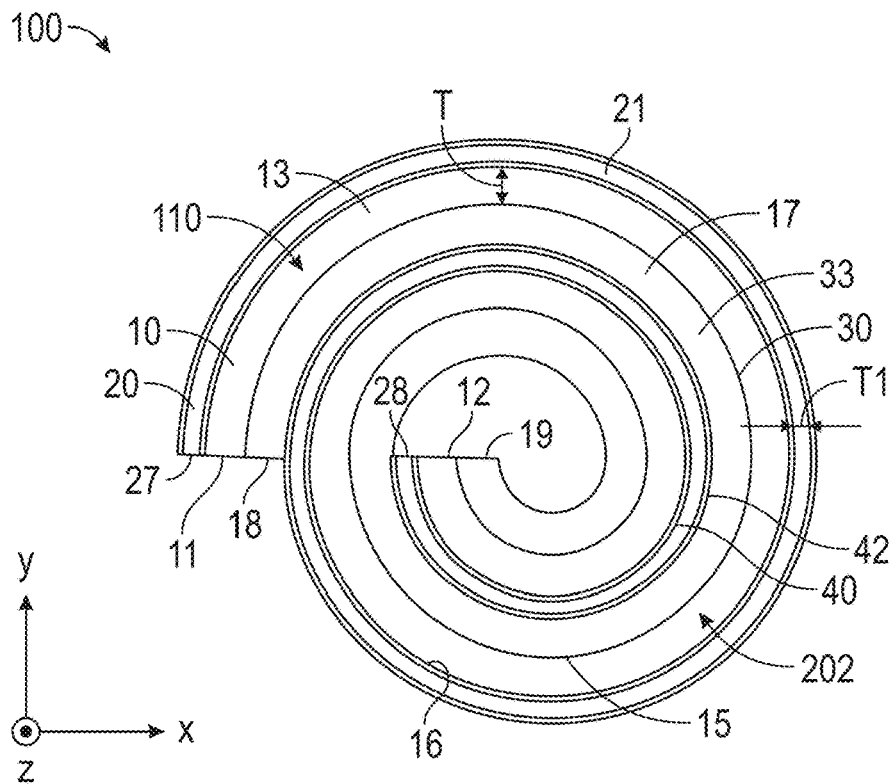
FIGS. 1A-1B are a schematic top plan and side views of a coil, respectively.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Coils described herein may be useful for transfer of information (e.g., digital or analogue data) or energy (e.g., energy for wireless charging of batteries that power electronic devices, such as cellular telephones). A coil can become hot as electrical current is conducted through the coil. According to some embodiments of the present description, it has been found that a maximum temperature in the coil can be reduced by including an electrically insulative thermally conductive layer between adjacent electrically conductive layers. According to some embodiments, the thermally conductive layer can increase a radial heat flow through the coil which reduces local hot spots resulting in a lower maximum temperature.

A thermally conductive layer can include thermally conductive particles or powder dispersed in a polymer binder. The thermally conductive layer can optionally also include magnetic particles or powder in the polymer binder, and/or the thermally conductive particles can also be magnetic particles, so that the thermally conductive layer is also magnetically conductive and/or magnetically soft. Coils which incorporate layer(s) which are magnetically conductive and/or magnetically soft along with electrically conductive layer(s) have been found to be useful in applications where it is desired to efficiently transfer information or energy. The coils can serve to guide magnetic fields during wireless charging, to shield the battery and/or other electronic device components from electromagnetic fields, to reduce eddy currents induced by magnetic fields, and/or to enhance transfer efficiency and/or Q factor of wireless charging systems, for example. The term antenna may be used to refer to a coil that is configured for transfer of information or energy, for example.

A thermally conductive layer is a layer having a thermal conductivity of at least about 0.18 W/(m·K). In some embodiments, a thermally conductive layer has a thermal conductivity of at least about 0.2 W/(m·K), or at least about 0.25 W/(m·K), or at least about 0.4 W/(m·K), or at least about 0.8 W/(m·K), or at least about 1.0 W/(m·K), or at least about 1.2 W/(m·K). The thermal conductivity of a layer is the thermal conductivity in the thickness direction of the layer, unless indicated differently. An electrically insulative thermally conductive layer can include thermally conductive filler or powder dispersed in a polymer binder. For example, thermally conductive filler or powder can be added to an epoxy layer to increase the thermal conductivity of the layer from about 0.14 W/(m·K) to any of the thermal conductivity values or ranges described herein. The thermally conductive filler or powder can include particles having a thermal conductivity of at least 1 W/(m·K), or at least 5 W/(m·K), or at least 10 W/(m·K), or at least 20 W/(m·K), or at least 30 W/(m·K) (e.g., along at least one direction). In some cases, the thermal conductivity of the particles is at least 1 W/(m·K), or at least 5 W/(m·K), or at least 10 W/(m·K), or at least 20 W/(m·K), or at least 30 W/(m·K) along at least two orthogonal directions (e.g., in the plane of a thermally conductive plate or flake, or along each of three mutually orthogonal directions in a particle extending in each of the three directions (e.g., a substantially spherical particle)). Suitable thermally conductive particles include alumina particles (e.g., alpha alumina powder, substantially spherical alumina particles, or polyhedral alumina), boron nitride particles (e.g., boron nitride flakes or substantially spherical boron nitride particles), metallic particles, and metal oxides, carbides, hydrates or nitrides, for example. In some embodiments, the thermally conductive filler or powder includes substantially non-magnetic thermally conductive particles.

In some embodiments, an electrically insulative thermally conductive layer includes powders of one or more of an Fe—Al—Si alloy, an Fe—Ni alloy, a cobalt alloy, boron nitride (BN), aluminum nitride (AlN), Fe—Si—Cr, a crystalline, nanocrystalline or amorphous alloy, and alumina. The crystalline, nanocrystalline or amorphous alloy can include iron and at least one of silicon, aluminum, boron, niobium, copper, cobalt, nickel, and molybdenum. In some embodiments, the crystalline, nanocrystalline or amorphous alloy is an FeSiBNbCu alloy. FeSiBNbCu alloys can be amorphous or nanocrystalline depending on how the alloy has been heat treated. Other suitable materials for the powders include powders of the magnetically conductive and/or soft magnetic materials described elsewhere herein. In some embodiments, the powders include powders of magnetic particles (e.g., ferrite or an alloy containing iron and/or cobalt) and powders of thermally conductive substantially non-magnetic powders (e.g., alumina, BN, or AlN). In some embodiments, the electrically insulative thermally conductive layer includes powders of one or more of a metal oxide, a metal carbide, a metal hydrate, and a metal nitride. In some embodiments, the powders include substantially non-magnetic thermally conductive particles. In some embodiments, the powders include substantially non-magnetic thermally conductive particles and include magnetically conductive thermally conductive particles. The powders can be dispersed in a polymer such as a thermoset adhesive and/or an epoxy, for example.

When higher permeability materials and lower permeability materials are used together (e.g., in a coil), magnetic field lines tend to be more concentrated in the higher permeability material and less concentrated in the lower permeability material, so high permeability (e.g., significantly higher than vacuum permeability) materials can be described as magnetically conductive and low permeability (e.g., comparable to vacuum permeability) materials can be described as magnetically insulative.

A magnetically conductive material or layer is a material or layer having a relative permeability of at least 2, and a magnetically insulative material or layer is a material or layer having a relative permeability of no more than 1.5. In some embodiments, a magnetically conductive material or layer has a relative permeability of greater than 2, or greater than 10, or greater than 100. In some embodiments, a magnetically insulative material or layer has a relative permeability of less than 1.5, or less than 1.4, or less than 1.2, or less than 1.1, or less than 1.05. In some embodiments, a magnetically insulative material or layer has a relative permeability in a range of 0.99 to 1.05, for example. In some embodiments, a coil includes a plurality of loops where each loop includes a magnetically insulative layer and a magnetically conductive layer. In some embodiments, a relative permeability of the magnetically conductive layer is at least 10 times, or at least 100 times a relative permeability of the magnetically insulative layer. The relative permeability refers to the real part of the complex relative permeability, unless indicated otherwise.

A substantially non-magnetic material is a material having a relative permeability close to unity (e.g., in a range of 0.98 to 1.1, or 0.99 to 1.05, or 0.99 to 1.01) and not having a stable magnetically ordered phase. A stable phase is a macroscopic phase that is thermodynamically stable at 20° C. in the absence of an applied magnetic field, unless indicated differently. Magnetically ordered phases include ferromagnetic, antiferromagnetic, and ferrimagnetic phases.

A soft magnetic material or layer is a material or layer having a coercivity of no more than 1000 A/m. Coercivity is a measure of the magnetic field strength needed to demagnetize a material. Soft magnetic materials or magnetic materials having low coercivity can be described as magnetic materials that are easily demagnetized. In some embodiments, a soft magnetic layer has a coercivity of less than 1000 A/m, or less than 100 A/m, or less than 50 A/m, or less than 20 A/m.

In some embodiments, a magnetically conductive layer is soft magnetically. Such a layer may have a relative permeability of greater than 2, or greater than 10, or greater than 100; and a coercivity of less than 1000 A/m, or less than 100 A/m, or less than 50 A/m, or less than 20 A/m.

A magnetically conductive layer or a soft magnetic layer may be electrically conductive (e.g., an electrical resistivity of no more than 200 µΩcm) or electrically insulative (e.g., an electrical resistivity of at least 100 Ωm). In some embodiments, an electrically insulative layer (e.g., a magnetically conductive electrically insulative layer or a soft magnetic layer that is electrically insulative or a thermally conductive layer that is electrically insulative) has as an electrical resistivity of greater than 100 Ωm, or greater than 200 Ωm, or greater than 500 Ωm, or greater than 1000 Ωm. In some embodiments, an electrically conductive layer (e.g., a magnetically insulative electrically conducive layer, or a magnetically conductive electrically conducive layer, or a soft magnetic layer that is electrically conductive) has as an electrical resistivity of less than 200 µΩcm, or less than 100 µΩcm, or less than 50 µΩcm, or less than 20 µΩcm, or less than 10 µΩcm. In some embodiments, a magnetically conductive and/or magnetically soft material is electrically conductive. An electrically conductive layer can be formed as a continuous layer of such magnetic materials. An electrically insulative layer can be formed by dispersing particles of thermally conductive and/or magnetic materials in an electrically insulative binder at concentrations where electrically continuous paths through the layer do not form. At higher concentrations, the layer can become electrically conductive if the particles are electrically conductive. In some embodiments, a composite layer includes different types particles where some particles are electrically conductive and other particles are electrically insulative. The resistivity can be adjusted by adjusting the volume fraction of the conductive particles. Electrical resistivity refers to the intrinsic electrical resistivity, unless indicated differently.

Magnetic and electric properties (e.g., relative permeability, coercivity, electrical resistivity) refers to the respective property evaluated at low frequencies (e.g., about 1 kHz or less) or evaluated statically (direct current), unless indicated differently, and determined at 20° C., unless indicated differently.

Any suitable magnetic material can be used for a magnetically conductive and/or soft magnetic layer and/or as a filler (e.g., one or more of the fillers) in an electrically insulative thermally conductive layer. Crystalline alloys including any two or all three of iron, cobalt, or nickel can be used. Additional elements can optionally be added to modify properties such as magnetostriction, resistivity, permeability, saturation induction, coercivity, remanence, and/or corrosion, for example. Examples of such alloys include NiFe, NiFeMo, FeSi, FeAlSi, and FeCo. Amorphous alloys may also be used. For example, amorphous alloys including cobalt and/or iron with metalloids such as silicon and boron may be used. Such alloys are known in the art. Nanocrystalline materials such as nanocrystalline alloys may also be used. For example, nanocrystalline alloys including iron, silicon and/or boron, and optional other elements added to control the nucleation and growth of nanocrystals on annealing may be used. Many of these alloys include iron, silicon, boron, niobium, and copper. Useful FeSiBNbCu alloys include those available from VACUUMSCHMELZE GmbH & co. under the tradename VITROPERM and those available from Hitachi Metals, Ltd. under the tradename FINEMET. Ferrites can also be used. Ferrites include oxides of iron and at least one other metal. Examples of useful ferrites include soft cubic ferrite materials, such as MnZn-ferrites or NiZn-ferrites. Such materials are available from many suppliers, such as Ferroxcube.

In some embodiments, a magnetically conductive and/or soft magnetic layer includes a metal such as an alloy, for example. In some embodiments, the alloy is an iron alloy. In some embodiments, the alloy includes iron and at least one of silicon, aluminum, boron, niobium, copper, cobalt, nickel, or molybdenum. In some embodiments, the alloy includes iron and at least one of silicon, boron, niobium, or copper. In some embodiments, the alloy includes iron, silicon, and boron, and in some embodiments, the alloy further includes niobium and copper. In some embodiments, the alloy includes iron and at least one of silicon and aluminum. In some embodiments, the alloy includes iron, aluminum and silicon. In some embodiments, the alloy includes nickel and iron. In some embodiments, the alloy includes iron, cobalt and nickel. In some embodiments, the alloy includes nickel, iron and molybdenum. In some embodiments, the alloy includes iron and silicon. In some embodiments, the alloy includes nickel, iron and molybdenum. In some embodiments, the alloy is a crystalline alloy. In some embodiments, the crystalline alloy includes at least two different metals selected from iron, cobalt and nickel. In some embodiments, the alloy is a nanocrystalline alloy. In some embodiments, the nanocrystalline alloy includes iron, silicon, boron, niobium, and copper. In some embodiments, the alloy is an amorphous alloy. In some embodiments, an amorphous alloy includes at least one of cobalt or iron, and at least one of silicon or boron. In some embodiments, a magnetically conductive and/or soft magnetic layer includes a ferrite, such as a manganese-zinc ferrite or a nickel-zinc ferrite.

In some embodiments, a continuous electrically conductive layer of the iron alloy is used as a magnetically conductive and/or soft magnetic layer. In some embodiments, a magnetically conductive layer and/or a soft magnetic layer includes particles (e.g., magnetically conductive filler) dispersed in a binder (e.g., at least one of a thermoset adhesive, an epoxy, or a mixture including an epoxy). Alternatively, or in addition, the layer can be a thermally conductive layer including thermally conductive particles dispersed in the binder. The filler included in the binder can be or include particles of any of the magnetic materials or thermally conductive materials described elsewhere herein. In some embodiments, the particles are metallic particles which may be or include an iron-silicon-boron-niobium-copper alloy, for example, or which may be or include an iron-aluminum-silicon alloy (e.g., Sendust), for example. In some embodiments, the particles are ferrite particles such as manganese-zinc ferrite particles or nickel-zinc ferrite particles. Other suitable materials for the particles, or for a continuous magnetically conductive and/or soft magnetic layer, include permalloy, molybdenum permalloy, and supermalloy. Combinations of different particles may also be used (e.g., a combination of magnetic particles and thermally conductive substantially non-magnetic particles can be used). In some embodiments, the particles include metallic particles which include at least one of an iron-silicon-boron-niobium-copper alloy or an iron-aluminum-silicon alloy. The particles can have any suitable shape and size. In some embodiments, the particles are flakes. A flake may have a thickness small (e.g., smaller by a factor of at least 4, or at least 8) compared to a largest lateral dimension of the flake and may have an irregular edge shape, for example.

Useful electrically conductive magnetically insulative materials include substantially non-magnetic metals such as non-ferrous metals and austenitic stainless steels, for example. A non-ferrous metal is a metal, which may be an elemental metal or a metal alloy, which does not contain iron in appreciable amounts (e.g., no iron, or only small amounts (e.g., trace amounts) of iron that do not materially affect the magnetic properties of the metal). Useful non-ferrous metals include aluminum, copper, zinc, lead, silver and alloys thereof, for example. In some embodiments, an electrically conductive magnetically insulative layer used in an antenna or coil is or includes a metal which may be or include copper or a copper alloy, for example.

In some aspects of the present description, methods of efficiently making coil(s) or antenna(s) are described. In some embodiments, a method of making a coil or antenna includes the step of winding a film having at least one electrically conductive layer (e.g., a metal first layer) and at least one electrically insulative thermally conductive layer (e.g., an electrically insulative thermally conductive second layer disposed on and bonded to the metal first layer) around a rod to form an assembly as described further elsewhere herein. The film may include one or more metal layers, for example. Using multiple thinner metal layers allows winding the film around the rod to form loops or turns substantially concentric with the rod to be carried out more easily than if a single metal layer having the same total thickness (e.g., to provide substantially the same low-frequency resistance along the length) were used, for example. In some cases, multiple thinner layers are advantageously used to provide increased surface area which reduces the buildup of the effective electrical resistance of the coil due to the decrease in skin depth at higher frequencies. In some embodiments, a method of making coil(s) or antenna(s) include slicing through the assembly with one or more diamond wires to form section(s) of the assembly that include the coil(s) or antenna(s). This slicing, or other methods, can generate a regular pattern (e.g., a regular pattern of substantially parallel grooves) on one or both sides of the coil or antenna. Such regular patterns are described further elsewhere herein.

Substantially concentric objects (e.g., substantially concentric loops in a coil) have a same or close center (e.g., centered to within 20%, or within 10%, or within 5% of a largest lateral dimension (e.g., diameter of outermost loop)). Substantially concentric loops can have a substantially circular, elliptical, or rounded rectangular shape, for example.

The multilayer film can include adjacent layers bonded to one another through an adhesive layer and adjacent loops of the coil or antenna can be bonded to one another through an adhesive layer. Useful adhesives may be one or more of thermoset adhesives, epoxies, acrylates, or polyurethanes, for example. The adhesive layer can include a thermally conductive filler. In some embodiments, the adhesive is a multilayer adhesive (e.g., three layers) where the center layer, but not the outer layers, includes a thermally conductive filler.

Coils and antennas related to those of the present description are described in U.S. patent application Ser. No. 16/553,476, filed on Aug. 28, 2019 and titled "Coil and Method of Making Same".

Figure 1B:
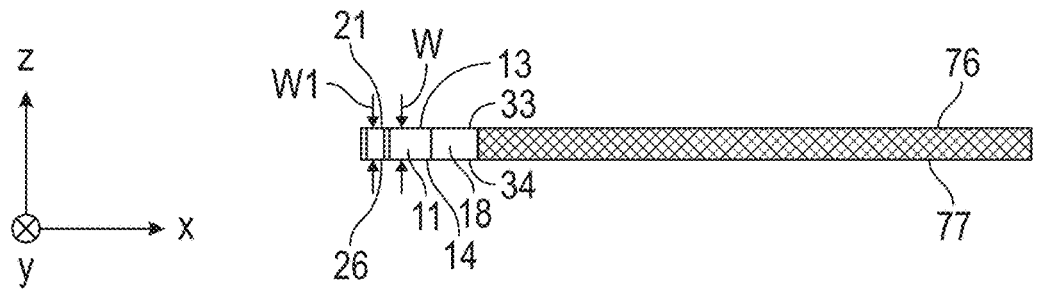

FIGS. 1A-1B are a schematic top and side views of a coil 100 according to some embodiments. The coil 100 may be, or may be used in, an antenna for transfer of information or energy. The coil or antenna 100 includes a first layer 10 having a width W and extending longitudinally along a length L (see, e.g., FIG. 5B) of the first layer 10 between first 11 and second 12 longitudinal ends of the first layer 10. The width W is in a thickness direction (z-direction) of the antenna 100. The first layer 10 has a thickness T which is along a direction orthogonal to the length and width directions of the first layer 10 and which may be along a substantially radial direction of the coil or antenna 100. The antenna 100 further includes a second layer 20 bonded to the first layer 10 along the length of the first layer 10. The first and second layers 10 and 20 are wound to form a plurality of substantially concentric loops 110. A width W1 and a length L1 (see, e.g., FIG. 5B) of the second layer are substantially co-extensive with the respective width W and length L of the first layer so as to expose opposing longitudinal edge surfaces 13 and 14 of the first layer 10 along the length of the first layer 10. In some embodiments, the first layer 10 is an electrically conductive layer and the second layer 20 is an electrically insulative thermally conductive layer. In some such embodiments or in other embodiments, the first layer 10 is an electrically conductive magnetically insulative layer and the second layer 20 is a magnetically conductive layer. The second layer 20 has opposing longitudinal edge surfaces 21 and 26 along the length of the second layer 20 and has first and second longitudinal ends 27 and 28. Longitudinal edge surfaces of a layer extend in a longitudinal direction (e.g., longitudinal direction 123 depicted in FIG. 3A) of the layer while longitudinal ends of a layer are disposed at ends of the layer opposite one another in the longitudinal direction.

If a first length or width of a first layer is substantially co-extensive with a first length or width of a second layer, the respective lengths or widths substantially overlap each other (e.g., the first length or width overlaps at least 80%, or at least 90%, or at least 95% of the second length or width; and the first length or width overlaps at least 80%, or at least 90%, or at least 95% of the first length or width).

In some embodiments, the antenna or coil 100 further includes at least one third layer 17 bonded to the first layer 10 along the length of the first layer 10. Each third layer 17 has a width and a length substantially co-extensive with the respective width and length of the first layer 10. The first layer 10, the second layer 20, and the at least one third layer 17 are wound to form the plurality of substantially concentric loops 110. Each third layer 17 has opposing longitudinal edge surfaces 33 and 34 along the length of the second layer 20 and has first and second longitudinal ends 18 and 19.

In some embodiments, the coil 100 includes first adhesive layer(s) 30 bonding the first layer 10 and the at least one third layer 17 and includes a second adhesive layer 42 disposed between and bonding adjacent loops 110. In some embodiments, the second adhesive layer 42 is thicker (e.g., by at least a factor of 1.5 or 2) than the first adhesive layer 30. The coil 100 further includes a third adhesive layer 40 bonding the first layer 10 to second layer 20. In some embodiments, the third adhesive layer 40 is thicker (e.g., by at least a factor of 1.5 or 2) than the first adhesive layer 30. In some embodiments, the at least one third layer 17 includes at least one electrically conductive (and optionally magnetically insulative) layer. In some embodiments, the at least one third layer 17 includes at least one magnetically conductive layer.

In some cases, the first layer 10 and each third layer 17 are similar in composition, shape or function, for example. In such cases, or in other cases, the first layer 10 together with the one or more third layers 17 may be described as a plurality of first layers. It will be understood that alternate nomenclatures can be used for the various layers. For example, the layer 20 may be described as a first layer and the layer 10 together with the one or more third layers 17 may be described as a plurality of second layers.

The thicknesses and widths of the various layers may be selected to be any suitable values. In some embodiments, thinner first layers 10 and/or third layers 17 are selected when it is desired for the coil or antenna to operate at higher frequencies, and thicker first layers 10 and/or third layers 17 are selected when it is desired for the coil or antenna to operate at lower frequencies. At higher frequencies, current can become partially confined to a skin layer at the surface of the conductor and this tends to increase the effective electrical resistance of the coil. Using multiple first layers 10 and/or third layers 17 distributes the current over more surfaces and this can reduce the effects of the reduced skin depth on the effective electrical resistance of the coil. In some embodiments, each of the first layers 10 and/or third layers 17 have a thickness of at least 5 microns, or at least 10 microns, or at least 20 microns, or at least 40 microns. In some embodiments, each of the first layers 10 and/or third layers 17 have a thickness of no more than 2000 microns, or no more than 1000 microns, or no more than 500 microns, or no more than 250 microns. For example, in some embodiments, 1000 microns≥T≥10 microns. The width (e.g., W or W1) of a layer may be less than, comparable to (e.g., equal to within 20%, or with 10%), or greater than the thickness of the layer. In some embodiments, a ratio of the width to a thickness of the first layer 10 is at least 0.1, or at least 1, or at least 5 (i.e., in some embodiments, $W/T \geq 0.1$, or $W/T \geq 1$, or $W/T \geq 5$). For example, in some embodiments, $1000 \geq W/T \geq 0.1$. The second layer 20 has a thickness T1. In some embodiments, a ratio of the width to a thickness of the second layer 20 is at least 0.1, or at least 1, or at least 5, or at least 10 (i.e., in some embodiments, $W1/T1 \geq 0.1$, or $W1/T1 \geq 1$, or $W1/T1 \geq 5$, or $W1/T1 \geq 10$). For example, in some embodiments, $1000 \geq W1/T1 \geq 0.1$. In some embodiments, the thickness T of the first layer 10 is greater than the thickness T1 of the second layer 20. In other embodiments, the thickness T of the first layer 10 is less than the thickness T1 of the second layer 20. In some embodiments, the thicknesses T and T1 of the first and second layers 10 and 20 are about equal. The length of any of the layers layer may be substantially longer than the width or thickness of the layer (e.g., the length may be at least 5 times or at least 10 times one or both of the width and the thickness).

In some embodiments, the antenna or coil 100 can be described as including a multilayer film 202 wound to form the plurality of substantially concentric loops 110 where the multilayer film 202 includes a first layer 20 and a plurality of second layers (10 and 17) disposed on and bonded to the first layer 20. The first layer 10 and the at least one third layer 17 may be disposed on a same side as the second layer 20, or one or more of the first layer 10 and the at least one third layer 17 may be disposed on one same side of the second layer 20 and the remaining layers of the first layer 10 and the at least one third layer 17 may be disposed on the opposite side of the second layer 20.

In some embodiments, the multilayer film 202 includes a first layer (e.g., layer 20), and a plurality of alternating second (e.g., layers 10 and 17) and third (e.g., layer 30) layers disposed on and bonded to the first layer. In some embodiments, the first layer is an electrically insulative thermally conductive layer which may also be magnetically conductive, the second layers are electrically conducive layers which may also be magnetically insulative, and the third layers are electrically insulative layers which may also be magnetically insulative and which may also be thermally conductive. The first layer may have a relative permeability in any of the ranges described elsewhere herein for magnetically conductive layers. The second and/or third layers may have a relative permeability in any of the ranges described elsewhere herein for magnetically insulative layers. Each third layer may be an adhesive (e.g., a thermoset adhesive and/or an epoxy). In some embodiments, widths and lengths of the first, second and third layers are substantially co-extensive with each other so that no longitudinal edge surface (e.g., edge surfaces 13 and 14) of a second layer is covered by either a third layer or the first layer. In some embodiments, at least one of the first, second and third layers is a an electrically insulative thermally conductive layer.

In some embodiments, a coil 100 incudes a multilayer film 202 wound to form a plurality of substantially concentric loops 100. The multilayer film 202 includes an electrically conductive first layer 10 and an electrically insulative thermally conductive second layer 20 bonded to the first layer 10. The first and second layers 10 and 20 are substantially co-extensive with each other in width and length so that opposing longitudinal edge surfaces 13 and 14 of the first layer 10 are not covered by the second layer 20. In some embodiments, the multilayer film 202 further includes an electrically conductive third layer 17 bonded to the first layer 10, where the first and third layers 10 and 17 are substantially co-extensive with each other in width and length so that opposing longitudinal edge surfaces 13 and 14 of the first layer 10 are not covered by the third layer 17. The multilayer film 202 can include the first layer 10 between the second layer 20 and the third layer 17.

The antenna or coil 100 includes opposing major surfaces 76 and 77. One or both of the major surfaces 76 and 77 may include a regular pattern (e.g., regular pattern of substantially parallel grooves) as described further elsewhere herein. For example, in some embodiments, the regular pattern may be described in any one or more of the following ways. The regular pattern may extend substantially along a same first direction and across substantially the entire coil. The regular pattern may extend along a first direction making an angle θ with a longitudinal direction of the loop where θ varies along the longitudinal direction of the loop. The regular patterns of the edge surfaces of at least a plurality of adjacent loops of the separated portion of the multilayer film may be substantially aligned with each other. The regular pattern may include a pattern of substantially parallel grooves extending across at least a plurality of adjacent loops of the separated portion of the multilayer film. The regular pattern may have a first average pitch in a first region of the coil and a different second average pitch in a different second region of the coil. A Fourier transform of the regular pattern may have a peak at a first spatial frequency in a first region of the coil and a peak at a different second spatial frequency in a different second region of the coil. The coil may include, in at least one first region of the coil, a regular optical and topographical pattern along a first direction, and a regular optical, but not topographical, pattern along an orthogonal second direction.

Figure 1C:
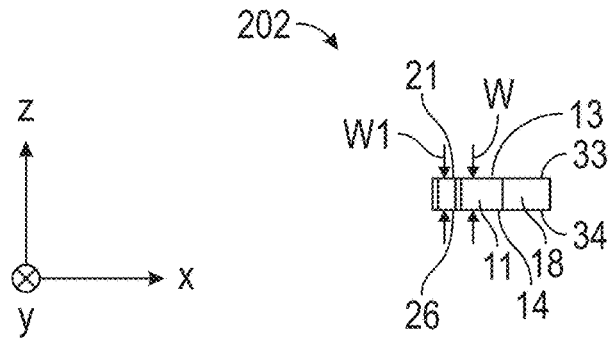
FIG. 1C is a schematic cross-sectional view of a multilayer film of the coil of FIGS. 1A-1B.

FIG. 1C is a schematic cross-sectional view of the multilayer film 202 in a cross-section perpendicular to a longitudinal direction of the loops 110. The multilayer film 202 has a substantially rectangular cross-section. For example, the cross-section may be nominally rectangular, or may be rectangular except for rounded corners having radius of curvature large compared to the film thickness (e.g., at least 5 times, or at least 10 times, or at least 20 times) and/or except for having opposite sides that deviate from parallel by no more than 20 degrees, or no more than 10 degrees, or no more than 5 degrees. The rectangle can be longer or shorter or in the x-direction than in the z-direction depending on the widths and thicknesses of the various layers. Substantially rectangular cross-sections also include substantially square cross-sections since a square can be considered to be a special case of a rectangle. A substantially rectangular cross-section having a length and width within about 40% of one another can be considered to be a substantially square cross-section. For example, the cross-section depicted in FIG. 4 may be considered to be a substantially square cross-section. In some embodiments, a substantially square cross-section has a length and width within about 30% or within about 20% or within about 10% of one another. In some embodiments, for each loop in the plurality of substantially concentric loops 110, the multilayer film 202 has a substantially rectangular cross-section in a plane perpendicular to a longitudinal direction of the loop. In some embodiments, each loop in the plurality of concentric loops 110 has a substantially rectangular cross-section in a plane perpendicular to the longitudinal direction of the loop.

In some embodiments, an antenna or coil 100 for transfer of information or energy includes a multilayer film 202 having a substantially rectangular or substantially square shape in a cross-section substantially perpendicular to a length thereof. The multilayer film 202 is wound along the length thereof to form a plurality of substantially concentric loops 110. The multilayer film 202 includes an electrically conductive first layer 10, an electrically insulative thermally conductive second layer 20, and an adhesive third layer 40 or 42. In some embodiments, the third layer 40 is disposed between the first and second layers 10 and 20, and the multilayer film 202 further includes an adhesive fourth layer 42, where the second layer 20 is disposed between the third and fourth layers 40 and 42.

Figure 1D:
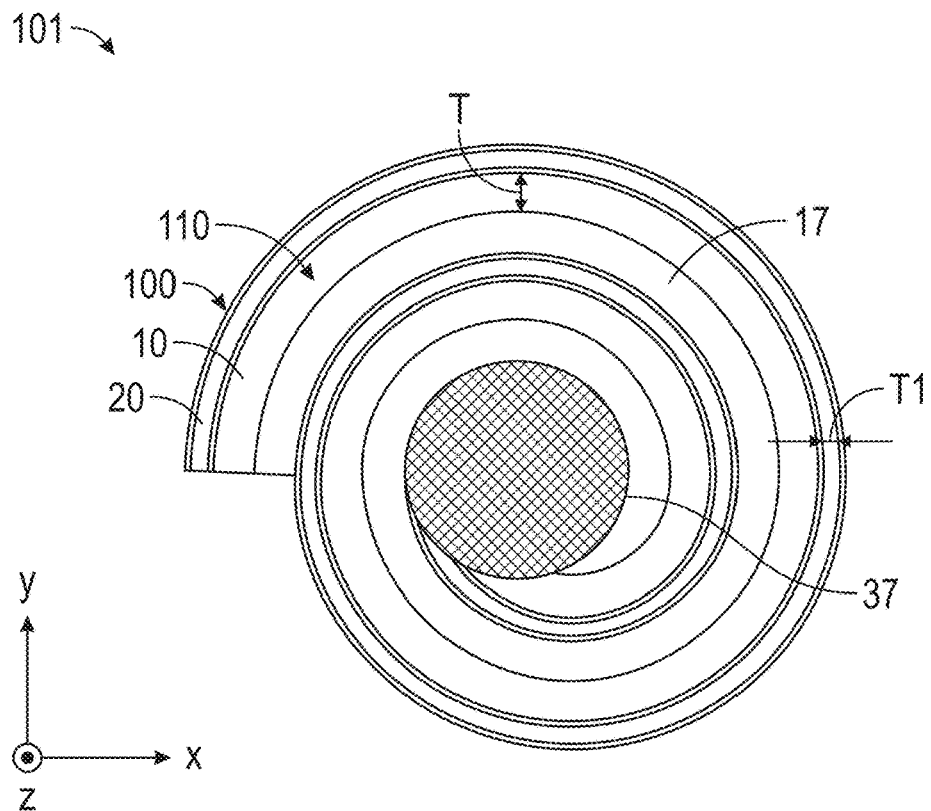
FIG. 1D is a schematic top plan view of an assembly including the coil of FIGS. 1A-1B.

FIG. 1D is a schematic top view of an assembly 101 including the coil 100 and a rod 37. As described further elsewhere herein, the assembly 101 can be made by wrapping a multilayer film around a rod and cutting (e.g., slicing with a wire saw) the resulting assembly to provide a desired width of a portion of the assembly separated by the cutting. The rod 37 may be a sliced segment of the initial rod used in forming the assembly 101.

The first layer 10 and the optional at least one third layer 17 may each be one or more of an electrically conductive layer, a magnetically insulative layer, a metal layer, a non-ferrous metal layer, or a substantially non-magnetic metal layer and may have a conductivity and/or relative permeability in any of the corresponding ranges described elsewhere herein and may be made of corresponding materials described elsewhere herein (e.g., copper or copper alloy). The second layer 20 may be one or more of a magnetically conductive layer or a soft magnetic layer or a thermally conductive layer and may have a relative permeability and/or a coercivity and/or a thermal conductivity in any of the corresponding ranges described elsewhere herein and may be made of corresponding materials described elsewhere herein (e.g., particles of an iron-silicon-boron-niobium-copper alloy or particles of alumina in a binder). In some embodiments, each loop includes at least one metal layer (e.g., layer 10) having a relative permeability less than 1.1 and at least one layer (e.g., layer 20) having a relative permeability of at least 10. In some embodiments, each loop 110 includes at least one substantially non-magnetic metal layer (e.g., layer 10) and at least one soft magnetic layer (e.g., layer 20). In some embodiments, each loop 110 includes at least one electrically conductive magnetically insulative layer (e.g., layer 10) and at least one magnetically conductive layer (e.g., layer 20). In some embodiments, each loop 110 includes at least one electrically conductive layer (e.g., layer 10) and at least one electrically insulative thermally conductive layer (e.g., layer 20). In some embodiments, each loop 110 includes at least one first layer (e.g., layer 10 and/or 17) having an electrical resistivity of less than 100 µΩcm and a relative permeability of less than 1.4 and at least one second layer (e.g., layer 20) having a relative permeability of greater than 2 and a coercivity of less than 1000 A/m. In some embodiments, each loop includes at least one first layer (e.g., layer 10 and/or 17) having an electrical resistivity of less than 100 µΩcm and a relative permeability of less than 1.1 and at least one second layer (e.g., layer 20) having a relative permeability of greater than 10 and a coercivity of less than 100 A/m.

In some embodiments, a coil or antenna 100 for transfer of information or energy includes an electrically conductive (and optionally magnetically insulative) first layer 10 includes opposing major surfaces 15 and 16 and opposing edge surfaces 13 and 14 connecting the opposing major surfaces 15 and 16; and an electrically insulative thermally conducive (and optionally magnetically conductive) second layer 20 disposed on and bonded to the first layer 10 and substantially co-extensive in length and width of the first layer 10 so as to not cover edge surfaces 13 and 14 of the first layer, where the first and second layers 10 and 20 are wound to form a plurality of substantially concentric loops 110.

In some embodiments, the coil 100 is substantially planar. For example, the coil 100 may be disposed primarily in a plane parallel to the x-y plane of FIGS. 1A-1D referring to the illustrated x-y-z coordinate system and any radius of curvature of a cross-section of the coil in a plane perpendicular to plane of the coil is large (e.g., at least 5 times, or at least 10 times, or at least 20 times) compared to a diameter or largest lateral dimension of the coil.

In some embodiments, a substantially planar coil 100 for transfer of information or energy incudes an electrically conductive first layer 10, an electrically insulative thermally conductive second layer 20, and an adhesive third layer 40. The second and third layers 20 and 40 are disposed on and bonded to the first layer 10 and substantially co-extensive in length and width of the first layer 10 so as to not cover edge surfaces 13 and 14 of the first layer 10. The coil 100 can further include an adhesive fourth layer 42 where the second layer 20 is disposed between the third and fourth layers 40 and 42. The coil can further include additional electrically conductive layers (e.g., an electrically conductive layer 17) bonded (directly or indirectly) to the first layer 10.

Figure 4:
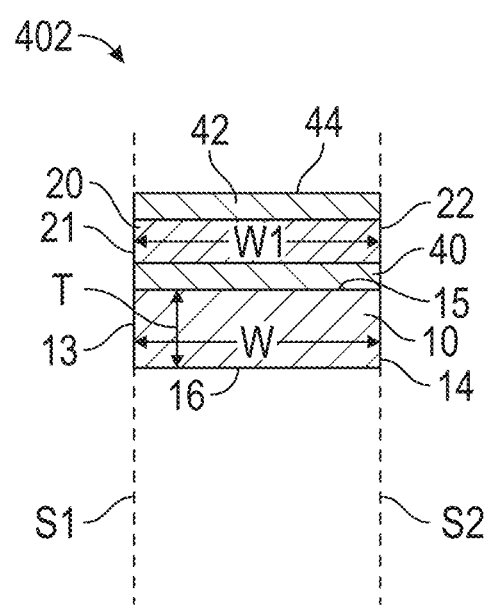
FIG. 4 is a schematic end view of a multilayer film.
Figure 5A:
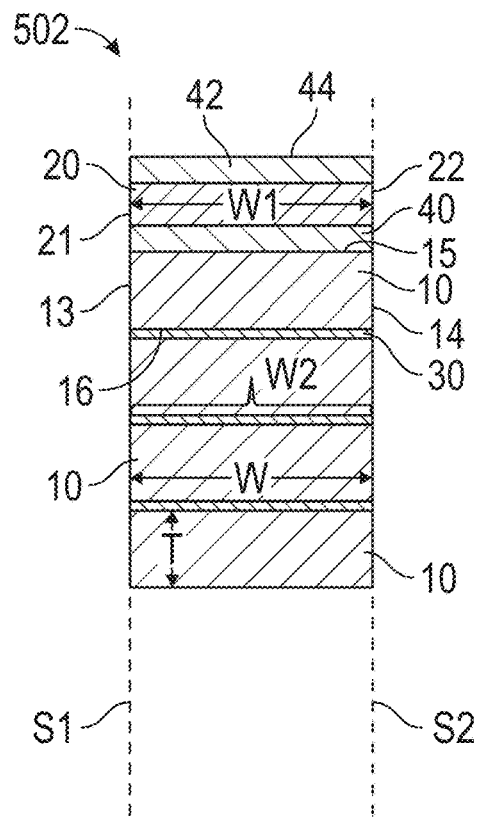
FIGS. 5A-5B are schematic end and side views of a multilayer film, respectively.

In some embodiments of the antenna or coil 100, corresponding edge surfaces (13, 21 and 14, 26) of the first and second layers 10 and 20 are substantially co-planar (see. e.g., planes S1 and S2 depicted in FIGS. 4 and 5A). The methods described elsewhere herein can, in some embodiments, ensure that the second layer 20 is substantially co-extensive in length and width of the first layer so as to not cover edge surfaces 13 and 14 of the first layer 10 and can, in some embodiments, form corresponding edge surfaces of the first and second layers 10 and 20 that are substantially co-planar.

In some embodiments, a coil 100 includes a multilayer film 202 wound to form a plurality of substantially concentric loops 110. Each loop includes at least three layers including an electrically conductive first layer 10, an electrically insulative thermally conductive second layer 20, and an adhesive third layer 40. In some embodiments, each loop further includes an adhesive fourth layer 42. Each layer has opposing first surfaces substantially perpendicular (e.g., within 20 degrees, or 10 degrees, or 5 degrees of perpendicular) to a radial direction of the coil, and opposing second surfaces substantially parallel (e.g., within 20 degrees, or 10 degrees, or 5 degrees of parallel) to the radial direction of the coil, such that for each loop 110, the corresponding second surfaces of the first, second and third layers are substantially co-planar. For example, the first layer 10 includes opposing first surfaces 15 and 16 which are substantially perpendicular to the radial direction (e.g., the x-direction in the cross-section of FIG. 1B) and opposing second surfaces 13 and 14 which are substantially parallel to the radial direction. Similarly, the second layer 20 includes opposing first surfaces that are substantially perpendicular to the radial direction and opposing second surfaces 21 and 26 which are substantially parallel to the radial direction. The corresponding second surfaces (those second surfaces on a same side of the coil) of the first second and third layers are substantially co-planar as illustrated in FIG. 1B, for example.

Figure 2:
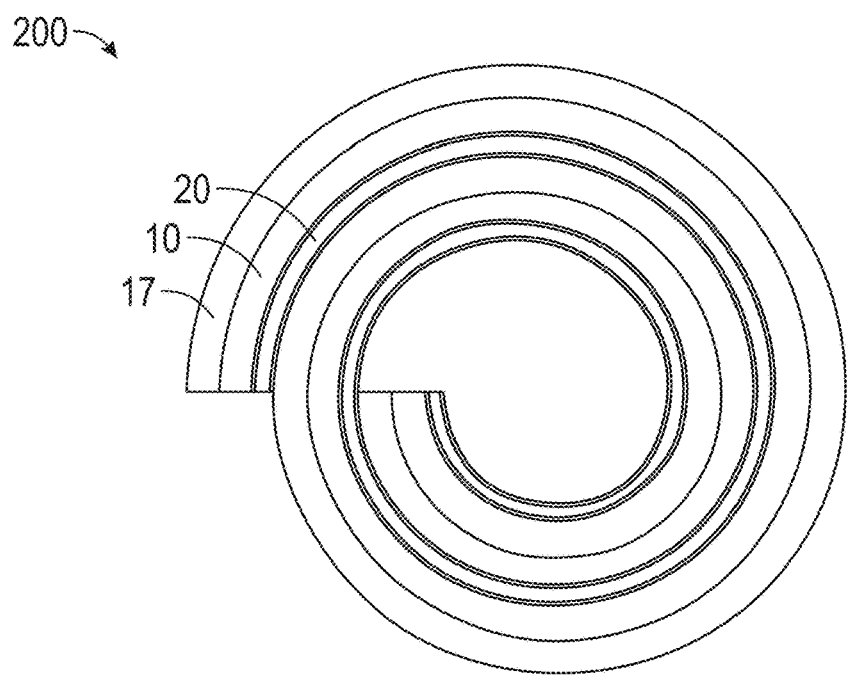
FIG. 2 is a schematic top plan view of a coil.

The coil 100 is wound into loops with the second layer 20 outside the first layer 10. The coil can alternatively be wound into loops with the first layer 10 outside the second layer 20. FIG. 2 is a schematic top view of an antenna or coil 200 wound with the first layer 10 outside the second layer 20. In the illustrated embodiment, the coil 200 includes at least one third layer 17 with the first layer 10 disposed between the second layer 20 and the at least one third layer 17.

Figure 3A:
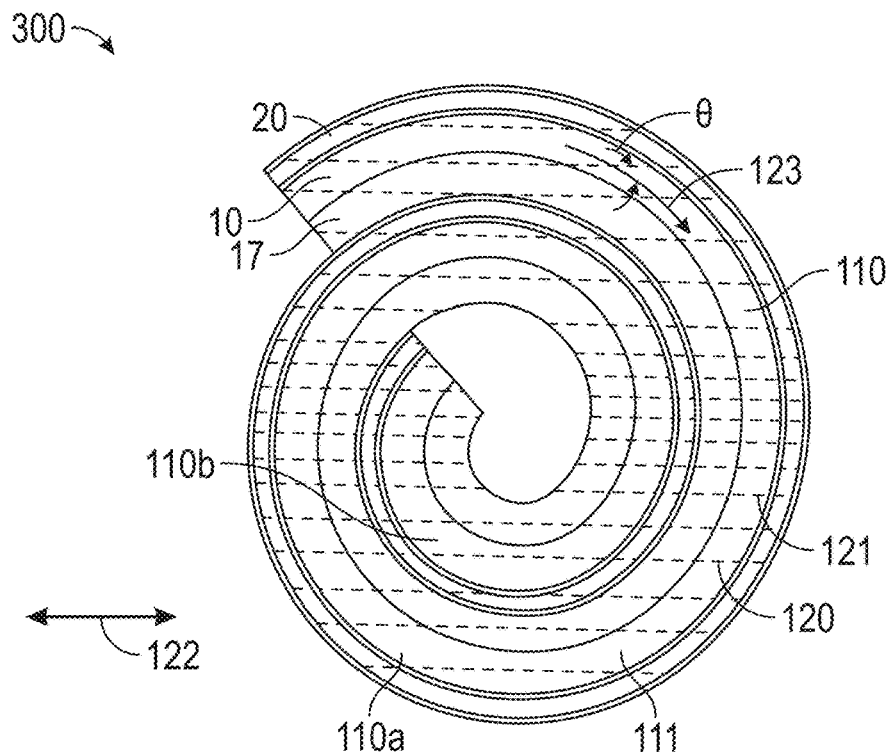
FIGS. 3A-3B are schematic top plan views of a coil.
Figure 3B:
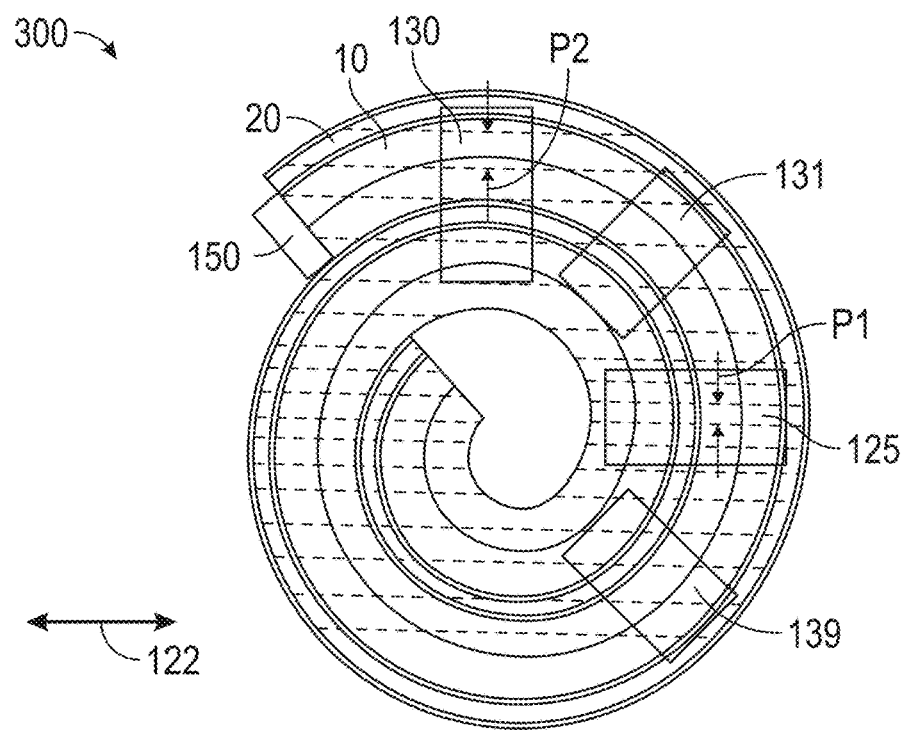
Figure 3C:
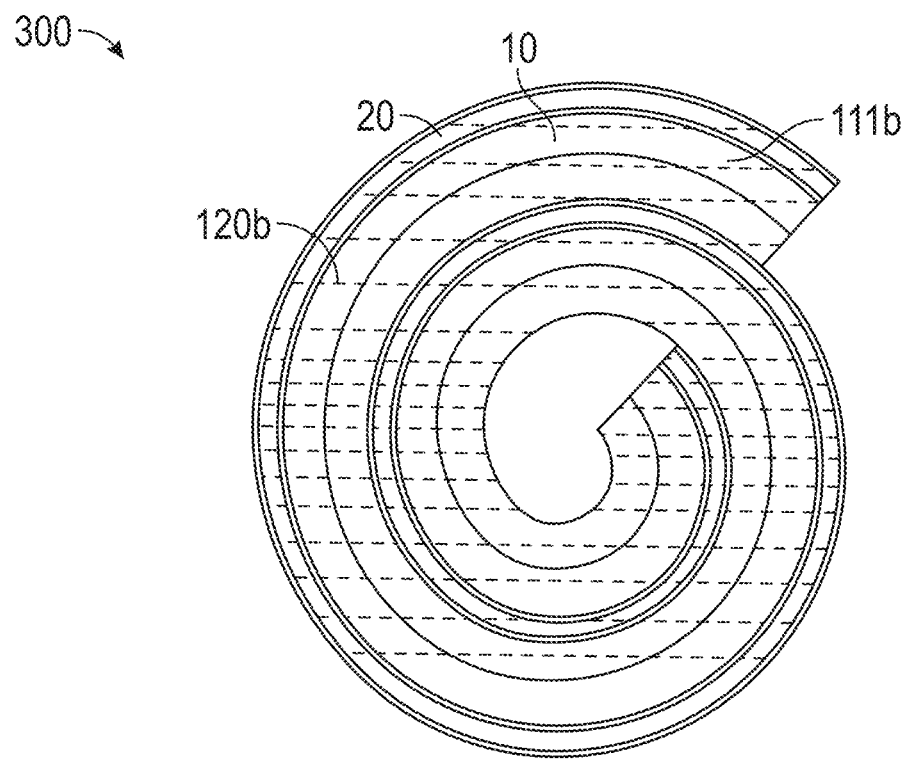
FIG. 3C is a schematic bottom plan view of the coil of FIGS. 3A-3B.

FIGS. 3A-3B are schematic top views of an antenna or coil 300 where at least one of the opposing longitudinal edge surfaces of the first layer 10 includes a regular pattern 120. FIG. 3C is a schematic bottom view of the antenna or coil 300 according to some embodiments. The regular pattern 120 may be a regular pattern of grooves, for example. In some embodiments, the longitudinal edge surface 13 includes a first regular pattern (e.g., appearing as regular pattern 120 in top plan view) and the longitudinal edge surface 14 includes a second regular pattern (e.g., appearing as regular pattern 120b in bottom plan view). In other embodiments, the regular pattern is present in only one or the other of the top and bottom plan views. The coil 100 and/or 200 may include the regular pattern(s) described for coil 300, for example.

In some embodiments, each loop 110a in the plurality of substantially concentric loops 110 has an edge surface 111 substantially perpendicular (e.g., within 20 degrees, or 10 degrees, or 5 degrees to perpendicular) to an adjacent loop 110b and includes a regular pattern 120. In some embodiments, the regular pattern 120 extends along a first direction 122 making an angle $\theta$ with a longitudinal direction 123 of the loop 110 where $\theta$ varies along the longitudinal direction 123 of the loop 110. In some embodiments, the regular pattern 120 extends substantially laterally across the edge surface 111 (e.g., within 20 degrees, or within 10 degrees, or within 5 degrees, or within 3 degrees of a plane of the major surface of the coil including the edge surface 111 (e.g., parallel to the x-y plane)). In some embodiments, the regular pattern 120 extends substantially laterally across the edge surface 111 substantially along a same first direction 122. In some embodiments, the regular patterns 120 of the edge surfaces 111 of at least a plurality of adjacent loops 110 are substantially aligned with each other. In some embodiments, each loop includes a second edge surface 111b (see, e.g., FIG. 3C) opposite the edge surface 111 (first edge surface), where the second edge surface 111b includes a second regular pattern 120b which may also extend along the first direction 122 and which may also extend substantially laterally across the second edge surface 111b.

The second regular pattern 120b may have any of the attributes described further elsewhere herein for the regular pattern 120. For example, the second regular pattern 120b may be a regular pattern of substantially parallel grooves extending across at least a plurality of adjacent loops in the plurality of substantially concentric loops.

In some embodiments, a coil 300 includes a plurality of substantially concentric loops 110 where each loop includes a metal layer 10 substantially concentric with an electrically insulative thermally conductive layer 20 and an adhesive layer 40 and optionally a second adhesive layer 42. The metal layer 10, the thermally conductive layer 20 and the adhesive layer 40 are substantially co-extensive with each other in width and length. In a plan view, the coil 300 includes a regular pattern 120 of substantially parallel grooves 121 extending across at least a plurality of adjacent loops in the plurality of substantially concentric loops 110.

In some embodiments, the substantially concentric loops refer to loops of a multilayer film, for example. Each loop 110 may include loops of adjacent layers 10 and 17 and the edge surface 111 may be an edge surface of the combined adjacent layers 10 and 17. In some embodiments, the substantially concentric loops refer to loops of individual layers in a multilayer film, for example. For example, the first layer 10 is wound into substantially concentric loops. In such cases, the edge surface 111 may be an edge surface (e.g., edge surface 13) of a first layer 10, for example.

In some embodiments, each loop 110 includes at least one layer (e.g., layer 20) that is a soft magnetic layer and/or a magnetically insulative layer and/or an electrically insulative/thermally conductive layer, and at least one layer (e.g., layer 10 and/or 17) that is an electrically conductive layer such as a metal layer. In some embodiments, the optional at least one third layer 17 is omitted. In some embodiments, each loop includes a plurality of electrically conductive or metal layers (e.g., layers 10 and 17). In some embodiments, each loop includes two or more soft magnetic and/or magnetically insulative layers. In some embodiments, each loop includes two or more electrically insulative thermally conductive layers.

In some embodiments, the coil 300 includes a plurality of substantially concentric loops 110 where each loop includes a plurality of substantially concentric metal layers (10 and 17) substantially concentric with at least one soft magnetic layer and/or electrically insulative thermally conductive layer 20, such that in a plan view (e.g., the top plan view of FIGS. 3A or 3B and/or the bottom plan view of FIG. 3C), the coil 300 includes a regular pattern 120 of substantially parallel grooves 121 extending across at least a plurality of adjacent loops in the plurality of substantially concentric loops 110. In some embodiments, in the top plan view, the coil includes the regular pattern 120 (first regular pattern) and in a bottom plan view, the coil includes a regular pattern 120b (second regular pattern). In some embodiments, each of the first and second regular patterns include a pattern of substantially parallel grooves. In some embodiments, the first and second regular patterns extend in substantially same first direction 122.

In some embodiments, the at least one soft magnetic layer and/or electrically insulative thermally conductive layer of each loop is disposed between the plurality of substantially concentric metal layers of the loop and the plurality of substantially concentric metal layers of an adjacent loop. In some embodiments, a first adhesive layer 30 is disposed between and bonds adjacent metal layers in the plurality of substantially concentric metal layers, and a second adhesive layer 42 is disposed between and bonds adjacent loops. In some embodiments, the second adhesive layer 42 is thicker than the first adhesive layer 30. In some embodiments, the first adhesive layer 30 is electrically insulative and thermally conductive. In some embodiments, the second adhesive layer 42 is electrically insulative and thermally conductive.

In some embodiments, the plurality of substantially concentric metal layers in each loop are electrically connected to each other. For example, the metal layers in each loop may be welded together at one or both ends of the loop or may be electrically connected to one another at one or both ends of the loop when the coil is connected to electrical cable(s) by soldering, for example. A weld 150 is schematically illustrated in FIG. 3B. The opposite ends of the layers 10 and 17 may also optionally be welded or soldered to provide an electrical connection between the layers In some embodiments, the antenna or coil 300 includes a plurality of substantially concentric loops 110, where each loop includes a metal layer (e.g., layer 10). Each loop may further include at least one electrically insulative thermally conductive layer and/or may include a plurality of alternating metal and first adhesive layers as described further elsewhere herein. In some embodiments, in a plan view (e.g., the top plan view of FIG. 3A), the coil 300 includes a regular pattern 120 extending substantially along a same first direction 122 (e.g. extending along the first direction 122 to within 20 degrees, or within 10 degrees, or within 5 degrees of the first direction 122) and across substantially the entire coil 300 (e.g., across at least 80%, or at least 90%, or at least 95% of an area of the coil). The regular pattern 120 can be described in terms of an average pitch in various regions and/or in terms of a Fourier transform of the regular pattern in the various regions. In some embodiments, the regular pattern has a first average pitch P1 in a first region 125 of the coil and a different second average pitch P2 in a different second region 130 of the coil. In some embodiments, a difference between the first and second average pitches is greater than about 10 microns, or greater than about 15 microns, or greater than about 20 microns, or greater than about 30 microns, or greater than about 40 microns, or greater than about 50 microns. For example, the first average pitch P1 may be in a range of about 60 microns to about 100 microns, and the second average pitch P2 may be in a range of about 120 microns to about 200 microns. In some embodiments, one or both of the first and second average pitches are in a range from 5 microns, or 10 microns, or 20 microns, or 40 microns to 2000 microns, or 1000 microns, or 500 microns, or 250 microns.

In some embodiments, a Fourier transform of the regular pattern has a peak at a first spatial frequency (see, e.g., F1 depicted in FIG. 14) in a first region 125 of the coil and a peak at a different second spatial frequency (see, e.g., F2 depicted in FIG. 21) in a different second region 130 of the coil. The peaks in the Fourier transforms may correspond to average pitches in the regular pattern (e.g., F1 may be about 1/P1 and F2 may be about 1/P2). In some embodiments, one or both of the first and second spatial frequencies are in a range from 1/(2000 microns), or 1/(1000 microns), or 1/(500 microns), or 1/(250 microns) to 1/(5 microns), or 1/(10 microns), or 1/(20 microns), or 1/(40 microns). In some embodiments, a difference between the first and second spatial frequencies is greater than about 0.001 inverse microns, or greater than about 0.002 inverse microns, or greater than about 0.004 inverse microns, or greater than about 0.01 inverse microns, or greater than about 0.02 inverse microns, or greater than about 0.05 inverse microns, or greater than about 0.1 inverse microns.

Third and fourth regions 131 and 139 are also illustrated in FIG. 3B. The pitch and Fourier transform can be evaluated in each of these regions as described further elsewhere herein.

In some embodiments, coils or antennas (e.g., 100, 200, or 300) of the present description can be described as including a multilayer film wound to form a plurality of substantially concentric loops (e.g., loops 110).

FIG. 4 is a schematic end view of an embodiment of a multilayer film 402 including a first layer 10 and a second layer 20. First layer 10 may be an electrically conductive (and optionally magnetically insulative) layer and second layer 20 may be an electrically insulative thermally conductive (and optionally magnetically conducive and/or magnetically soft) layer. In some embodiments, the first layer 10 and the second layer 20 are bonded to one another through an adhesive 40. In some embodiments, a multilayer film includes two multilayer films 402 with adhesive 42 of one the films bonded to the first layer 10 of the other films. In such embodiments, the multilayer film includes two first layers 10 and two second layers 20. In some embodiments, an antenna or coil includes the multilayer film 402 wound into a plurality of loops. In some embodiments, adhesive 42 bonds adjacent loops to one another.

In some embodiments, the multilayer film 402 includes an electrically conductive first layer 10, and an electrically insulative thermally conductive second layer 20 disposed on and bonded to the first layer 10, such that corresponding edge surfaces of the first and second layers 10 and 20 are substantially co-planar (e.g., co-planar to within deviations from a common plane of less than 0.3, or less than 0.2, or less than 0.1, or less than 0.05 times the thickness of the multilayer film). In the illustrated embodiments, the edge surface 13 of the first layer 10 and the edge surface 21 of the second layer 20 are corresponding edge surfaces in the plane S1, and the edge surface 14 of the first layer 10 and the edge surface 24 of the second layer 20 are corresponding edge surfaces in the plane S2.

Figure 5B:
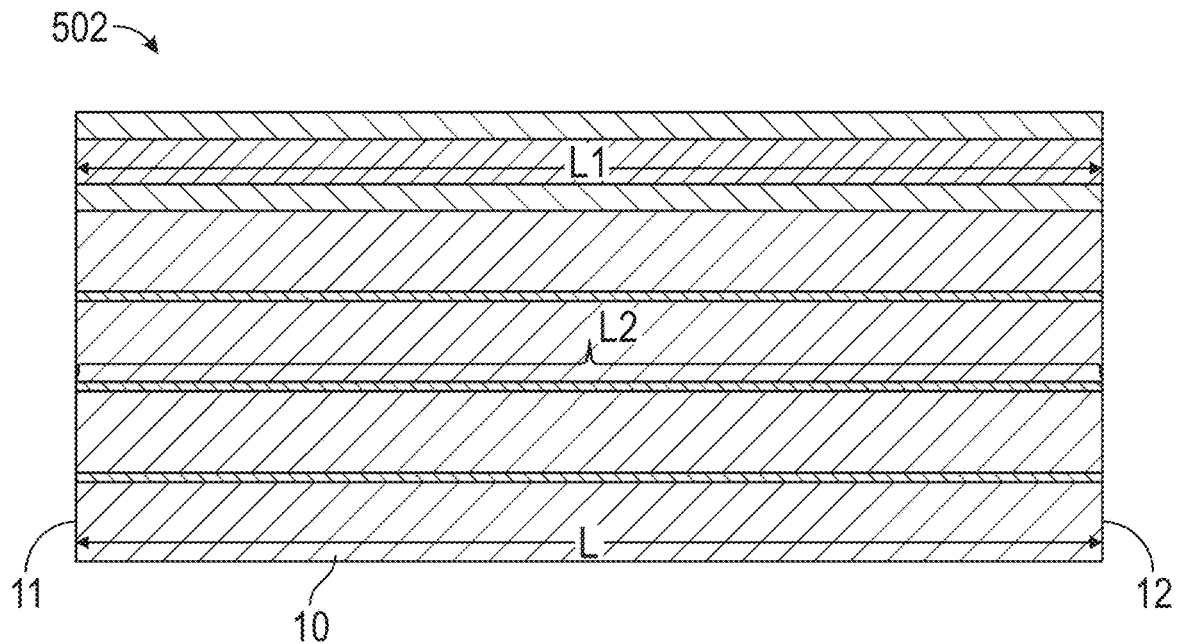

In some embodiments, a multilayer film includes additional first layers 10 and/or additional second layers 20. FIG. 5A is a schematic end view of the multilayer film 502 including a first layer 20 and a plurality of alternating second and third layers 10 and 30. FIG. 5B is a schematic side view of the multilayer film 502. In some embodiments, the multilayer film 502 includes an electrically insulative thermally conductive first layer 20; and a plurality of alternating second 10 and third 30 layers disposed on and bonded to the first layer 20, where the second layers 10 are electrically conductive and optionally magnetically insulative, and the third layers 30 are electrically and optionally magnetically insulative. In some embodiments, widths (W1, W, W2) and lengths (L1, L, L2) of the first, second and third layers 20, 10, and 30 are substantially co-extensive with each other so that no longitudinal edge surface (13, 14) of a second layer 10 is covered by either a third layer 30 or the first layer 20. In some embodiments, a ratio of the width to a thickness of the first layer 20 is at least 0.1, or at least 1, or at least 5.

In some embodiments, a coil includes a multilayer film (e.g., 202, or 402 or 502) wound to form a plurality of substantially concentric loops (e.g., loops 110). In some embodiments, the multilayer film includes a plurality of alternating electrically conductive 10 and first adhesive 30 layers and includes a second adhesive layer 42 including an outermost major surface 44 of the multilayer film. The second adhesive layer 42 can optionally be disposed at the opposite outermost major surface from that illustrated in FIGS. 4-5B. In some embodiments, as described further elsewhere herein, a method of making a coil includes winding the multilayer film around the rod to form an assembly including the rod and a plurality of loops of the multilayer film substantially concentric with the rod where each loop is bonded to an adjacent loop through the second adhesive layer 42.

A film may have two dimensions much larger than a third dimension. A film strip may be cut out from the film such that the strip has one dimension much larger than the other two dimensions. A multilayer film used in a coil or antenna of the present description may be a film strip or a portion of a film strip.

Figure 6:
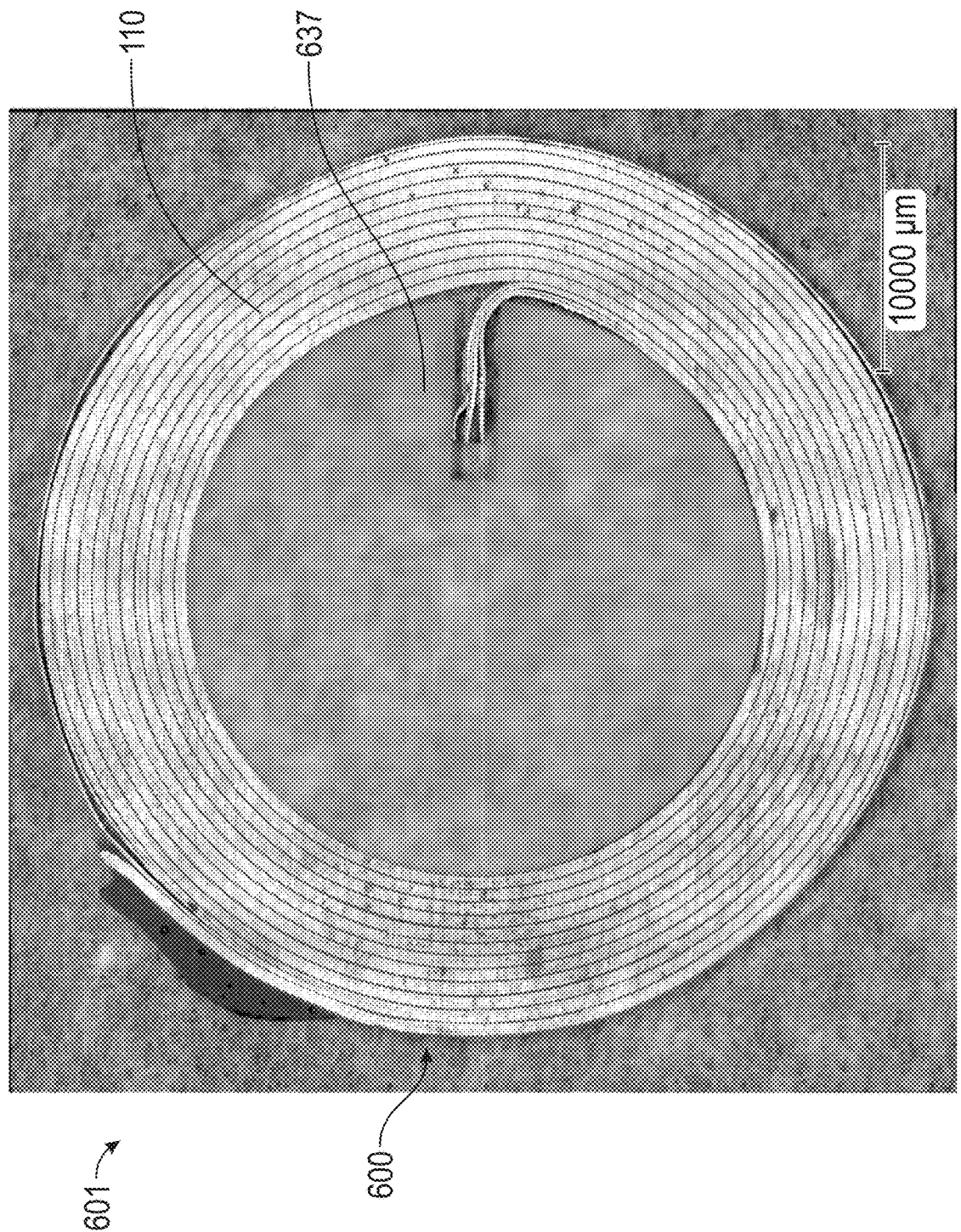
FIG. 6 is a top view of an assembly including an antenna.
Figure 7A:
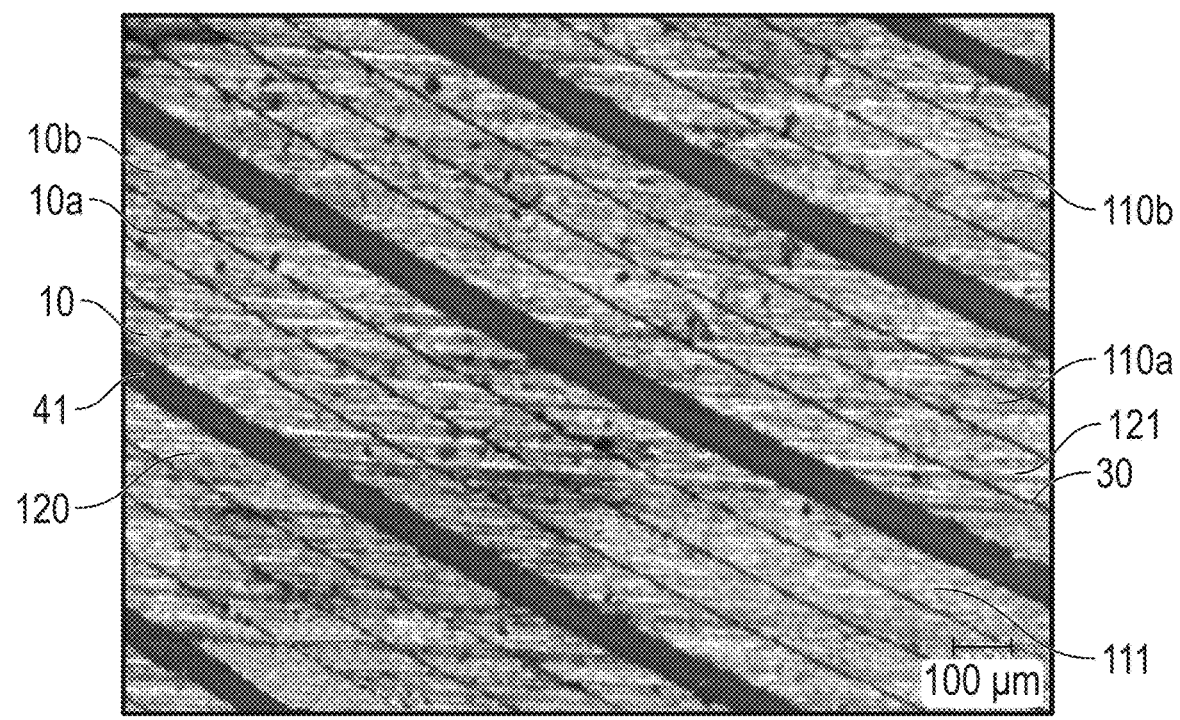
FIG. 7A is a laser intensity image of a portion of a coil.
Figure 7B:
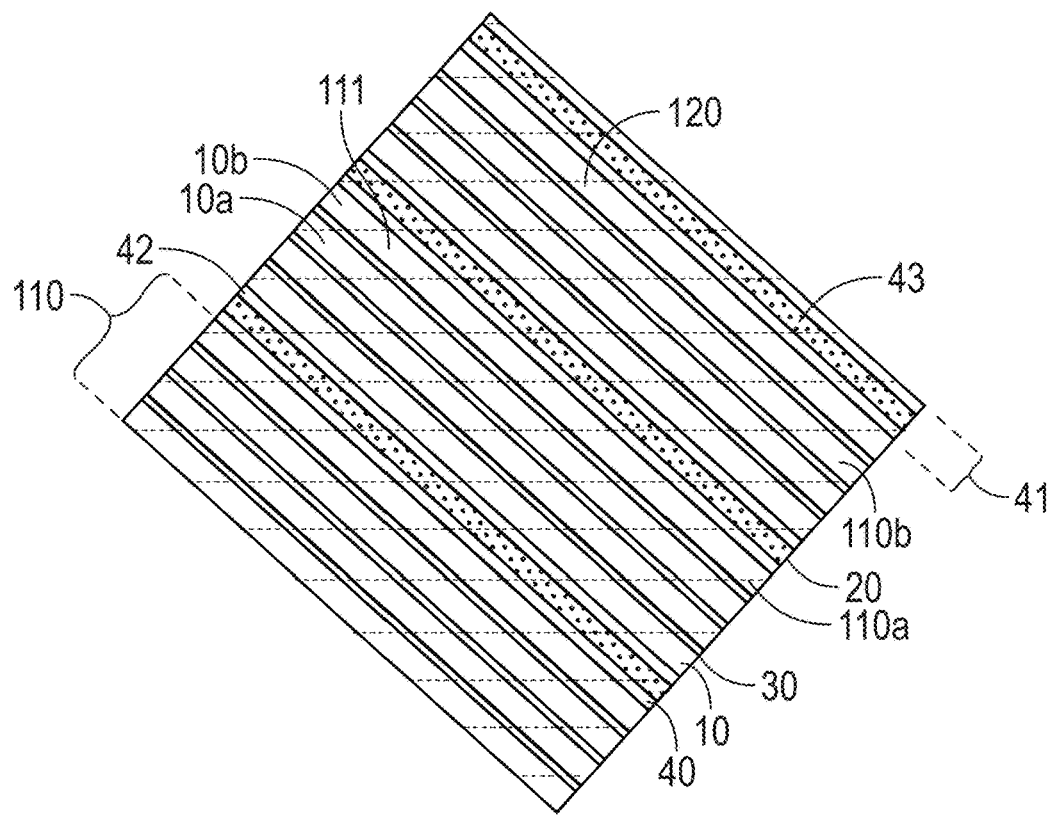
FIG. 7B is a schematic top plan view of a portion of a coil.

FIG. 6 is a top view of an assembly 601 including a coil 600 and a rod or rod section 637. The coil 600 includes a plurality of substantially concentric loops 110. FIG. 7A is a laser intensity image of a portion of a coil corresponding to coil 600 obtained using a Keyence VHX-5000 digital microscope fitted with a Z20 lens at 150× magnification. FIG. 7B is a schematic top plan view of a portion of a coil which may correspond to coil 600. The coil of FIG. 7B is considered to have a curvature large compared to the size of the illustrated portion so that the curvature is not shown in the schematic illustration of FIG. 7B.

In some embodiments, the coil includes a plurality of substantially concentric loops where each loop is a loop of a multilayer film (e.g., loops 110 depicted in FIG. 7B include a plurality of layers 10 and 30). In some embodiments, the coil includes a plurality of substantially concentric loops where each loop is a loop of a first layer (e.g., loops 10a and 10b depicted in FIGS. 7A or 7B are each loops of a single layer 10). In some embodiments, a coil 600 includes a plurality of substantially concentric loops 110, where each loop includes a plurality of substantially concentric alternating metal 10 and first adhesive layers 30 (e.g., each of the loops 110a and 110b depicted in FIGS. 7A or 7B each include alternating layers 10 and 30). In some embodiments, each metal layer includes a non-ferrous metal, and/or is magnetically insulative, and/or is substantially non-magnetic.

A second adhesive layer 41 is disposed between and bonds adjacent loops 110. In some embodiments, the second adhesive layer 41 is thicker than the first adhesive layer 30. In some embodiments, the second adhesive layer 41 is thicker than the first adhesive layer by at least a factor of two, of by at least a factor of four. In some embodiments, the second adhesive layer 41 includes a magnetically conductive filler and/or a thermally conductive filler dispersed in a binder.

In some embodiments, the second adhesive layer 41 includes opposing first and second adhesive portions 40 and 42 on opposite major surfaces of a composite portion 20. The composite portion 20 includes particles or powders 43, which may include magnetically conductive filler particles and/or thermally conductive filler particles, dispersed in a binder (e.g., epoxy). In some embodiments, each of the adhesive portions 40 and 42 and the composite portions 20 include a common type of adhesive material. For example, in some embodiments, each of the adhesive portions 40 and 42 and the composite portion 20 includes epoxy. In some embodiments, the composite portion 20 includes magnetically conductive filler particles dispersed throughout the composite portion 20 in order to increase the relative permeability of the composite portion 20, for example. The particles 43 may be metal particles which may include an iron-silicon-boron-niobium-copper alloy, for example. In some embodiments, the composite portion 20 includes thermally conductive powders dispersed throughout the composite portion 20 in order to increase the thermal conductivity of the composite portion 20, for example. Suitable thermally conductive powers include alumina, AlN, BN or a combination thereof. The powder or particles 43 can be both magnetically and thermally conductive. The powder or particles 43 may have any suitable shape (e.g., at least one of flakes, plates, spheres, ellipsoids, irregularly shaped particles).

In some embodiments, an antenna or coil includes an electrically conductive first layer and an electrically insulative thermally conductive second layer wound to form a plurality of substantially concentric loops. In some embodiments, the layer 41 is an electrically insulative thermally conductive second layer having a thermal conductivity of at least about 0.20 W/(m·K) or at least 0.25 W/(m·K) or in a range of about 0.20 to 0.6 W/(m·K) or to about 0.5 W/(m·K) or to about 0.45 W/(m·K). In some embodiments, the composite portion 20 is an electrically insulative thermally conductive second layer having a thermal conductivity of at least about 0.8 W/(m·K) or at least about 1 W/(m·K). In some embodiments, the thermal conductivity is in a range of about 0.8 to about 7 W/(m·K), or about 0.8 to about 5 W/(m·K), or about 0.8 to about 3 W/(m·K), or about 0.8 to about 2 W/(m·K), or about 0.8 to about 1.4 W/(m·K). In some embodiments, the composite portion 20 include thermally conductive particles having a multimodal particle size distribution. For example, a trimodal particle size distribution can be used to increase the thermal conductivity as described in U.S. Pat. No. 7,643,298 (Kendall), for example. In one example, the composite portion 20 included Sendust dispersed in epoxy at a sufficient loading that the composite portion 20 had a thermal conductivity of 0.91 W/(m·K) while the layer 41, which included epoxy layers on each side of the composite portion 20, had a thermal conductivity of 0.27 W/(m·K). In another example, the composite portion 20 included alumina dispersed in epoxy at a sufficient loading that the composite portion 20 had a thermal conductivity of 1.3 W/(m·K) while the layer 41, which include epoxy layers on each side of the composite portion 20, had a thermal conductivity of 0.45 W/(m·K).

In some embodiments, an antenna or coil includes a plurality of substantially concentric loops 110, where each loop includes a plurality of substantially concentric alternating metal 10 and first adhesive layers 30, and where a second adhesive layer 41 is disposed between and bonds adjacent loops. In some embodiments, the second adhesive layer thicker than the first adhesive layer (e.g., by at least a factor of 2 or 4). In some embodiments, each of the first and second adhesive portions 40 and 42 is thicker than each first adhesive layer 30. In some embodiments, the composite portion 20 is thicker than each of the first and second adhesive portions 40 and 42. In some embodiments, the first and second adhesive portions 40 and 42 have a substantially (e.g., to within 20%, or to within 10%, or to within 5%) same thickness.

In some embodiments, the antenna or coil includes a multilayer film wound to form a plurality of substantially concentric loops, where the multilayer film includes an electrically insulative thermally conductive first layer 20 and a plurality of alternating second 10 and third 30 layers. The first layer 20 is bonded to the plurality of alternating second 10 and third 30 layers through and adhesive layer 40. Adjacent loops are bonded together through adhesive layer 42. In some embodiments, the adhesive layer 42 is thicker than each layer 30. In some embodiments, the adhesive layer 42 is thicker than each layer 30 by at least a factor of 1.5, or by at least a factor of 2.

FIGS. 8A-8B are a laser intensity image and a topographical map, respectively, of a coil or antenna 800 in a first region (e.g., corresponding to first region 125 depicted in FIG. 3B) of the antenna 800 in a top plan view (e.g., in the x-y plane referring to the x-y-z coordinate system depicted in FIG. 8A) obtained using a Keyence VK-X200 confocal microscope with a 20× objective. In some embodiments, the antenna 800 is for transfer of information or energy and includes a plurality of substantially concentric loops 110 where each loop includes a metal layer 10. In some embodiments, each loop 110 includes a plurality of metal layers 10 (e.g., four metal layers 10 in the illustrated embodiment). Coil or antenna 800 was made from a multilayer film including 4 copper layers bonded together with 10 micron thick epoxy adhesive layers 30, and an adhesive layer 41 which included a composite layer (e.g., corresponding to layer 20 depicted in FIG. 7B) having a thickness of about 60 micrometers bonded to the copper layers with a 20 micron thick epoxy adhesive layer (e.g., corresponding to layer 40 depicted in FIG. 7B) and having a 20 micron thick epoxy adhesive layer (e.g., corresponding to layer 42 depicted in FIG. 7B) for bonding adjacent loops of the multilayer film together. The copper layers had a thickness of about 105 microns. The composite layer included flakes of magnetic metal (Sendust) dispersed in epoxy. Additional filler, such as substantially non-magnetic thermally conductive filler, could be added to the composite layer. The coil or antenna 800 was made by winding the multilayer film around a rod to form a plurality of substantially concentric loops and slicing the coil or antenna 800 from the resulting assembly using a diamond wire saw as described further elsewhere herein.

Figure 9:
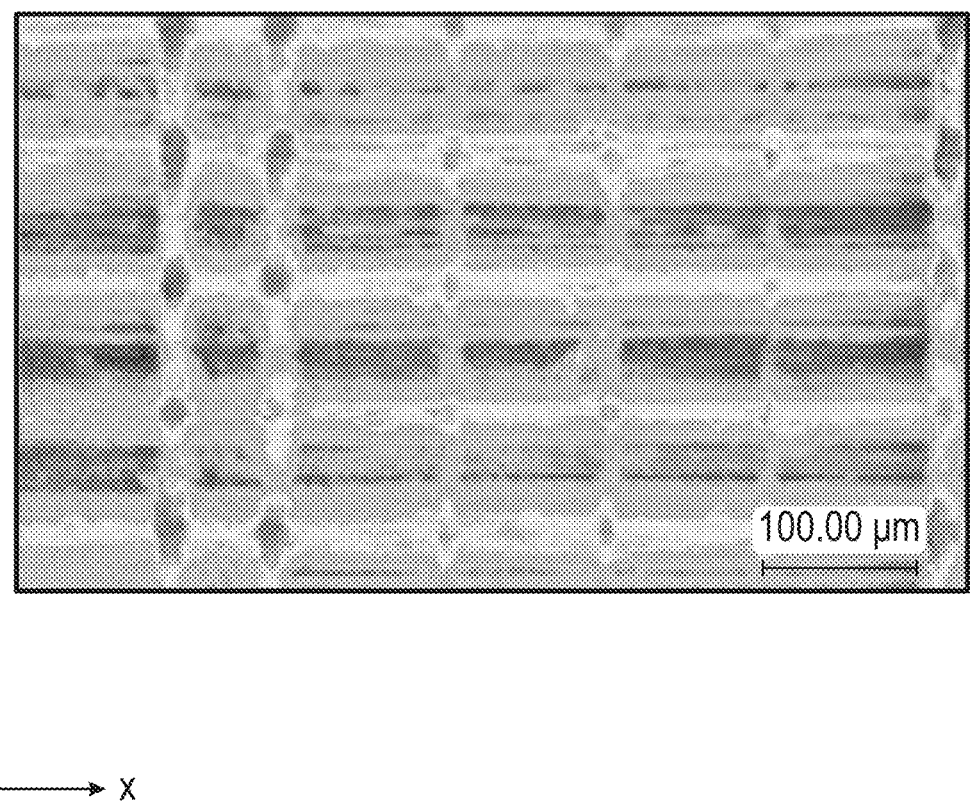
FIG. 9 is a topographical map of a portion of the first region of the coil of FIGS. 8A-8B.
Figure 10:
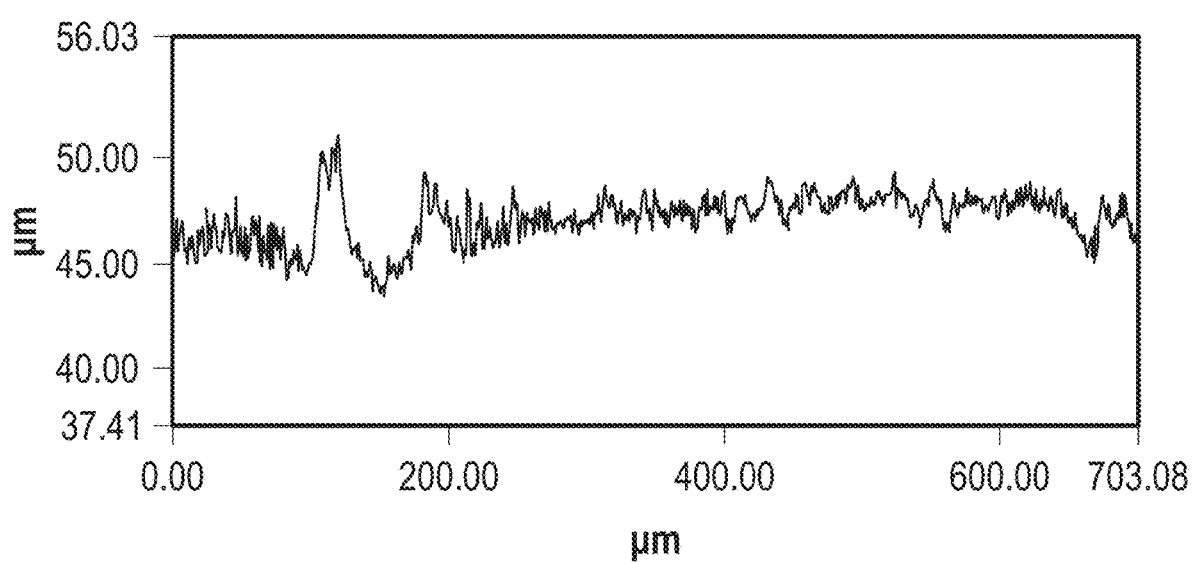
FIG. 10 is a plot of the topography in the first region of the coil of FIGS. 8A-8B along a first direction.
Figure 11:
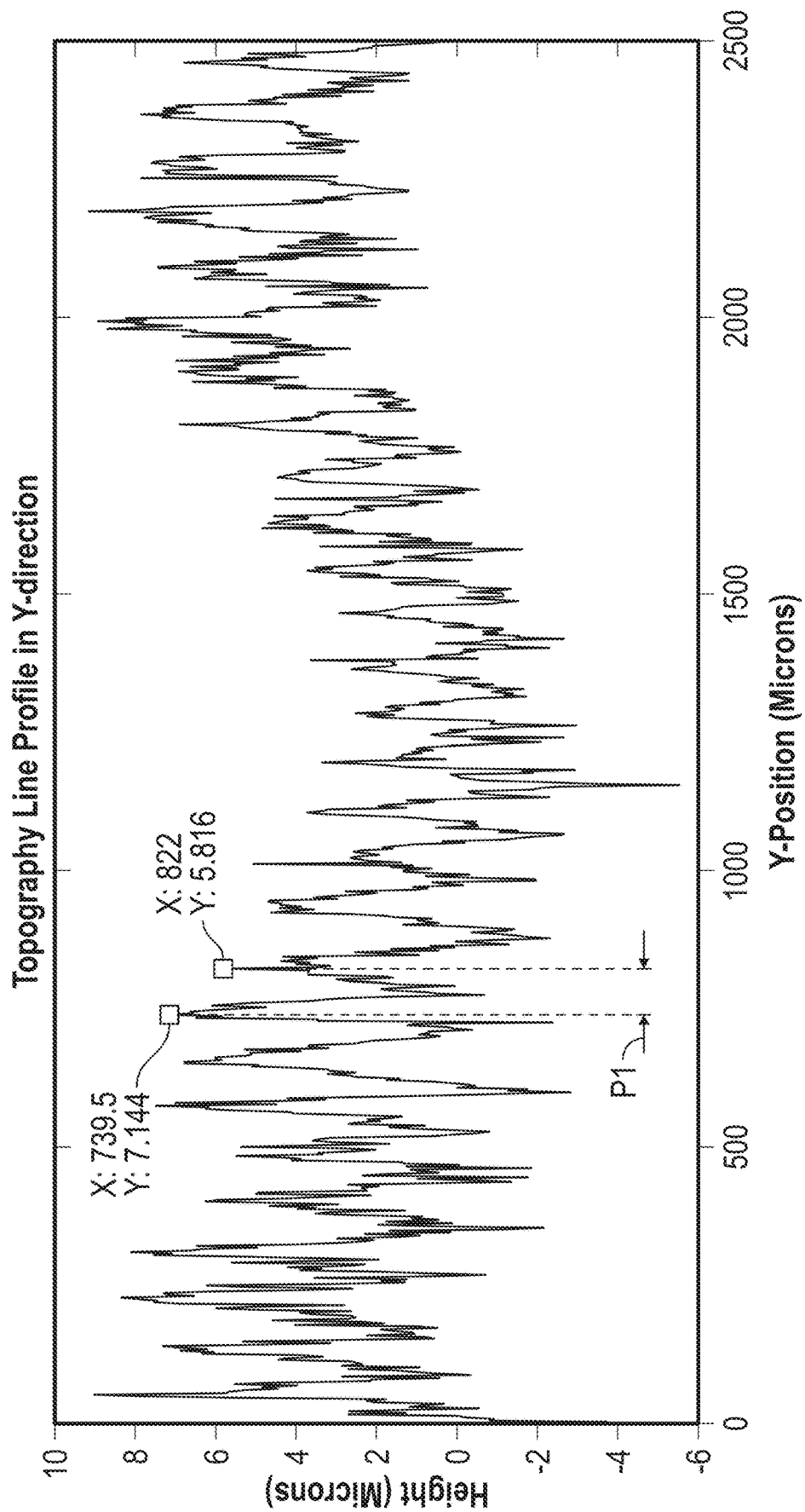
FIG. 11 is a plot of the topography in the first region of the coil of FIGS. 8A-8B along an orthogonal second direction.

FIG. 9 is a topographical map of a portion of the first region obtained using the Keyence VK-X200 confocal microscope. FIG. 10 is a plot of the topography (height of surface relative to a reference plane) along the x-direction and FIG. 11 is a plot of the topography (height) along the y-direction in the first region. The plots in FIGS. 10-11 were extracted from the topological map obtained using the Keyence VK-X200 confocal microscope. It can be seen in FIGS. 8A-9 that an optical pattern is present in both the x- and y-directions. It can be seen in FIG. 10 that there is substantially no topographical pattern along the y-direction across the plurality of metal layers. It can be seen in FIG. 11 that there is a substantial topographical pattern along the y-direction across the plurality of metal layers. The topological pattern in the first region had an average pitch P1 in the y-direction of about 89 microns (determined by approximating the average pitch as the inverse of the corresponding Fourier transform peak frequency). In some embodiments, in a plan view (e.g., in the x-y plane) and in at least one first region 125 of the antenna or coil, the antenna or coil includes a regular optical and topographical pattern 120 along a first direction (y-direction), and a regular optical, but not topographical, pattern along an orthogonal second direction (x-direction). In some embodiments, in a top plan view and in at least one first region 125 of the antenna or coil, the antenna or coil includes a first regular optical and topographical pattern 120 along a first direction (y-direction), and a first regular optical, but not topographical, pattern along an orthogonal second direction (x-direction); and in a bottom plan view and in at least one first region 125 of the antenna or coil, the antenna or coil includes a second regular optical and topographical pattern 120*b* (schematically depicted in FIG. 3C) along the first direction, and a second regular optical, but not topographical, pattern along an orthogonal second direction.

In some embodiments, the regular optical and topographical pattern 120 and/or 120*b* includes a regular pattern of substantially parallel grooves extending along the second direction and spaced apart along the first direction. In some embodiments, the regular pattern of substantially parallel grooves extends across substantially the entire antenna or coil, and the regular pattern of substantially parallel grooves has a first average pitch in a first region of the antenna or coil and has a different second average pitch in a different second region of the antenna or coil. In some embodiments, the regular pattern of substantially parallel grooves extends across substantially the entire antenna and a Fourier transform of the regular pattern of substantially parallel grooves has a peak at a first spatial frequency in a first region of the antenna and a peak at a different second spatial frequency in a different second region of the antenna.

Figure 12:
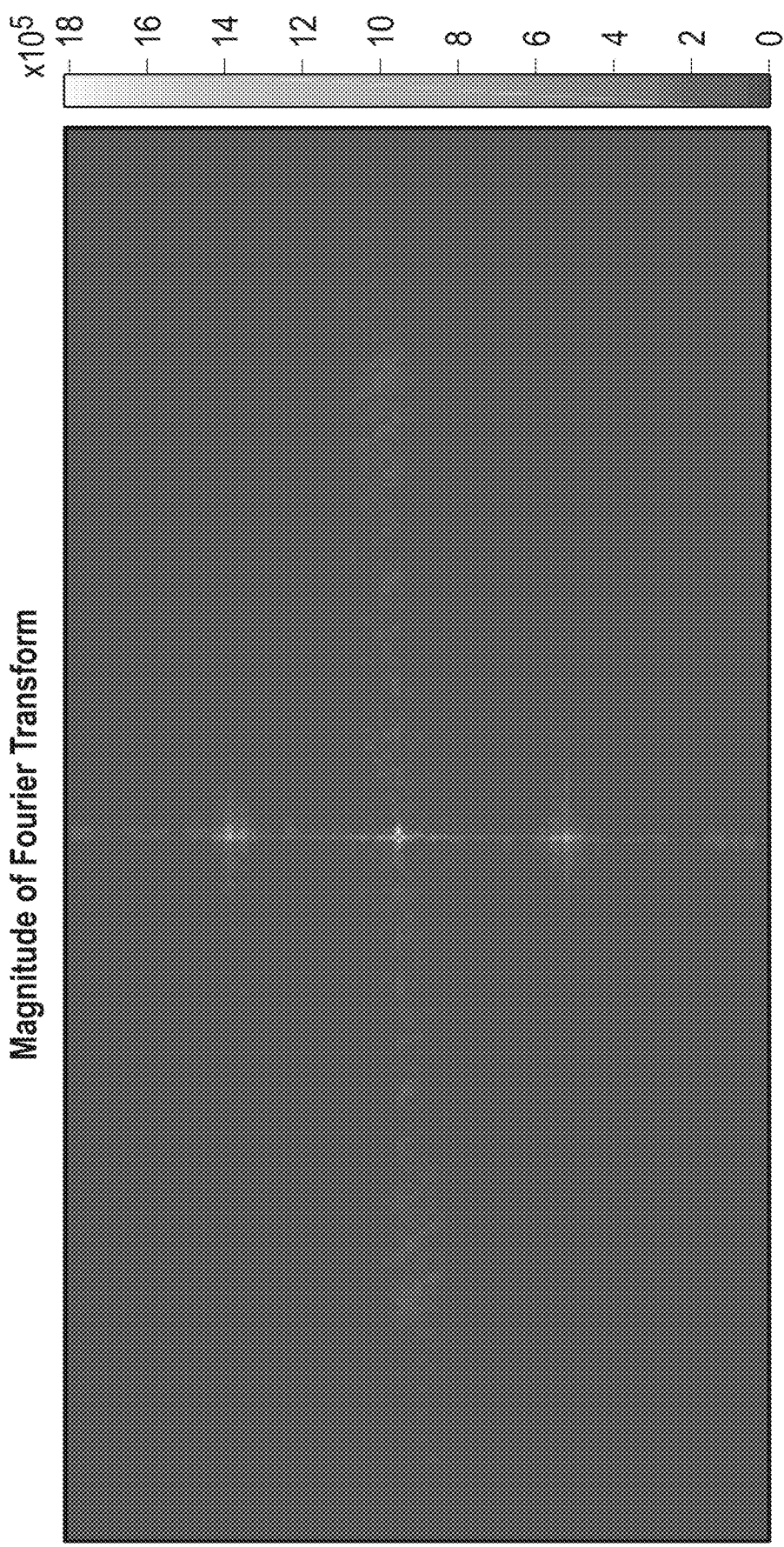
FIG. 12 is a plot of the magnitude of a two-dimensional Fourier transform of the surface topography in the first region of the coil of FIGS. 8A-8B.
Figure 13:
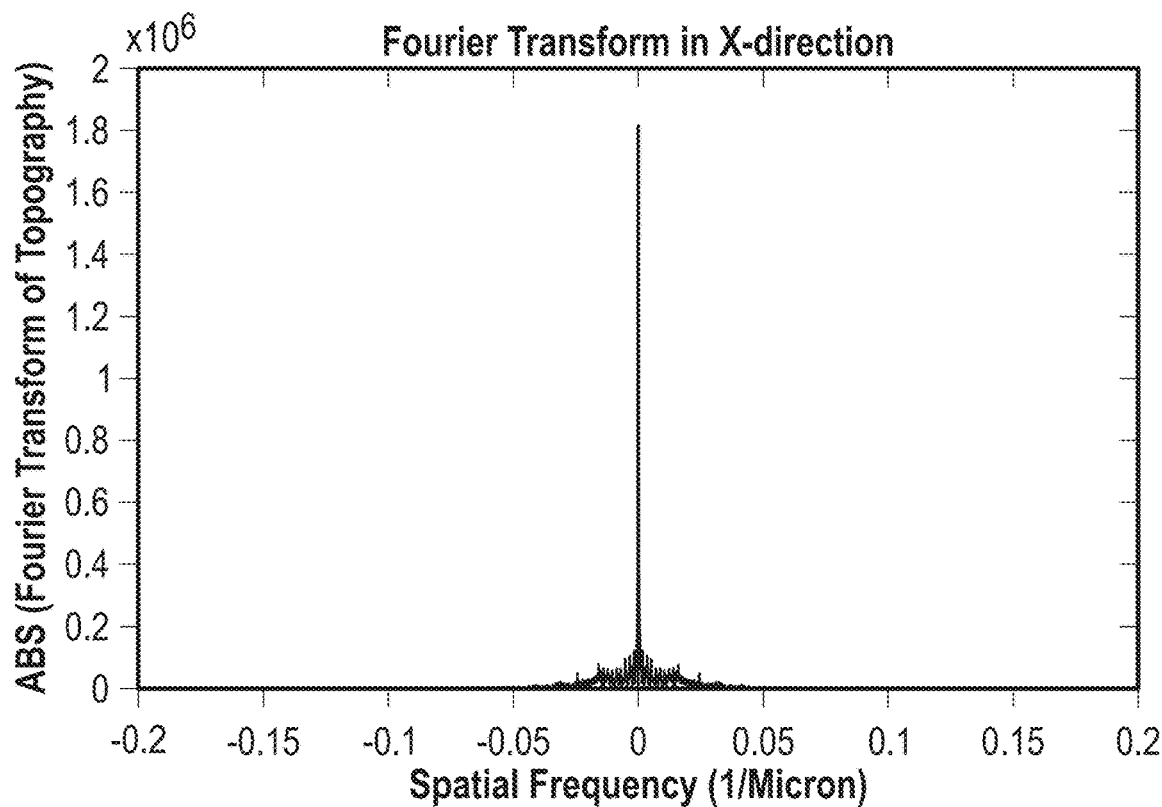
FIG. 13 is a plot of the magnitude of Fourier transform of the surface topography along the first direction in the first region of the coil of FIG. 12.
Figure 14:
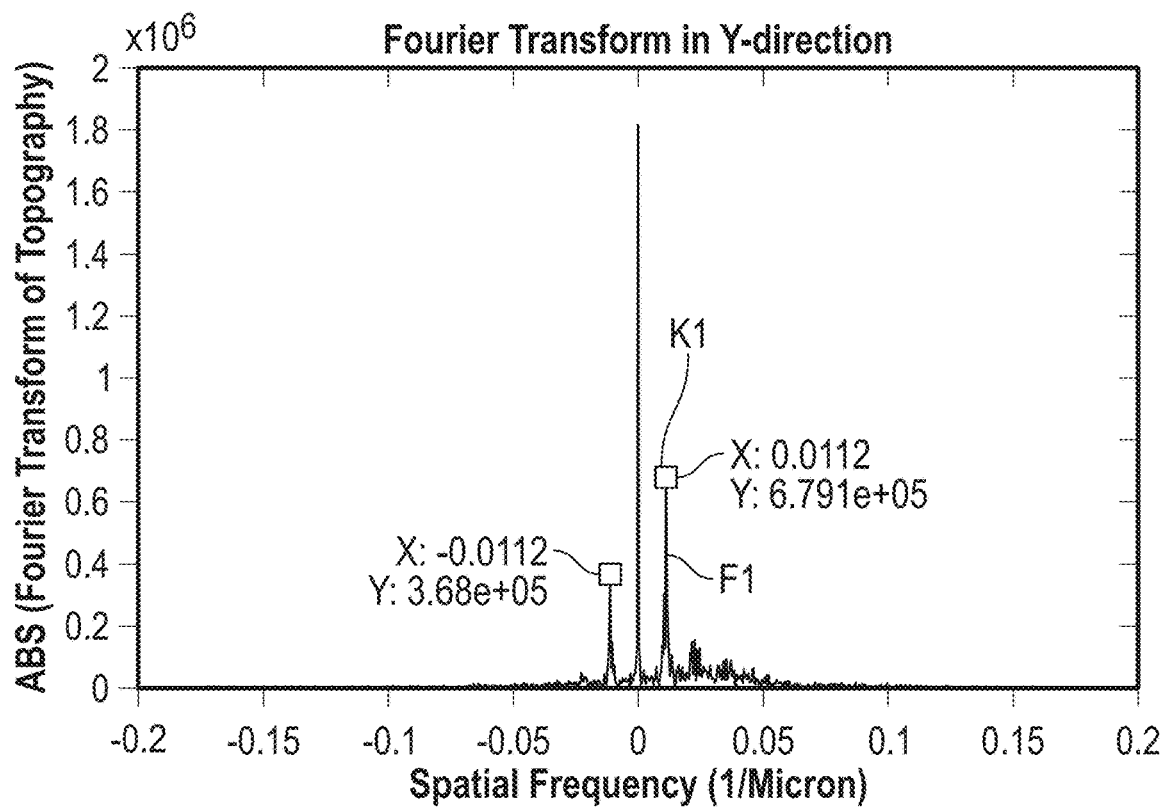
FIG. 14 is a plot of the magnitude Fourier transform of the surface topography along the second direction in the first region of the coil of FIG. 12.

FIG. 12 is a plot of the magnitude of a two-dimensional Fourier transform of the surface topography in the first region. FIG. 13 is a plot of the magnitude of Fourier transform along the x-direction and FIG. 14 is a plot of the magnitude Fourier transform along the y-direction in the first region. The Fourier transform along the y-direction has a peak K1 at a spatial frequency F1. The peak K1 is indicative of the periodic pattern shown in FIG. 11. The peak K1 is substantially spaced apart from any neighboring peak. The Fourier transform along the x-direction shown in FIG. 13 does not have a peak at a non-zero spatial frequency that is substantially spaced apart from any neighboring peak. This indicates a lack of a topological pattern along the x-direction.

Figure 15B:
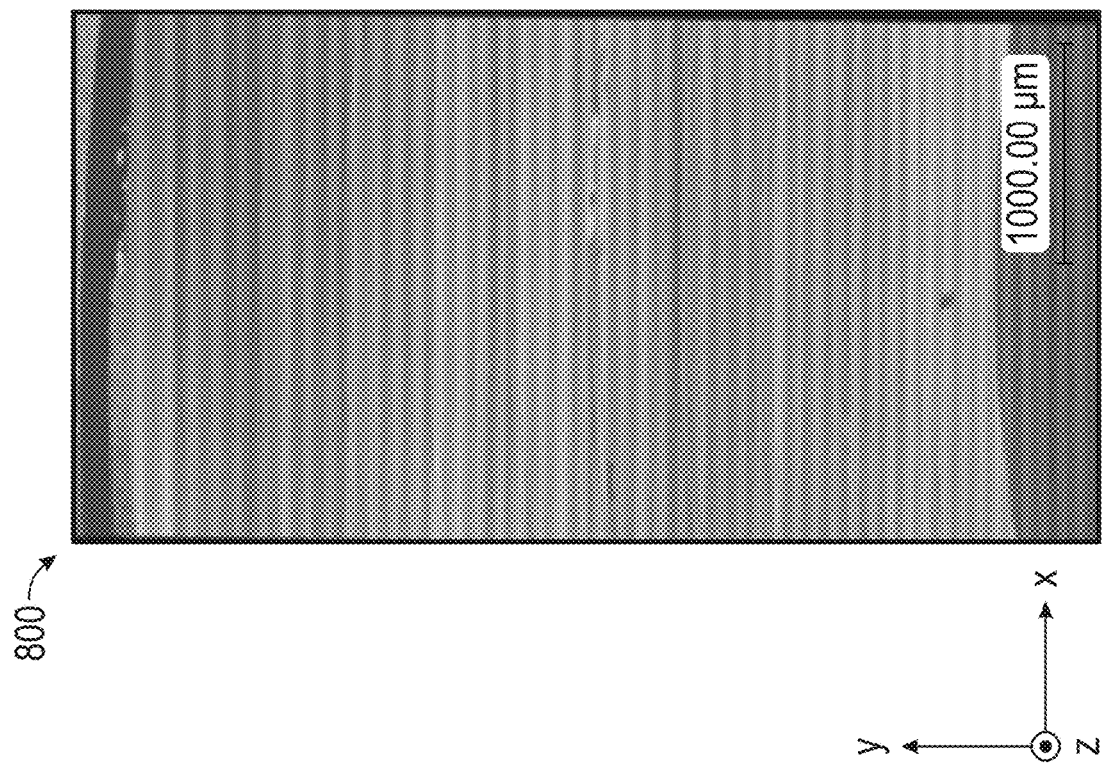
FIGS. 15A-15B are a laser intensity image and a topographical map, respectively, of a second region of the coil of FIGS. 8A-8B.
Figure 15A:
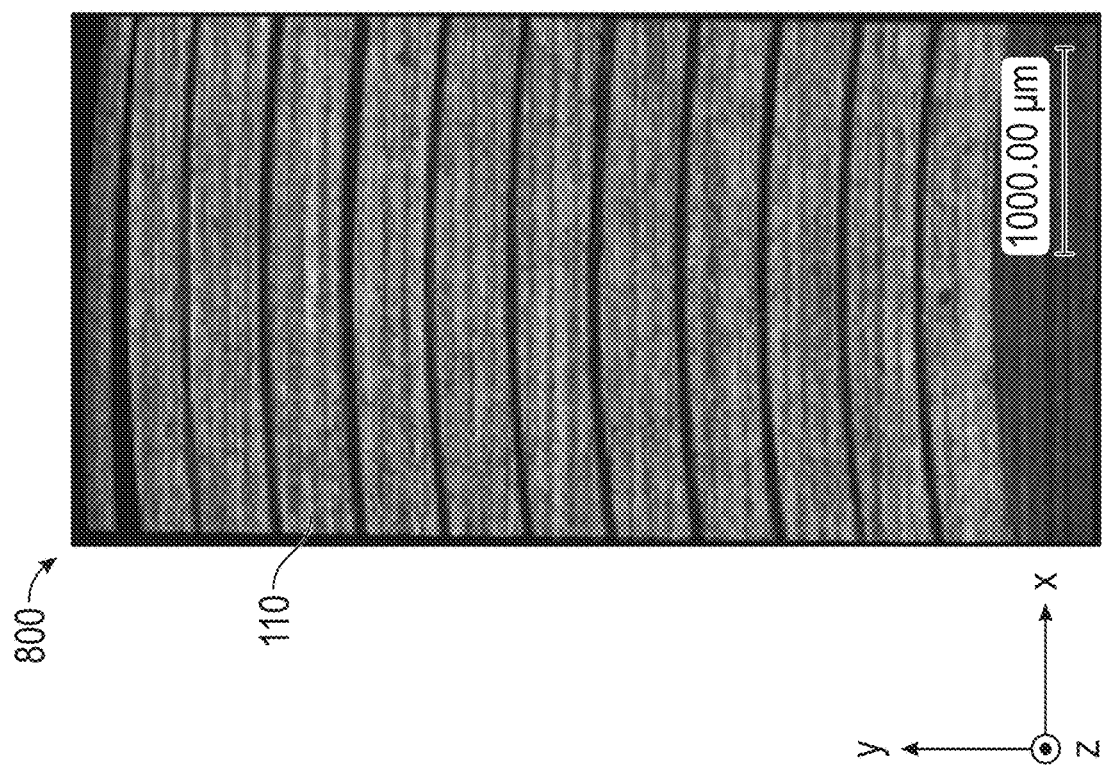
Figure 16:
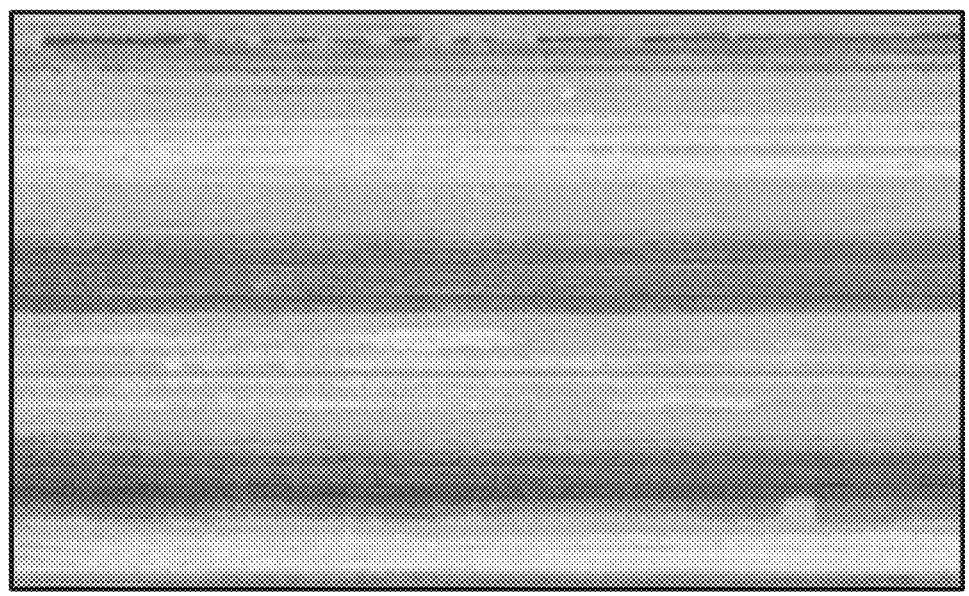
FIG. 16 is a topographical map of a portion of the second region of the coil of FIGS. 15A-15B.
Figure 17:
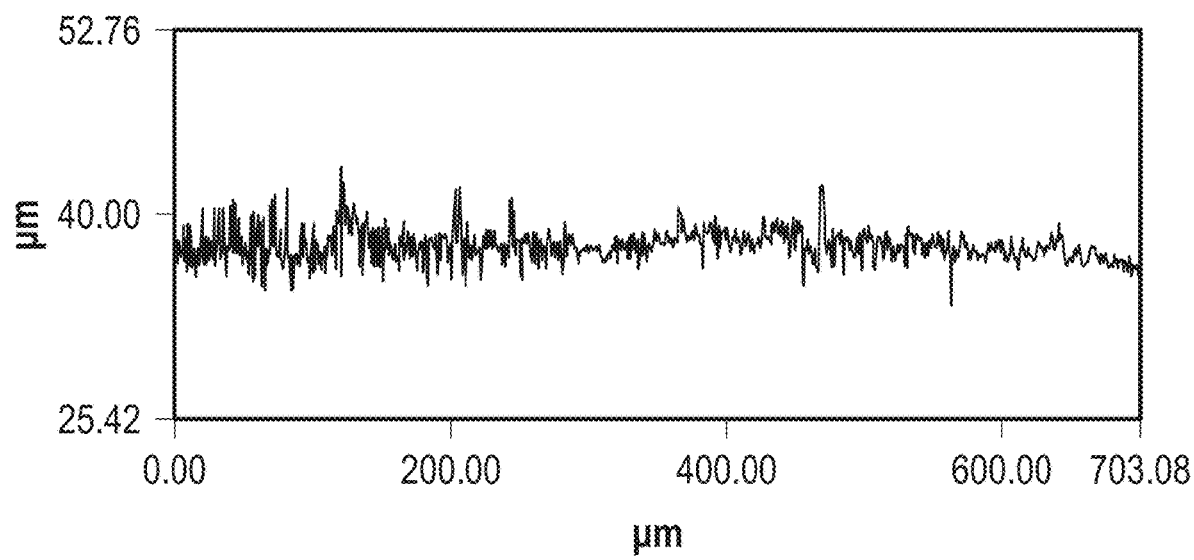
FIG. 17 is a plot of the topography in the second region of the coil of FIGS. 15A-15B along the first direction.
Figure 18:
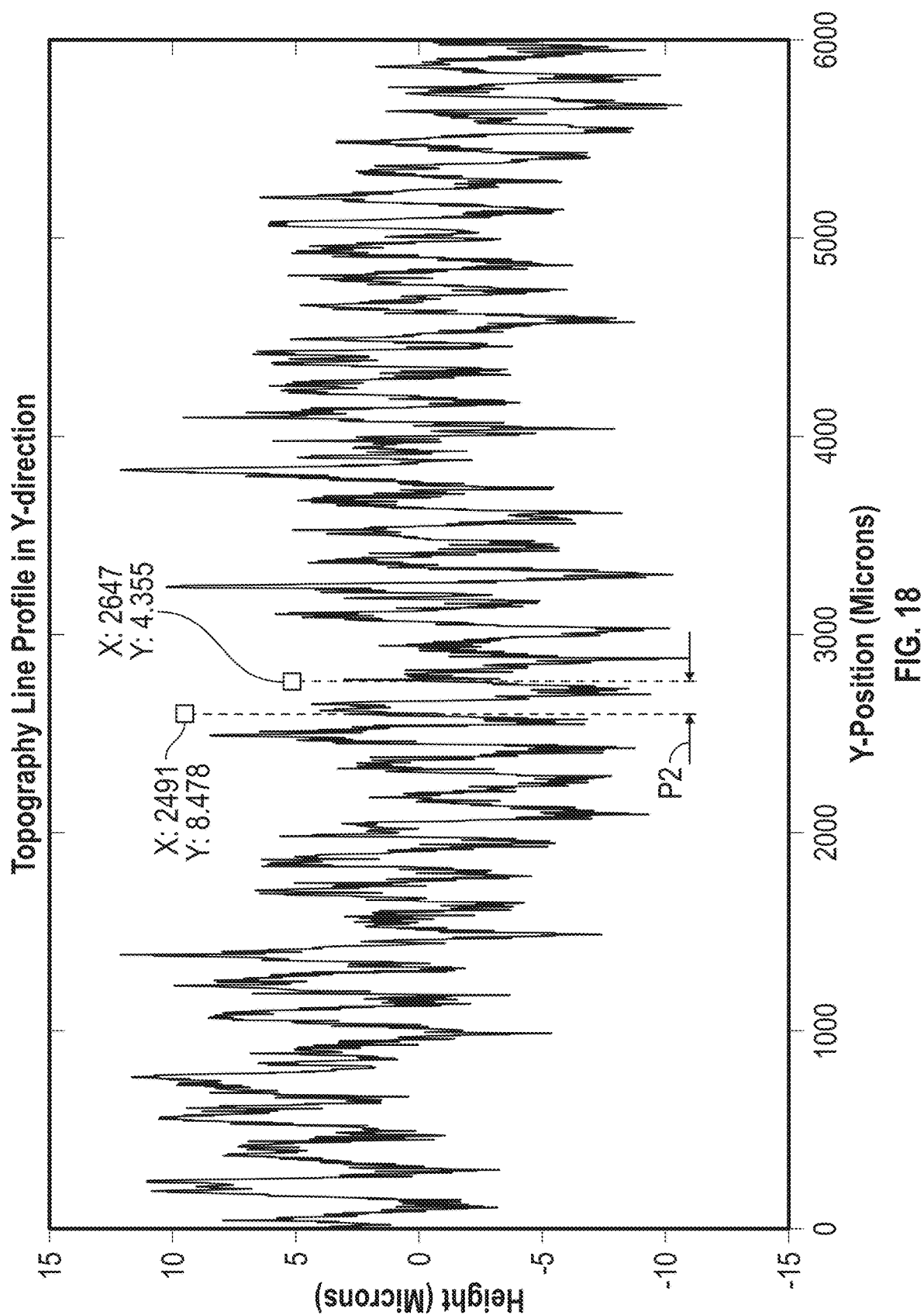
FIG. 18 is a plot of the topography in the second region of the coil of FIGS. 15A-15B along the second direction.

FIGS. 15A-15B are a laser intensity image and a topographical map, respectively, of the coil or antenna 800 in a second region (e.g., corresponding to second region 130 depicted in FIG. 3B) of the coil or antenna 800 in a top plan view obtained using the Keyence VK-X200 confocal microscope. FIG. 16 is a topographical map of a portion of the second region. FIG. 17 is a plot of the height along the x-direction and FIG. 18 is a plot of the height along the y-direction in the second region. The topological pattern in the second region had an average pitch P2 in the y-direction of about 152 microns.

Figure 19:
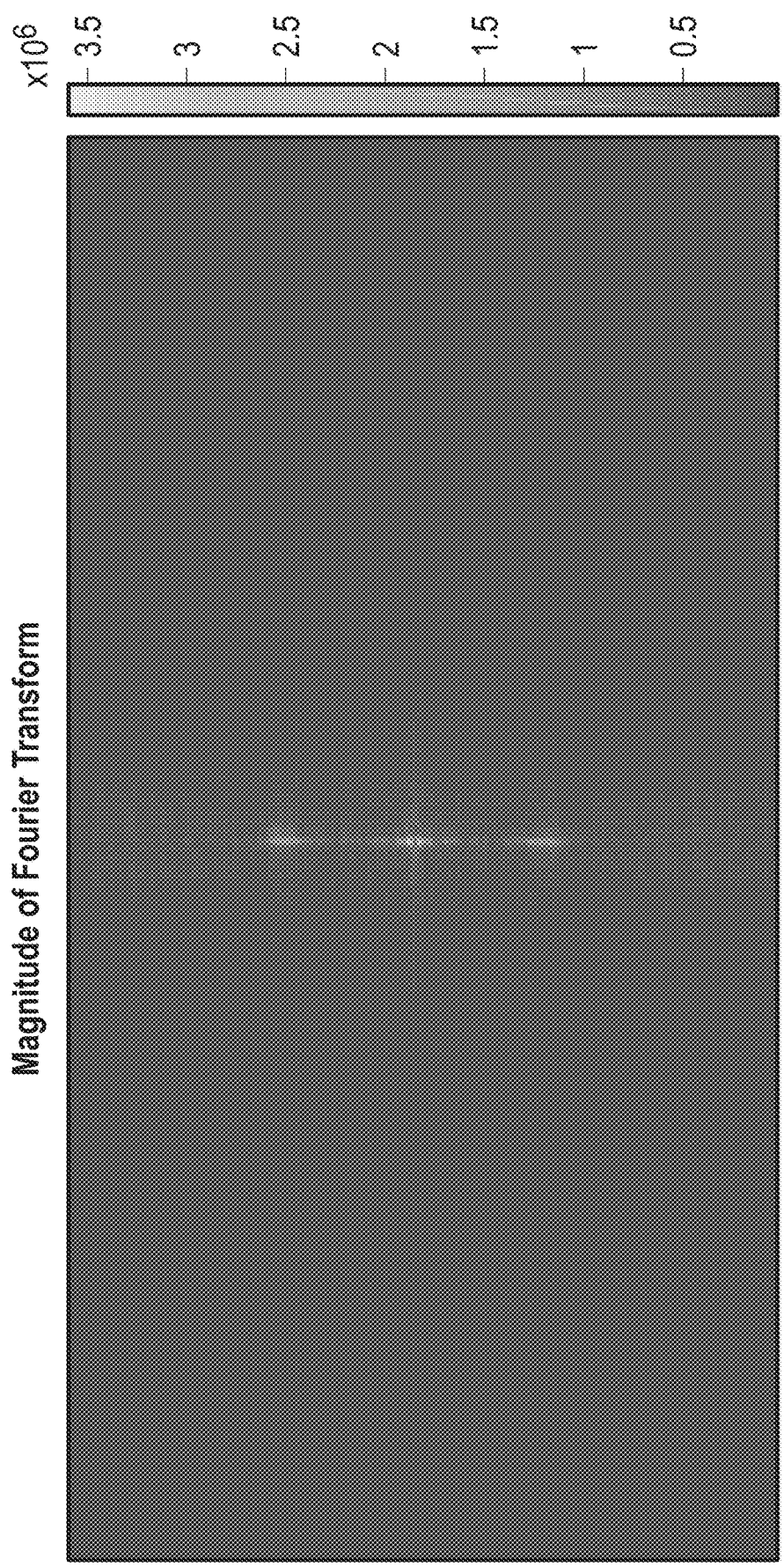
FIG. 19 is a plot of the magnitude of the Fourier transform of the surface topography in the second region of the coil of FIGS. 15A-15B.
Figure 20:
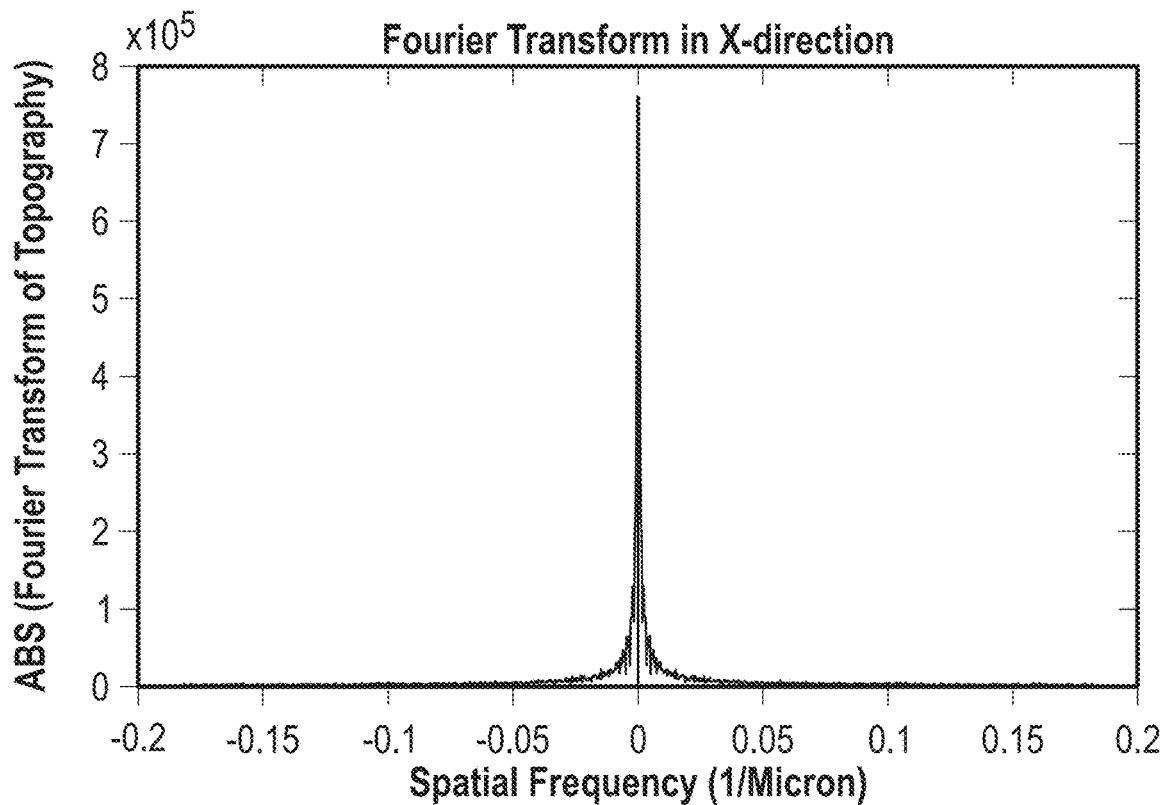
FIG. 20 is a plot of the magnitude Fourier transform of the surface topography in the second region of the coil of FIGS. 15A-15B along the first direction.
Figure 21:
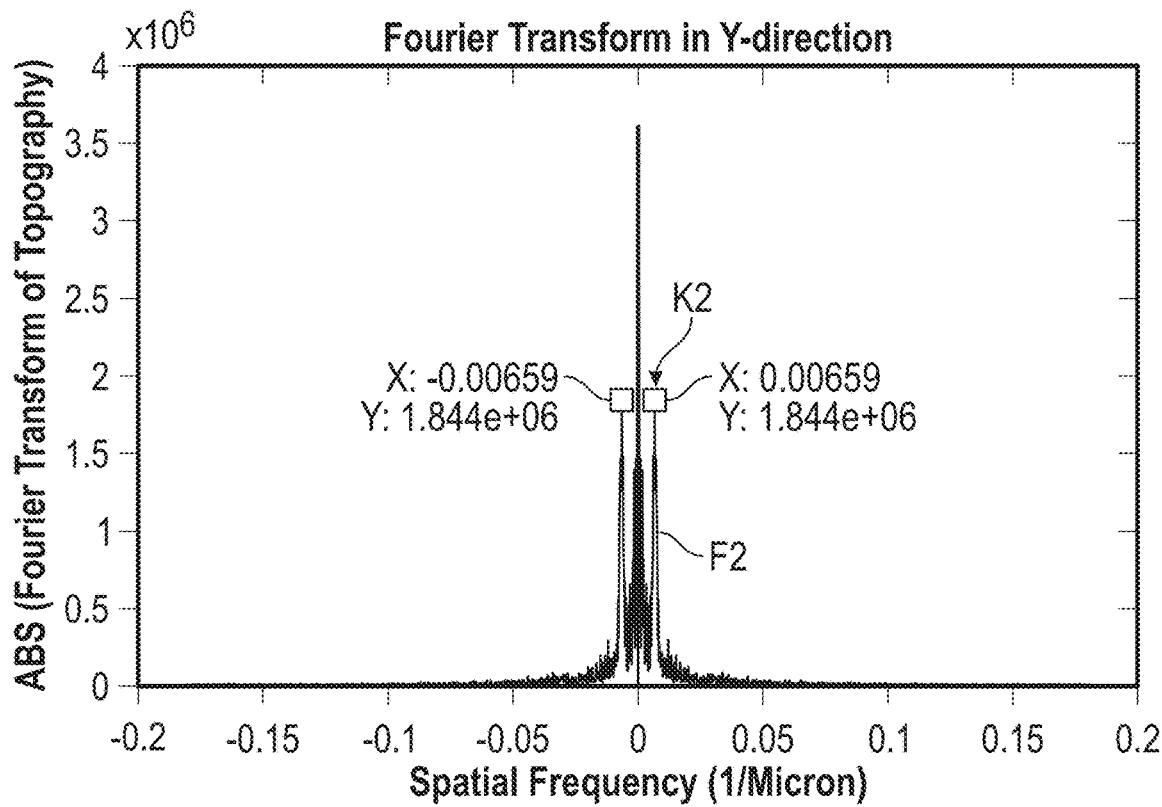
FIG. 21 is a plot of the magnitude Fourier transform of the surface topography in the second region of the coil of FIGS. 15A-15B along the second direction.

FIG. 19 is a plot of the magnitude of the Fourier transform of the surface topography in the second region. FIG. 20 is a plot of the magnitude Fourier transform along the x-direction and FIG. 21 is a plot of the magnitude Fourier transform along the y-direction in the second region. The Fourier transform along the y-direction has a peak K2 at a spatial frequency F2. The peak K2 is indicative of the periodic pattern shown in FIG. 18. The peak K2 is substantially spaced apart from any neighboring peak having a similar magnitude. The Fourier transform along the x-direction shown in FIG. 20 does not have any such peaks; this indicates a substantial absence of a topological pattern along the x-direction.

Figure 22A:
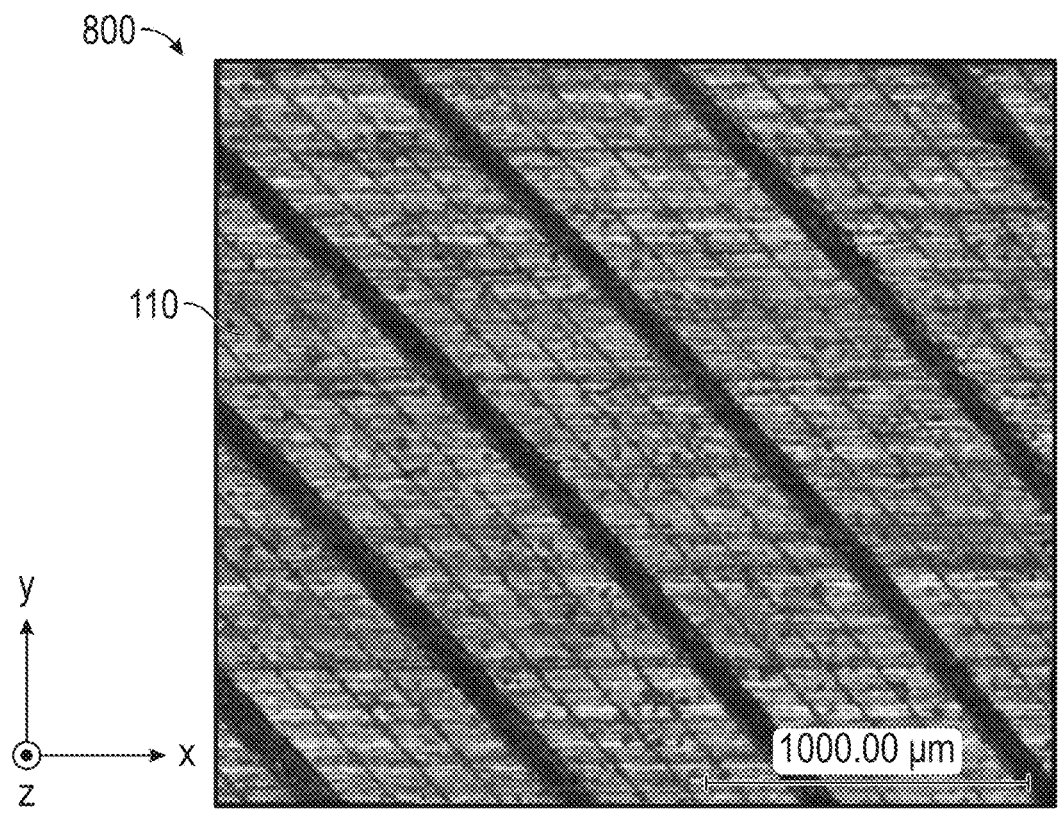
FIGS. 22A-22B are a laser intensity image and a topographical map, respectively, of a third region of the coil of FIGS. 8A-8B.
Figure 22B:
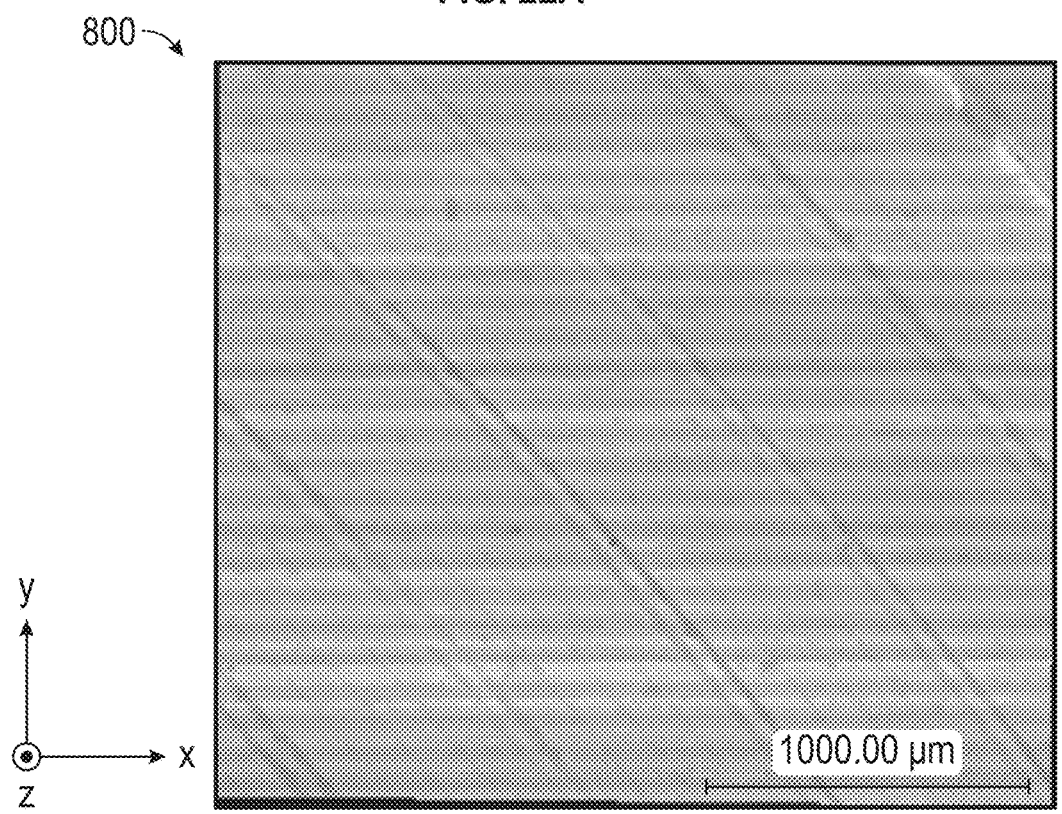
Figure 23:
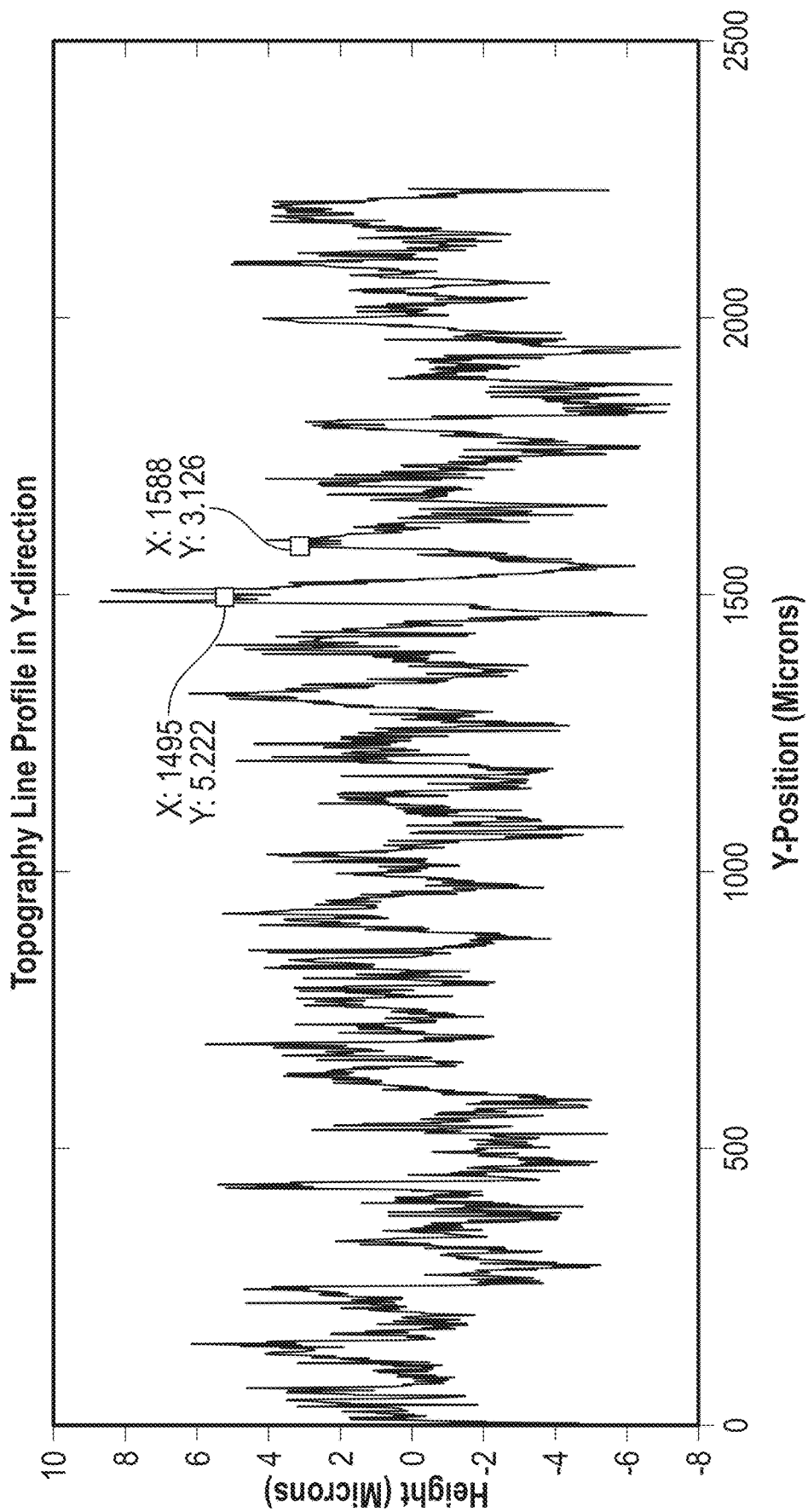
FIG. 23 is a plot of the topography in the third region of the coil of FIGS. 22A-22B along the second direction.
Figure 24:
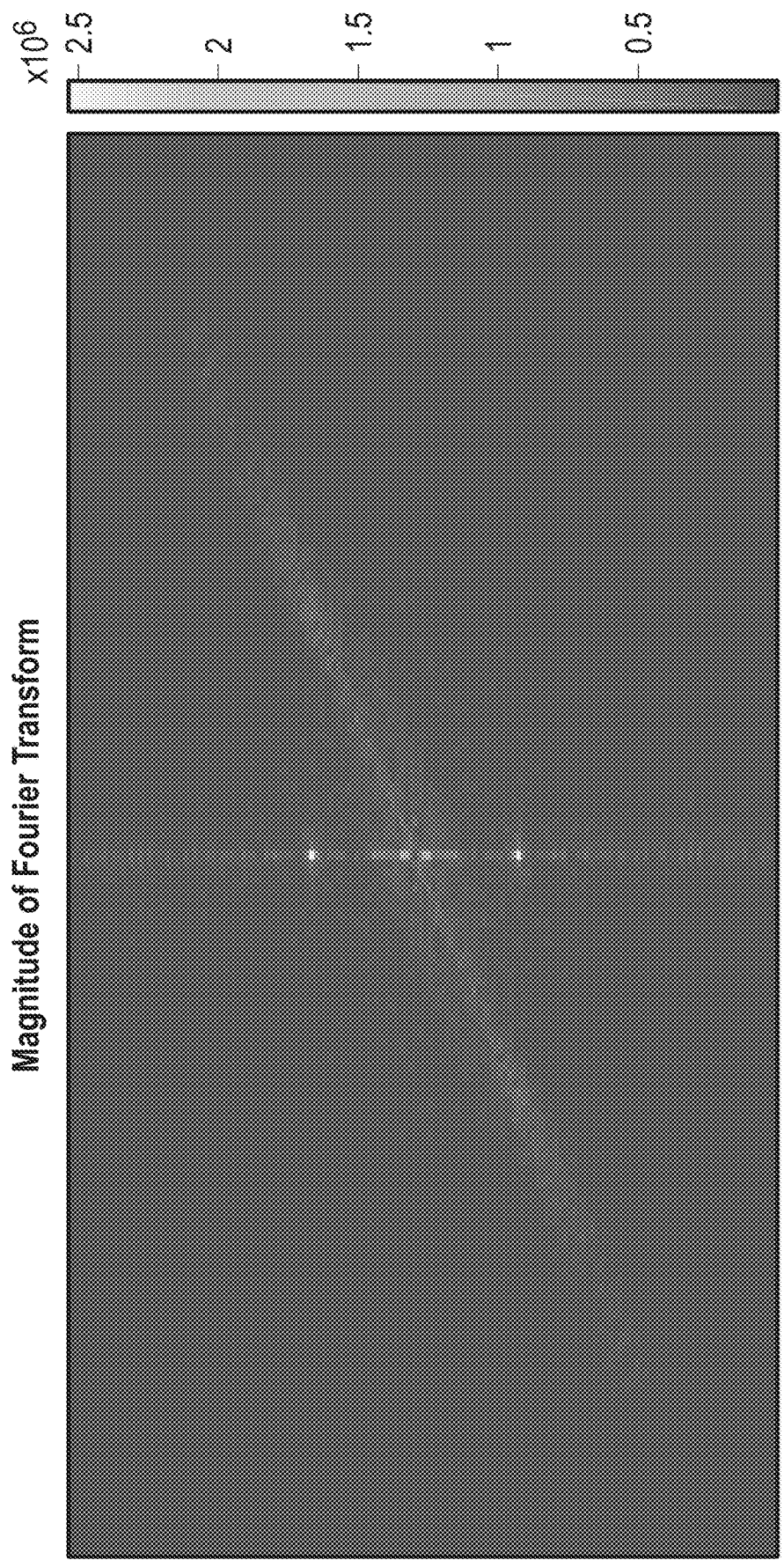
FIG. 24 is a plot of the magnitude of the Fourier transform of the surface topography in the third region of the coil of FIGS. 22A-22B.
Figure 25:
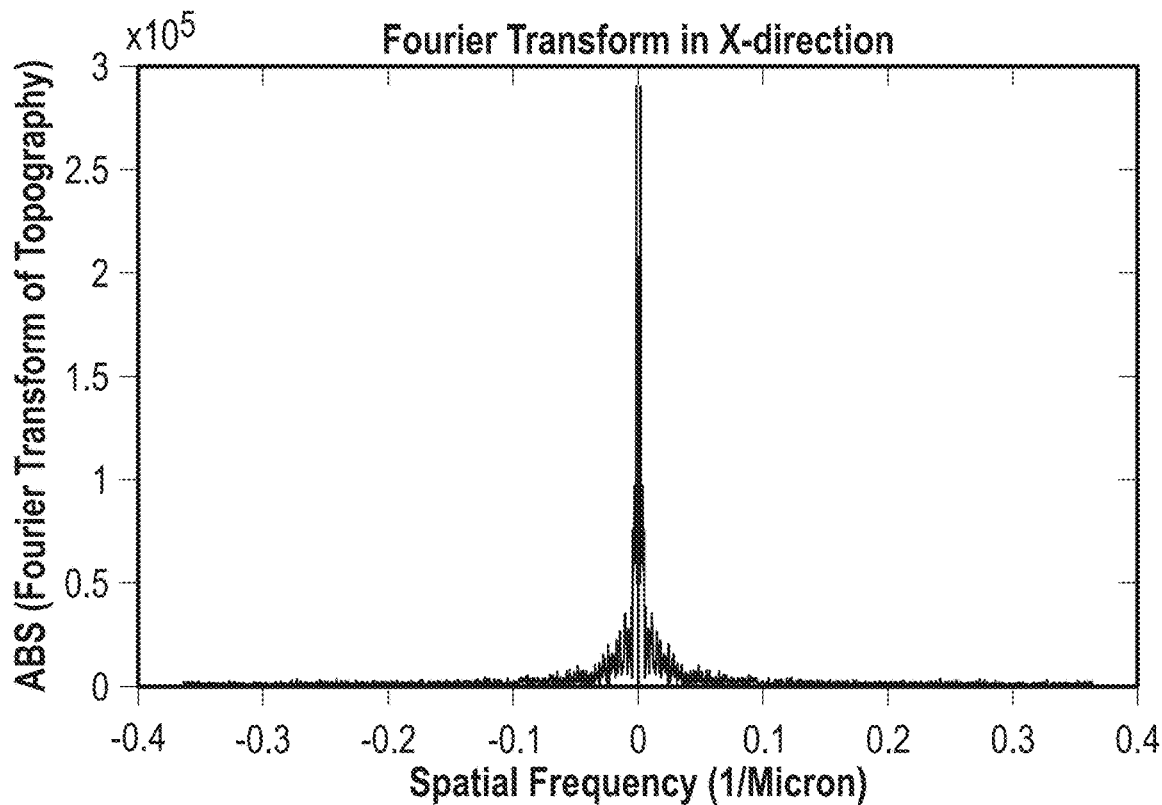
FIG. 25 is a plot of the magnitude of the Fourier transform of the surface topography in the third region of the coil of FIGS. 22A-22B along the first direction.
Figure 26:
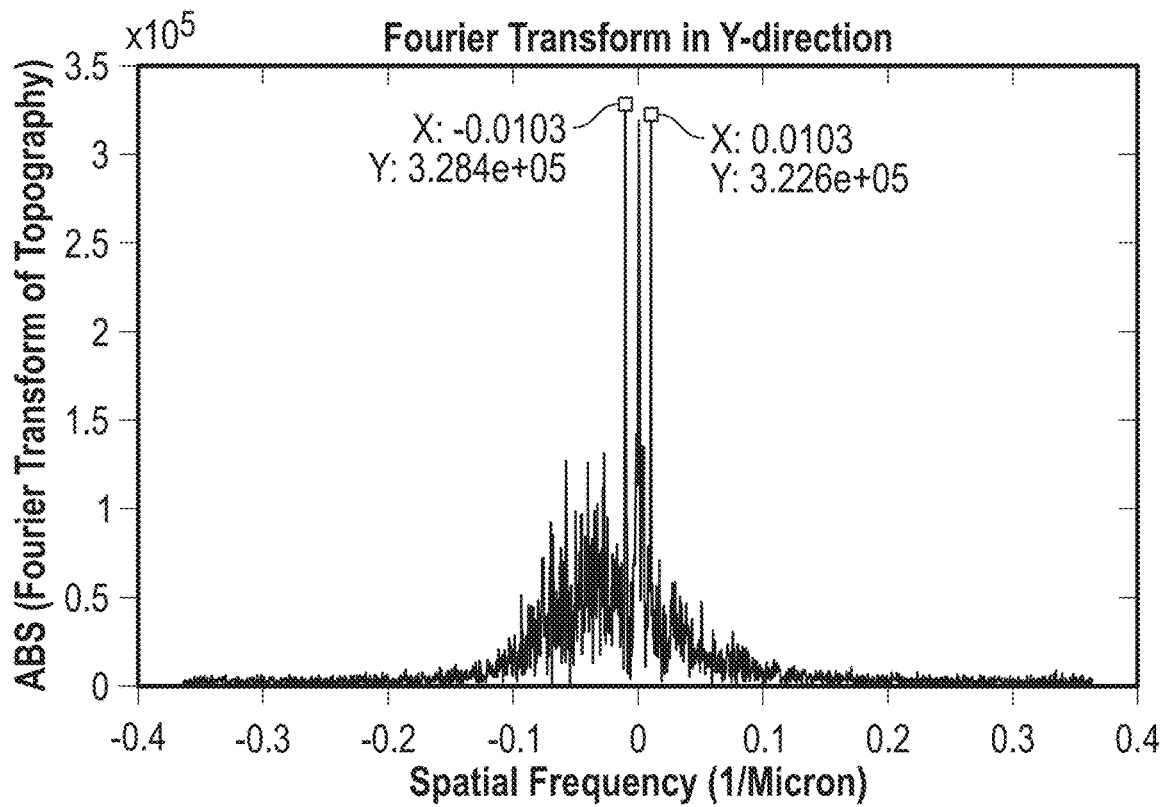
FIG. 26 is a plot of the magnitude of the Fourier transform of the surface topography in the third region of the coil of FIGS. 22A-22B along the second direction.

FIGS. 22A-22B are a laser intensity image and a topographical map, respectively, of the coil or antenna 800 in a third region (e.g., corresponding to third region 131 depicted in FIG. 3B) of the coil or antenna 800 in a top plan view obtained using the Keyence VK-X200 confocal microscope. FIG. 23 is a plot of the height along the y-direction. A periodic structure having an average pitch in the y-direction of about 97.1 microns is visible. FIG. 24 is a plot of the magnitude of the Fourier transform of the surface topography in the third region. FIG. 25 is a plot of the magnitude of the Fourier transform along the x-direction and FIG. 26 is a plot of the magnitude of the Fourier transform along the y-direction in the third region. The pair of large peaks proximal to the zero-frequency peak in FIG. 26 are indicative of a periodic structure along the y-direction.

Figure 27A:
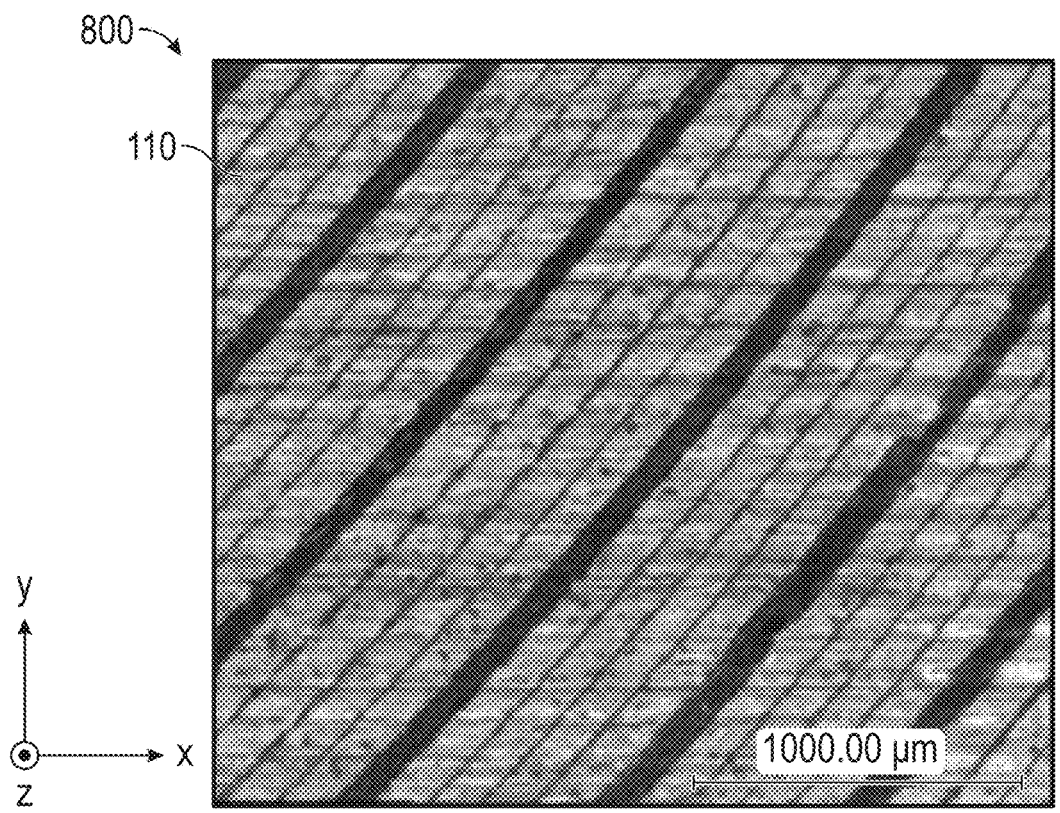
FIGS. 27A-27B are a laser intensity image and a topographical map, respectively, in a fourth region of the coil of FIGS. 8A-8B.
Figure 27B:
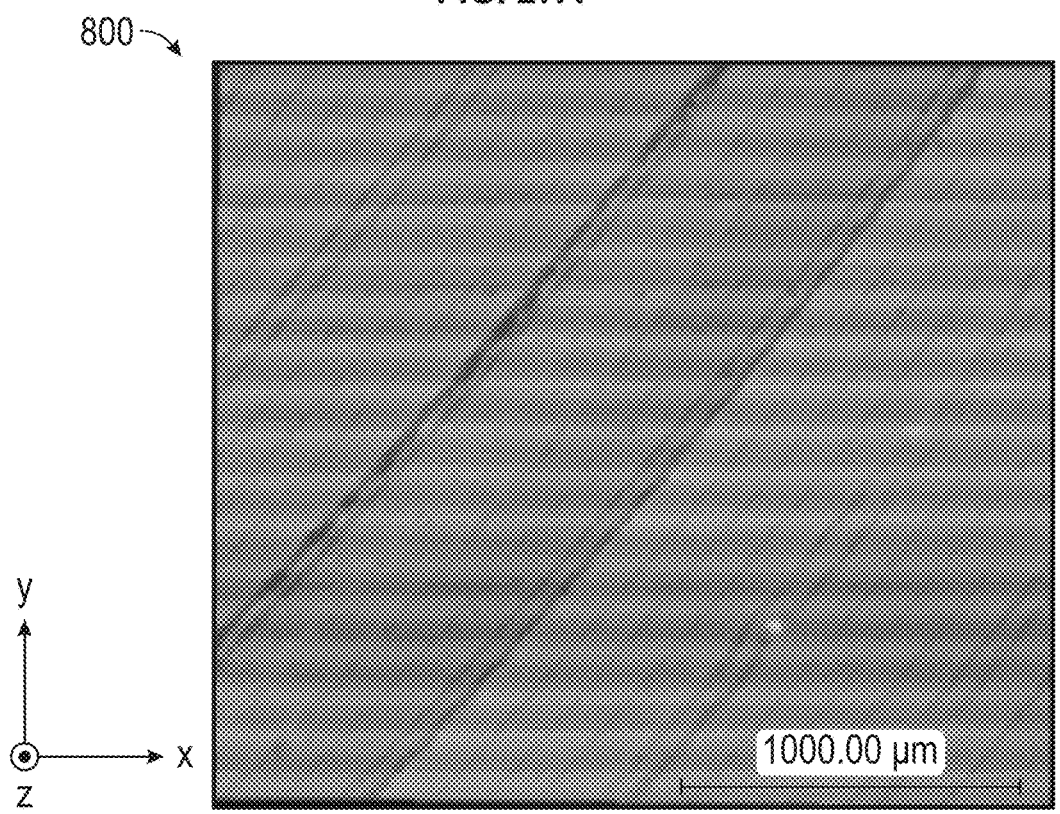
Figure 28:
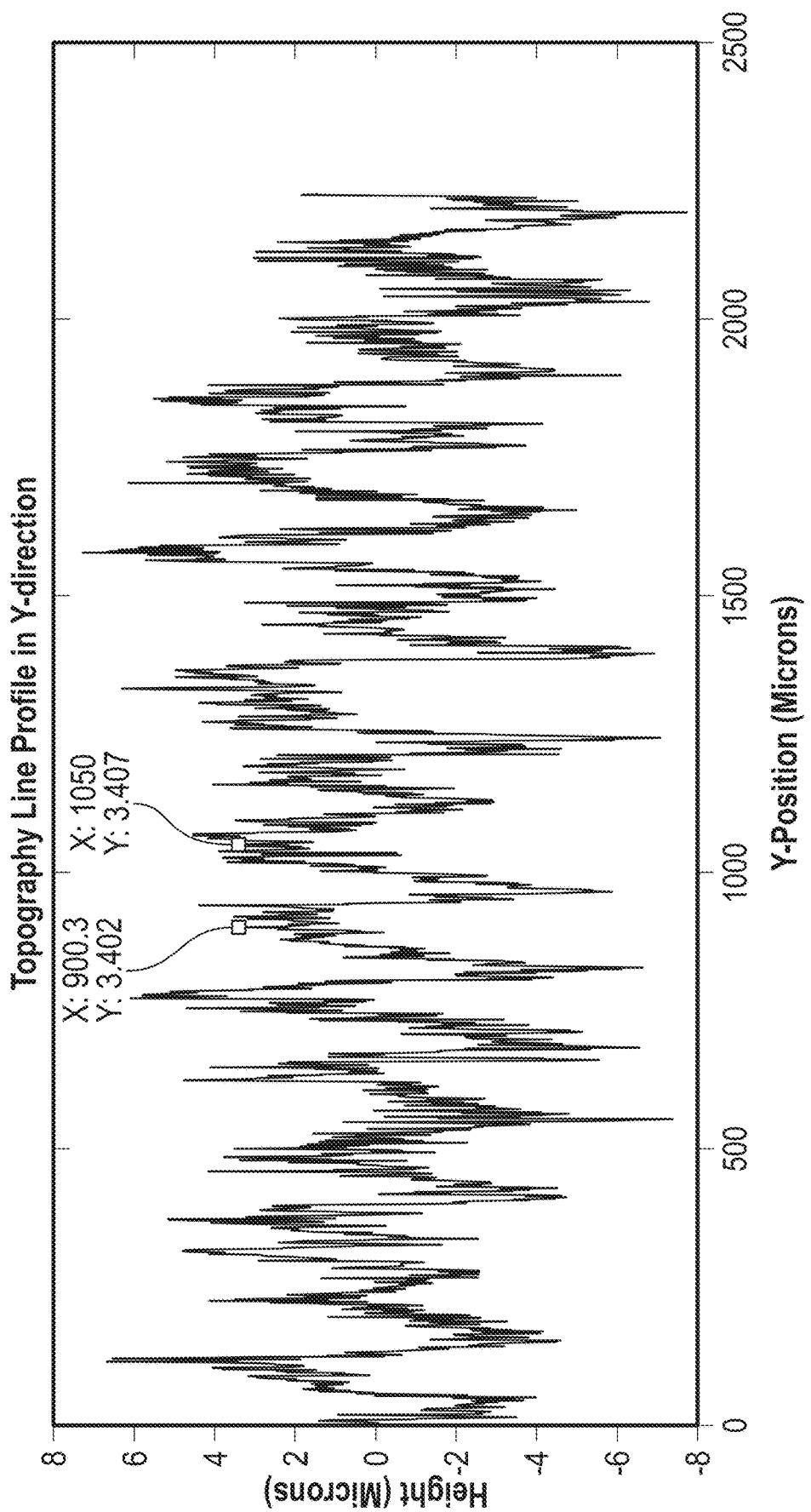
FIG. 28 is a plot of the topography in the fourth region of the coil of FIGS. 27A-27B along the second direction.
Figure 29:
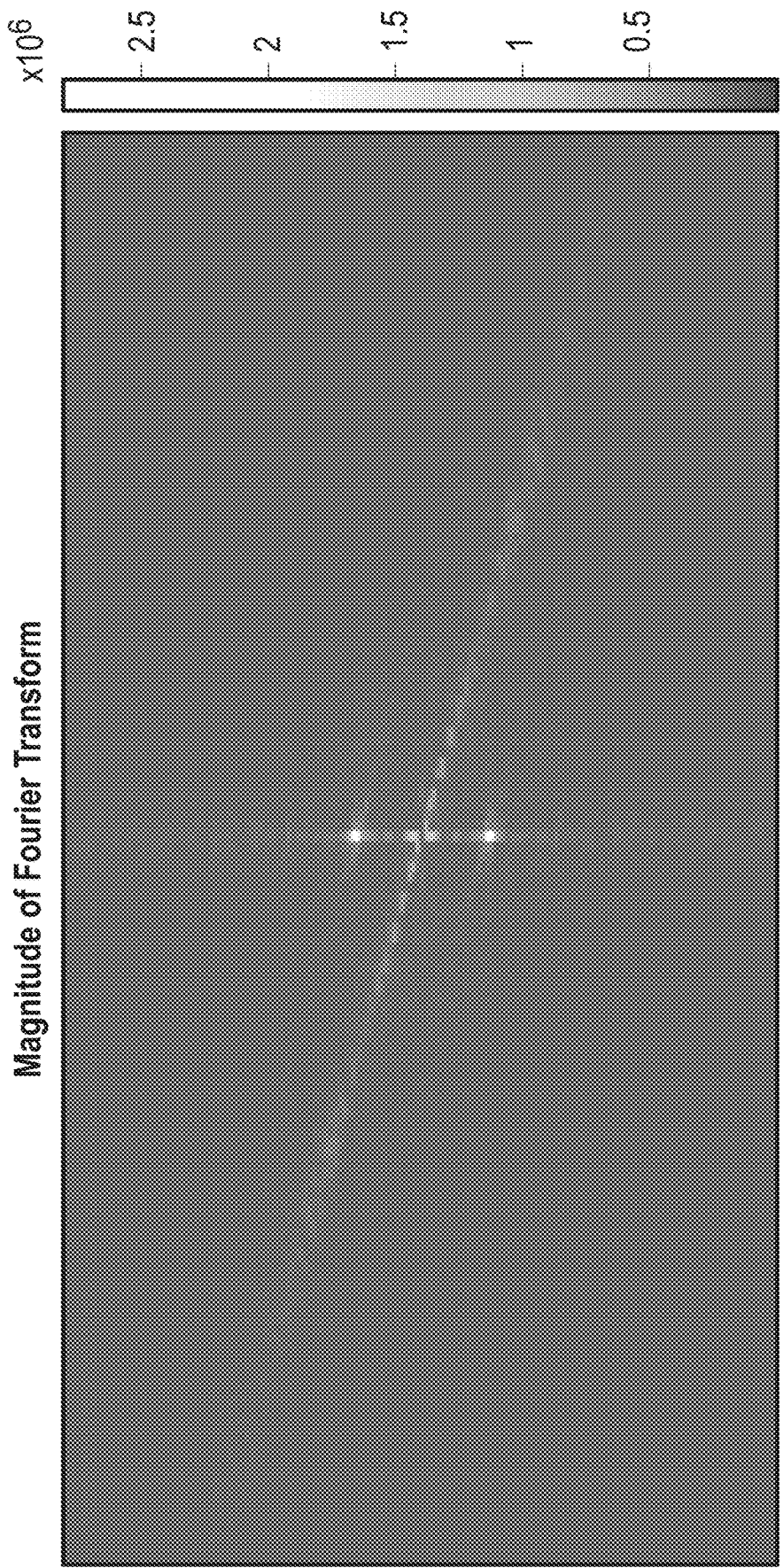
FIG. 29 is a plot of the magnitude of the Fourier transform of the surface topography in the fourth region of the coil of FIGS. 27A-27B.
Figure 30:
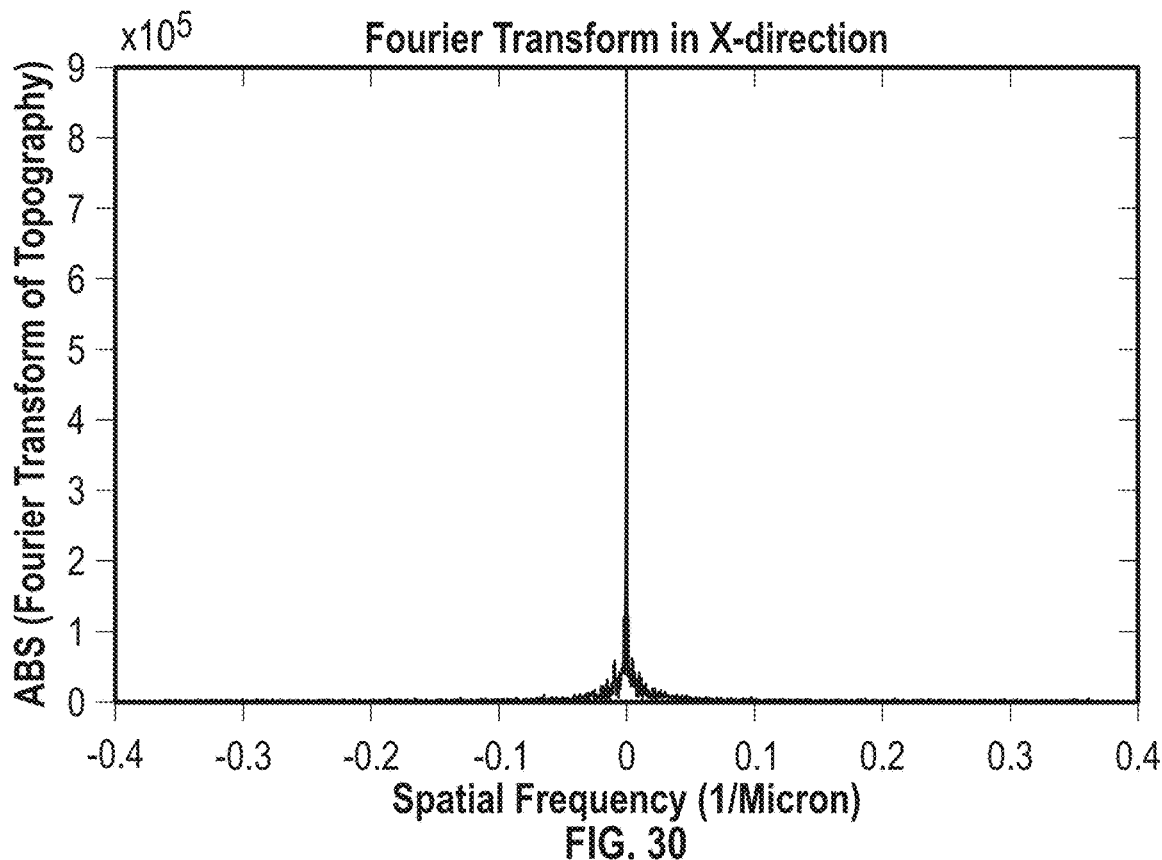
FIG. 30 is a plot of the Fourier transform of the surface topography in the fourth region of the coil of FIGS. 27A-27B along the first direction.
Figure 31:
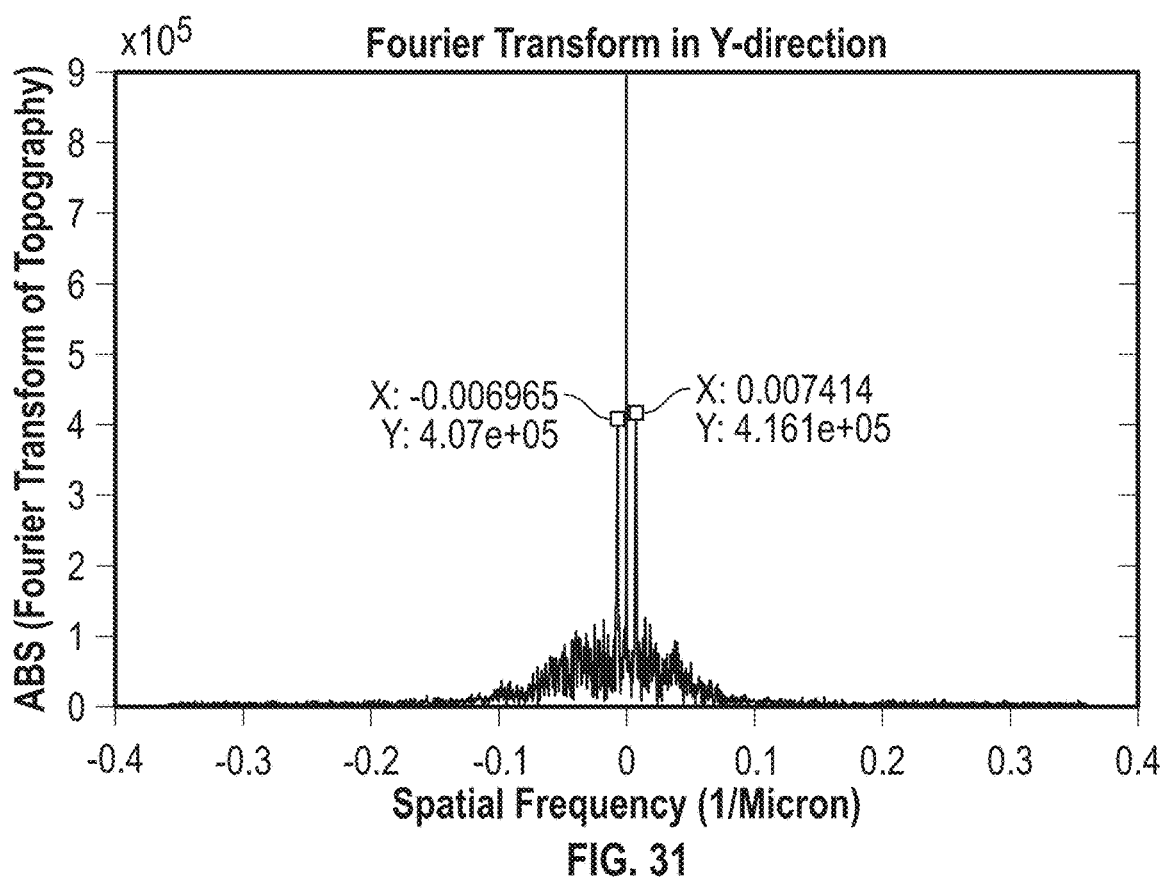
FIG. 31 is a plot of the magnitude of the Fourier transform of the surface topography in the fourth region of the coil of FIGS. 27A-27B along the second direction.

FIGS. 27A-27B are a laser intensity image and a topographical map, respectively, of the coil or antenna 800 in a fourth region (e.g., corresponding to third region 139 depicted in FIG. 3B) of the coil or antenna 800 in a top plan view obtained using the Keyence VK-X200 confocal microscope. FIG. 28 is a plot of the height along the y-direction. A periodic structure having an average pitch in the y-direction of about 139 microns is visible. FIG. 29 is a plot of the magnitude of the magnitude of the Fourier transform of the surface topography in the fourth region. FIG. 30 is a plot of the Fourier transform along the x-direction and FIG. 31 is a plot of the magnitude of the Fourier transform along the y-direction in the fourth region. The pair of large peaks proximal to the zero-frequency peak in FIG. 31 are indicative of a periodic structure along the y-direction.

Figure 32:
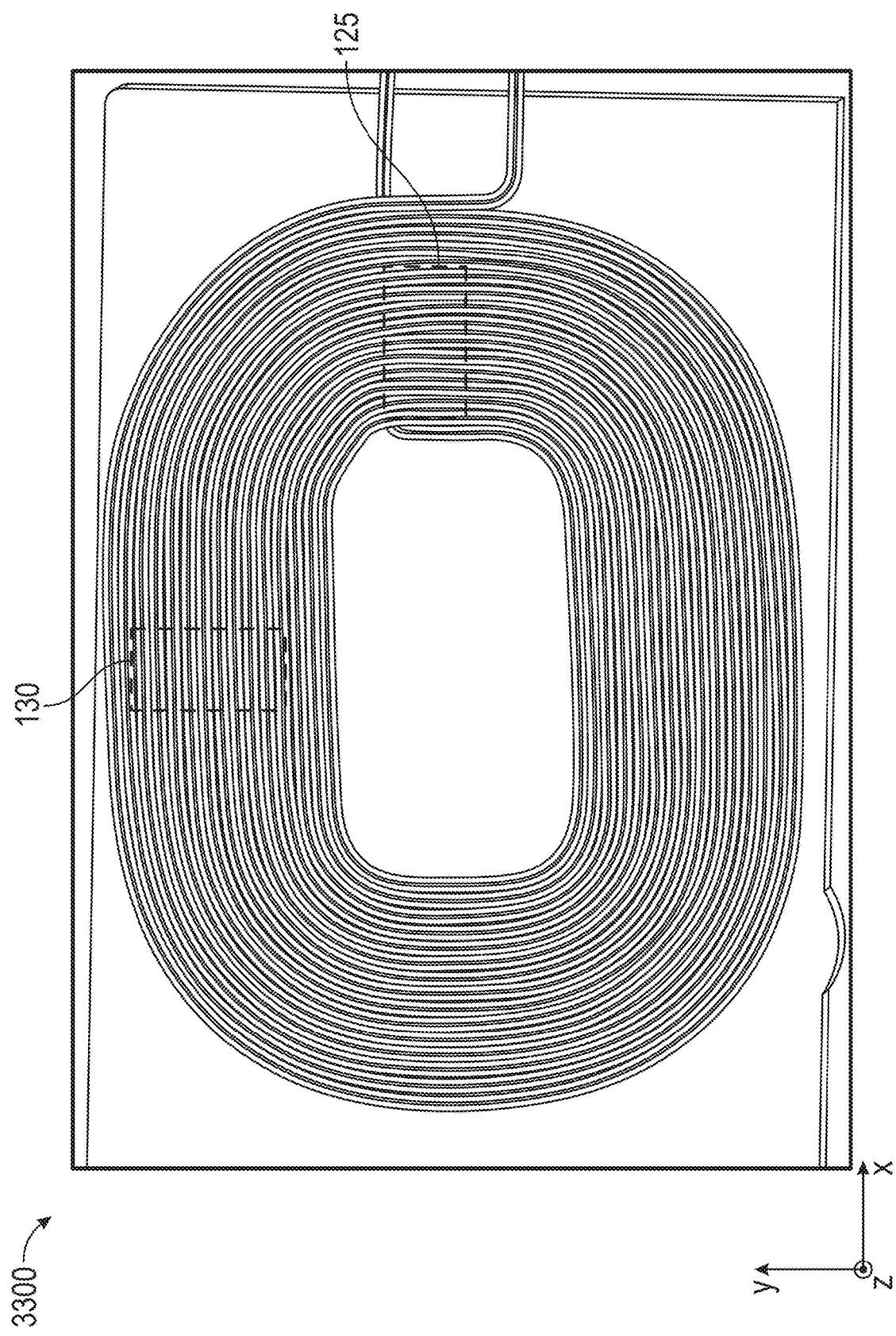
FIG. 32 is a top plan view of a coil.

FIG. 32 is a top plan view of a coil 3300 having a rounded rectangular shape. First and second regions 125 and 130 of the coil are shown. A comparative coil 3300 available from Worth Electronics as part number 760308103202 which has the geometry shown in FIG. 32 and which is a representative example of a wound copper wire-based coil was analyzed.

Figure 33A:
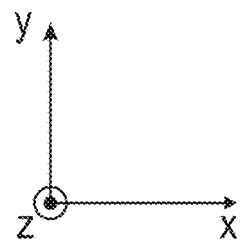
FIGS. 33A-33B are a laser intensity image and a topographical map, respectively, of a comparative coil in a first region.
Figure 33A:
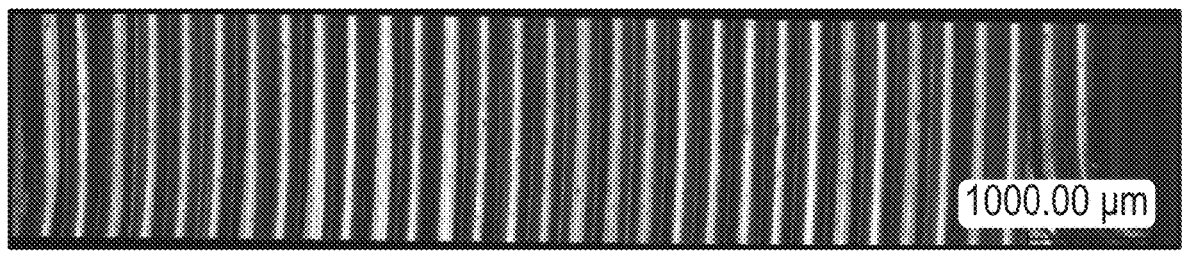
Figure 33B:
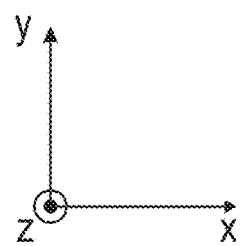
Figure 33B:
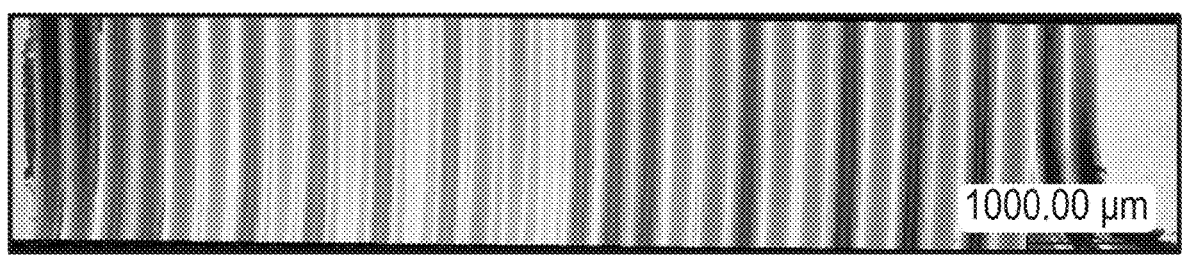
Figure 34:
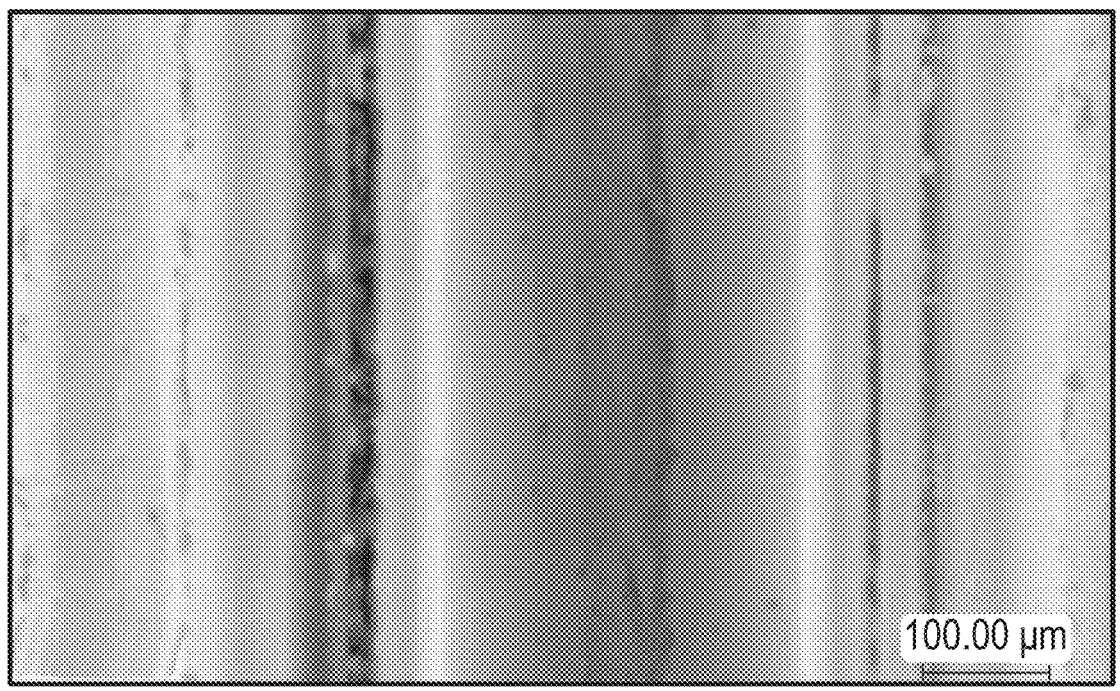
FIG. 34 is a topographical map of a portion of the first region of the coil of FIGS. 33A-33B.
Figure 35A:
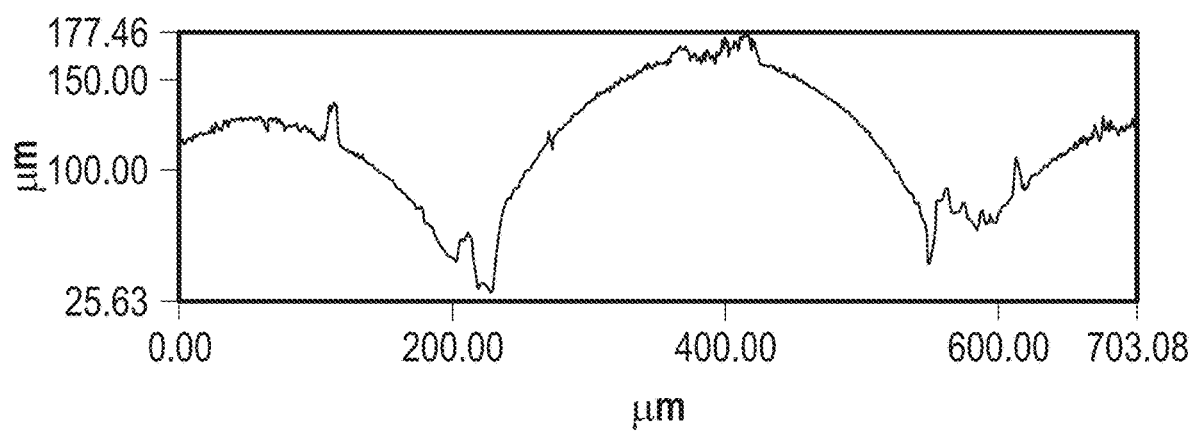
FIGS. 35A-35B are plots of the topography in the first region of the coil of FIGS. 33A-33B along the first direction at smaller and larger coordinate length scales, respectively.
Figure 35B:
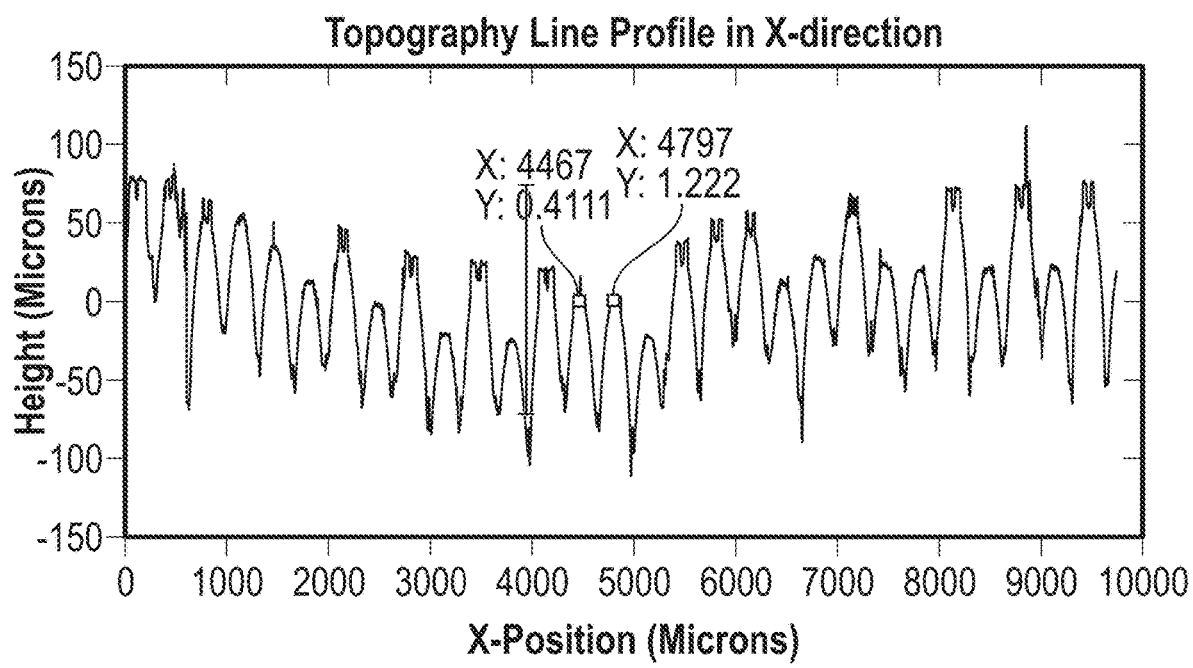
Figure 36:
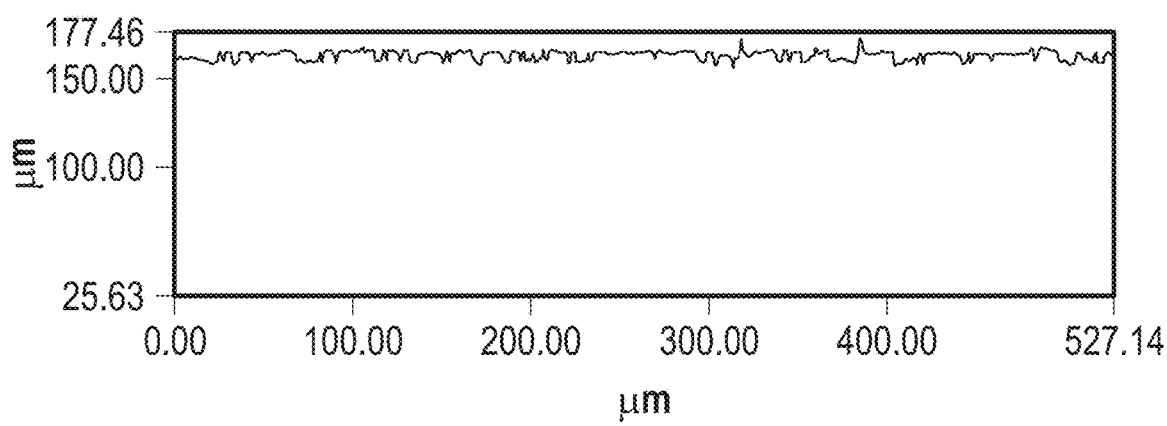
FIG. 36 is a plot of the topography in the first region of the coil of FIGS. 33A-33B along the second direction in the first region.
Figure 37:
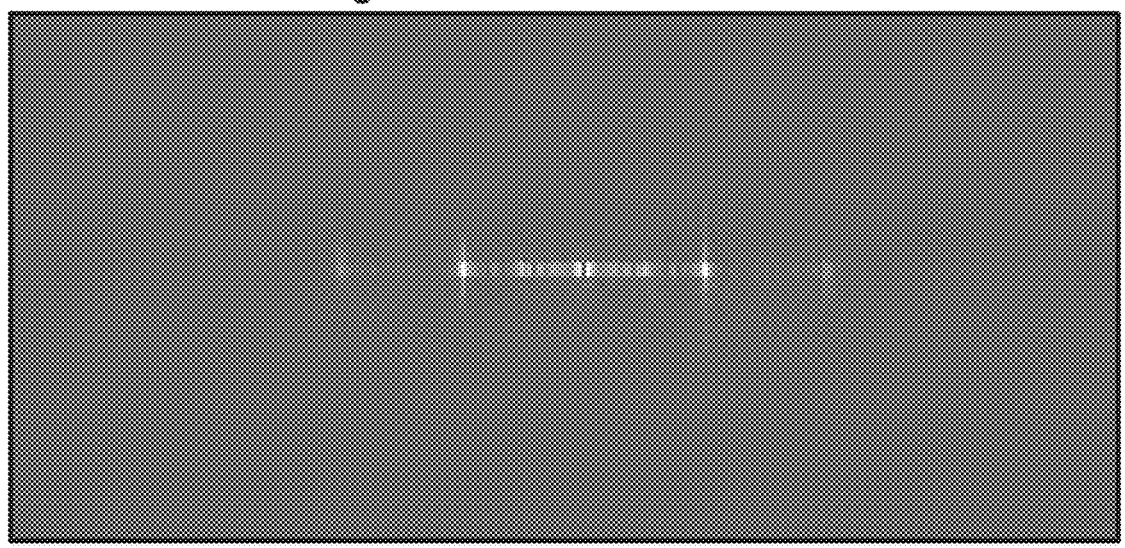
FIG. 37 is a plot of the magnitude of the Fourier transform of the surface topography in the first region of the coil of FIGS. 33A-33B.
Figure 38:
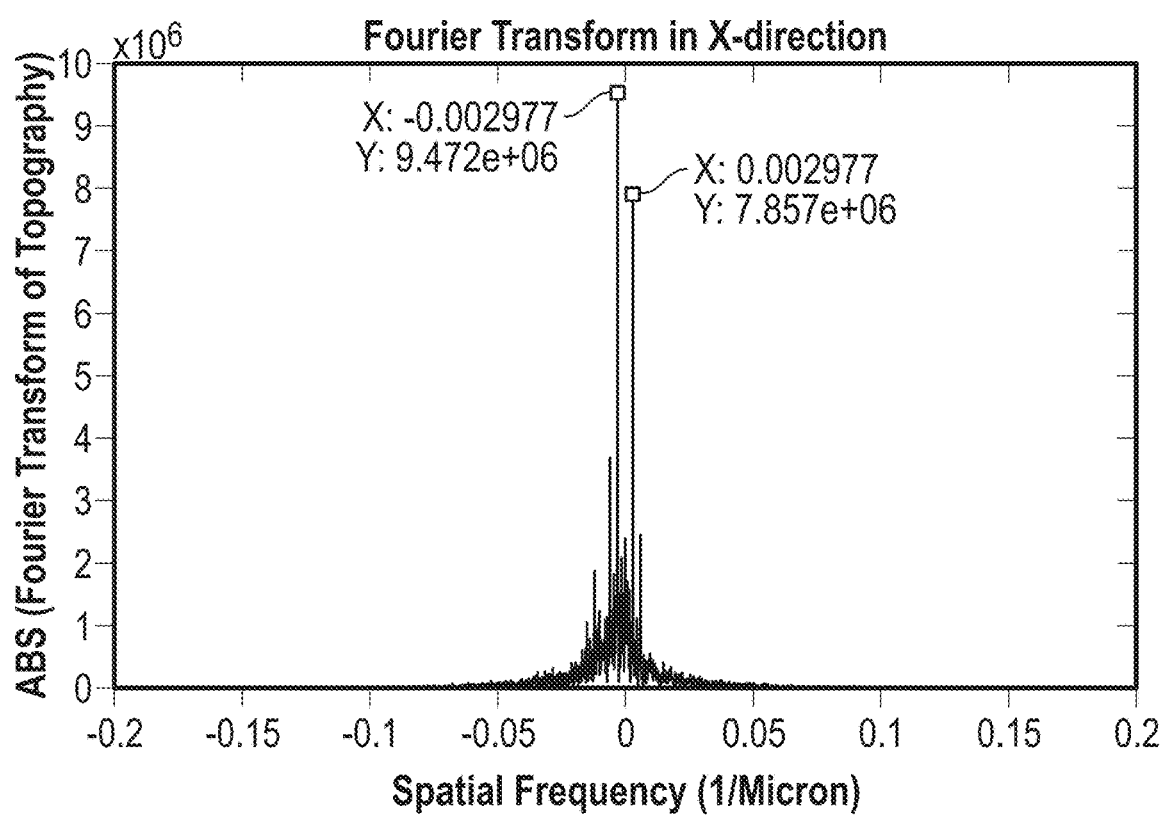
FIG. 38 is a plot of the magnitude of the Fourier transform of the surface topography in the first region of the coil of FIGS. 33A-33B along the first direction.
Figure 39:
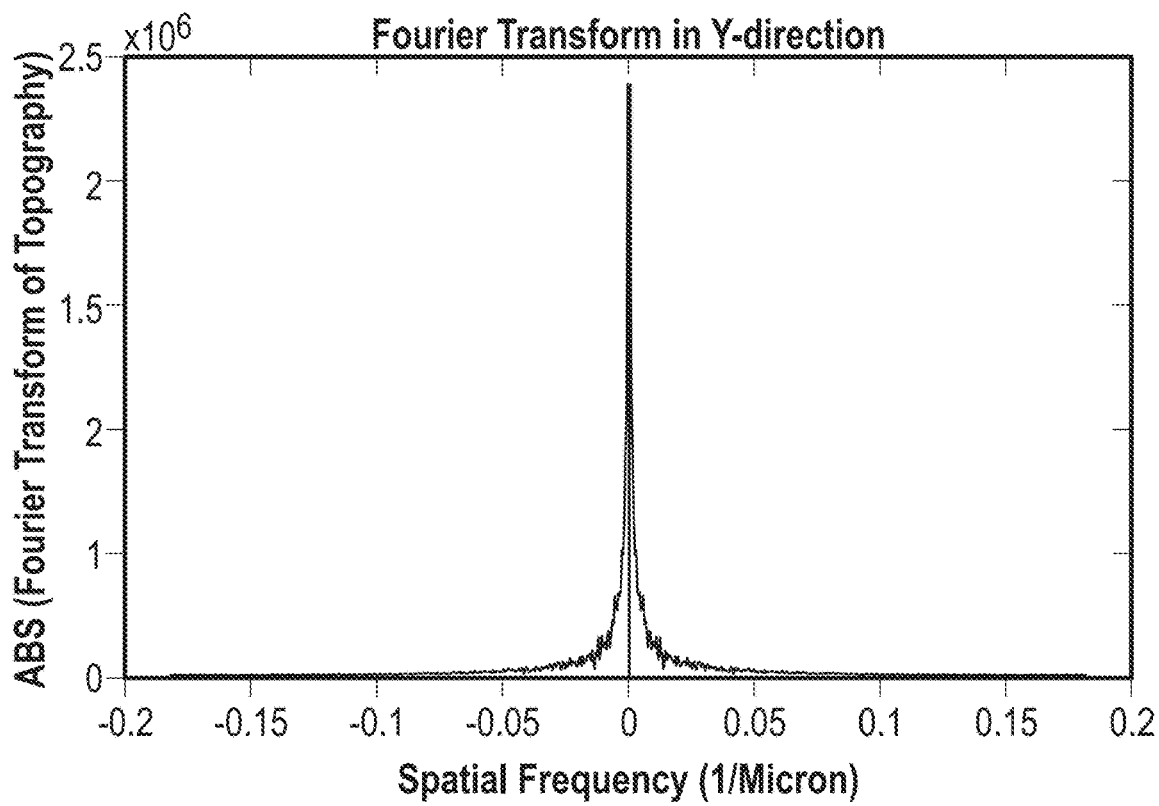
FIG. 39 is a plot of the magnitude of the Fourier transform of the surface topography in the first region of the coil of FIGS. 33A-33B along the second direction.

FIGS. 33A-33B are a laser intensity image and a topographical map, respectively, of the comparative coil 3300 in a first region 125 of the coil 3300 in a top plan view obtained using the Keyence VK-X200 confocal microscope. FIG. 34 is a topographical map of a portion of the first region 125. FIGS. 35A-35B are plots of the height along the x-direction at smaller and larger x-coordinate length scales, respectively, and FIG. 36 is a plot of the height along the y-direction in the first region 125. A periodic structure having an average pitch in the x-direction of about 336 microns is visible. FIG. 37 is a plot of the magnitude of the Fourier transform of the surface topography in the first region. FIG. 38 is a plot of the magnitude of the Fourier transform along the x-direction and FIG. 39 is a plot of the magnitude of the Fourier transform along the y-direction in the first region 125.

Figure 40A:
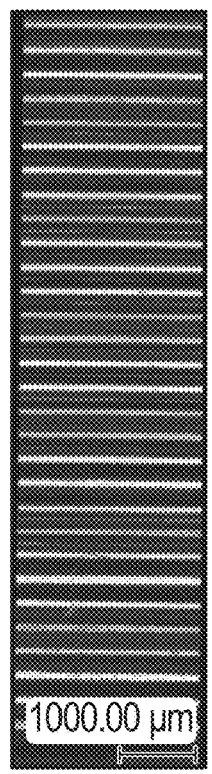
FIGS. 40A-40B are a laser intensity image and a topographical map, respectively, of the comparative coil of FIGS. 33A-33B in the second region.
Figure 40A:
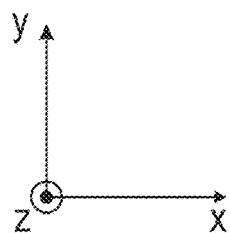
Figure 40B:
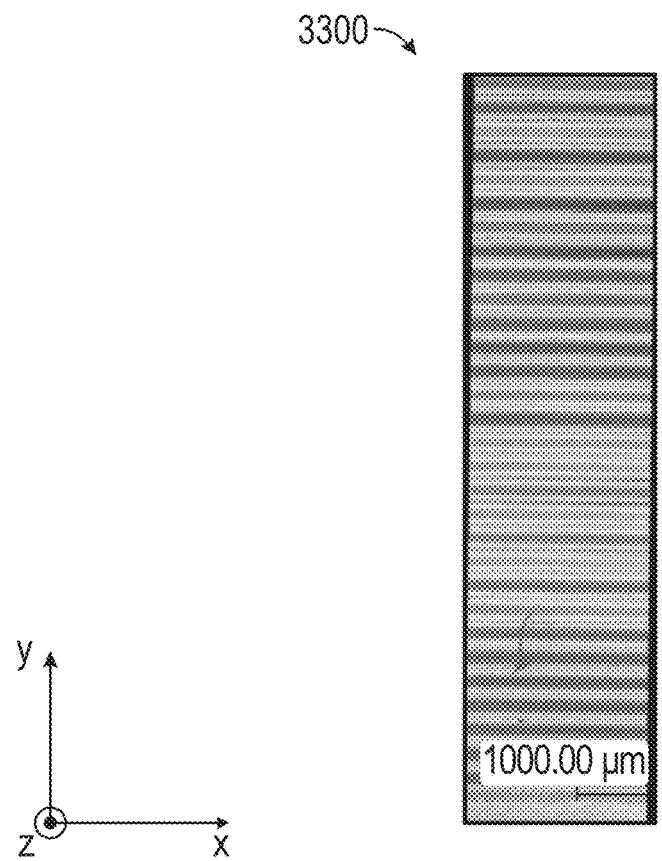
Figure 41:
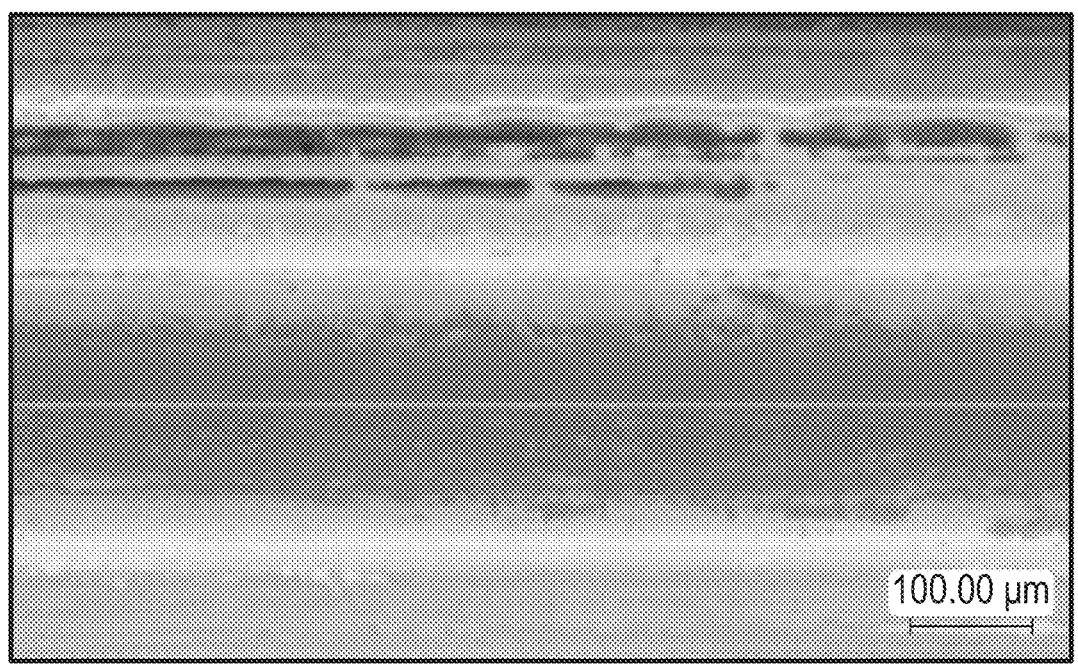
FIG. 41 is a topographical map of a portion of the second region of the coil of FIGS. 40A-40B.
Figure 42:
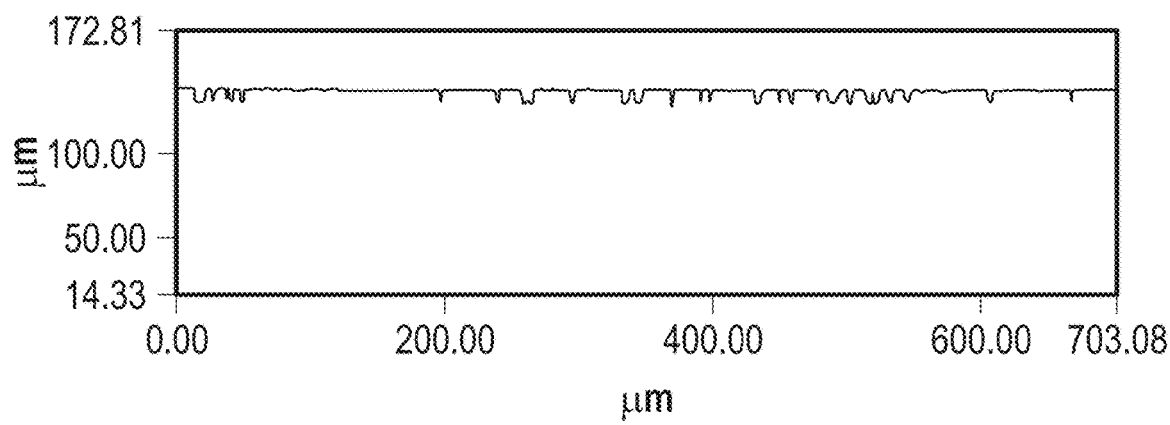
FIG. 42 is a plot of the topography in the second region of the coil of FIGS. 40A-40B along the first direction.
Figure 43A:
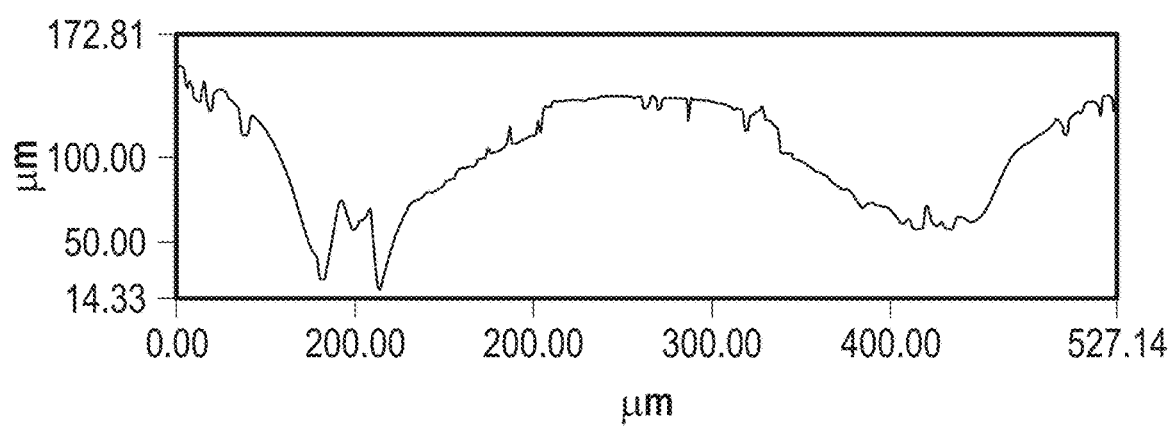
FIGS. 43A-43B are plots of the topography in the second region of the coil of FIGS. 40A-40B along the second direction at smaller and larger coordinate length scales, respectively.
Figure 43B:
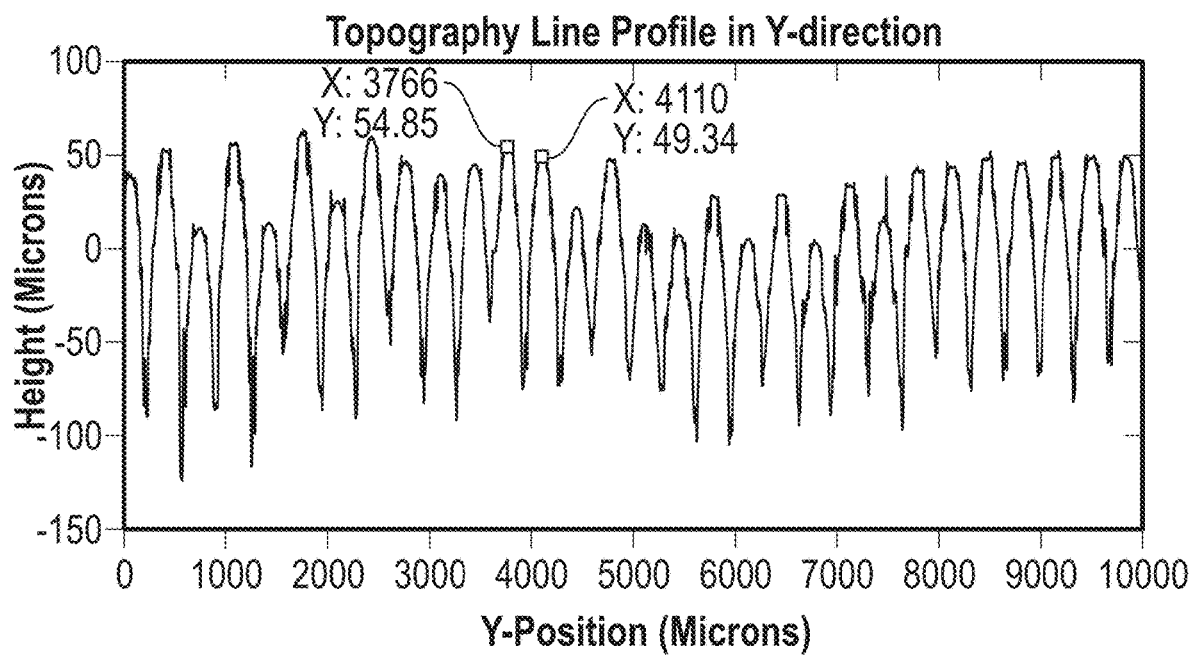
Figure 44:
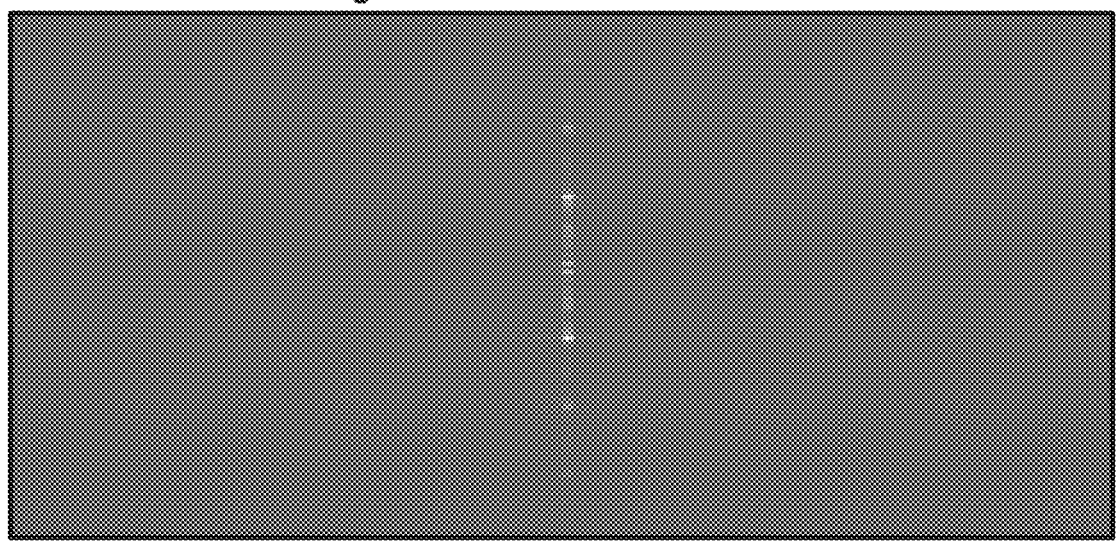
FIG. 44 is a plot of the magnitude of the Fourier transform of the surface topography in the second region of the coil of FIGS. 40A-40B.
Figure 45:
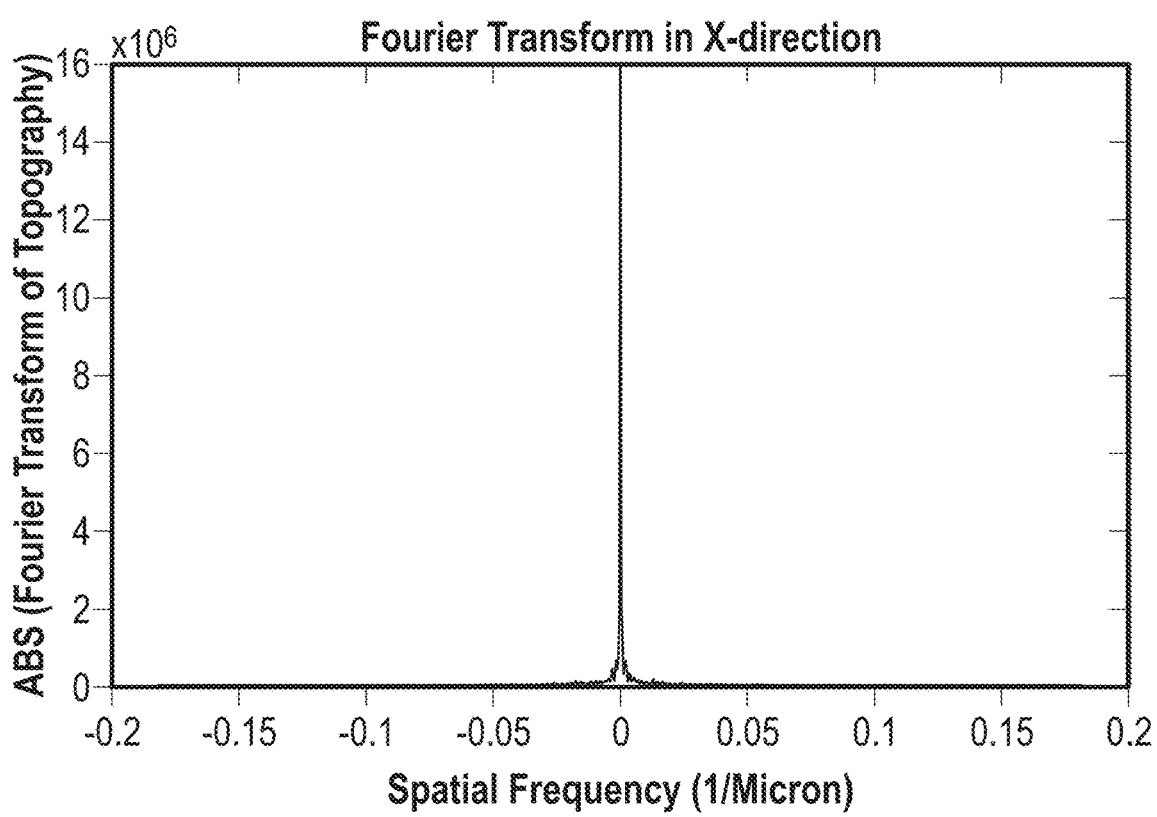
FIG. 45 is a plot of the Fourier transform of the surface topography in the second region of the coil of FIGS. 40A-40B along the first direction.
Figure 46:
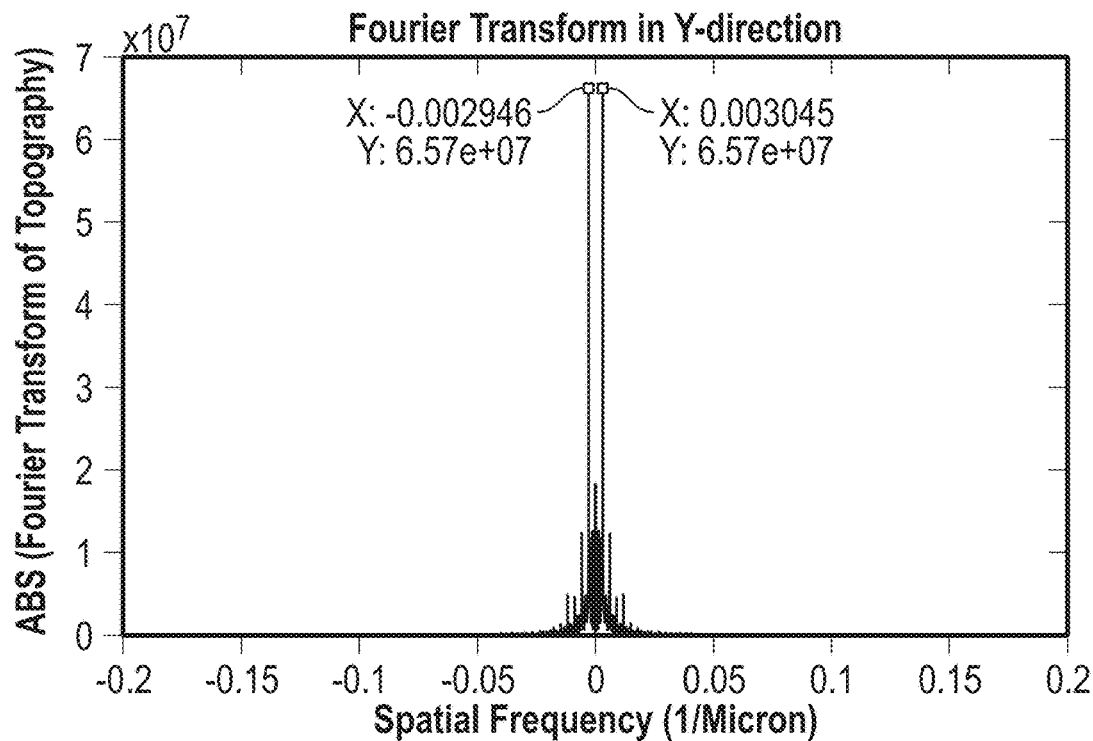
FIG. 46 is a plot of the Fourier transform of the surface topography in the second region of the coil of FIGS. 40A-40B along the second direction.

FIGS. 40A-40B are a laser intensity image and a topographical map, respectively, of the comparative coil 3300 in a second region 130 of the coil 3300 in a top plan view obtained using the Keyence VK-X200 confocal microscope. FIG. 41 is a topographical map of a portion of the second region 130. FIG. 42 is a plot of the height along the x-direction and FIGS. 43A-43B are plots of the height along the y-direction at smaller and larger y-coordinate length scales, respectively, in the second region 130. A periodic structure having an average pitch in the y-direction of about 334 microns is visible. FIG. 44 is a plot of the magnitude of the Fourier transform of the surface topography in the second region. FIG. 45 is a plot of the Fourier transform along the x-direction and FIG. 46 is a plot of the Fourier transform along the y-direction in the second region 130 obtained using the Keyence VK-X200 confocal microscope.

FIGS. 33A-46 show that the topological pattern of the comparative coil 3300 had a periodicity in the x-direction in the first region 125 and a periodicity in the y-direction in the second region 130. In each case, the topological pattern had a periodicity in the radial direction in the first and second regions and did not extend in a same direction in the two regions.

Figure 47:
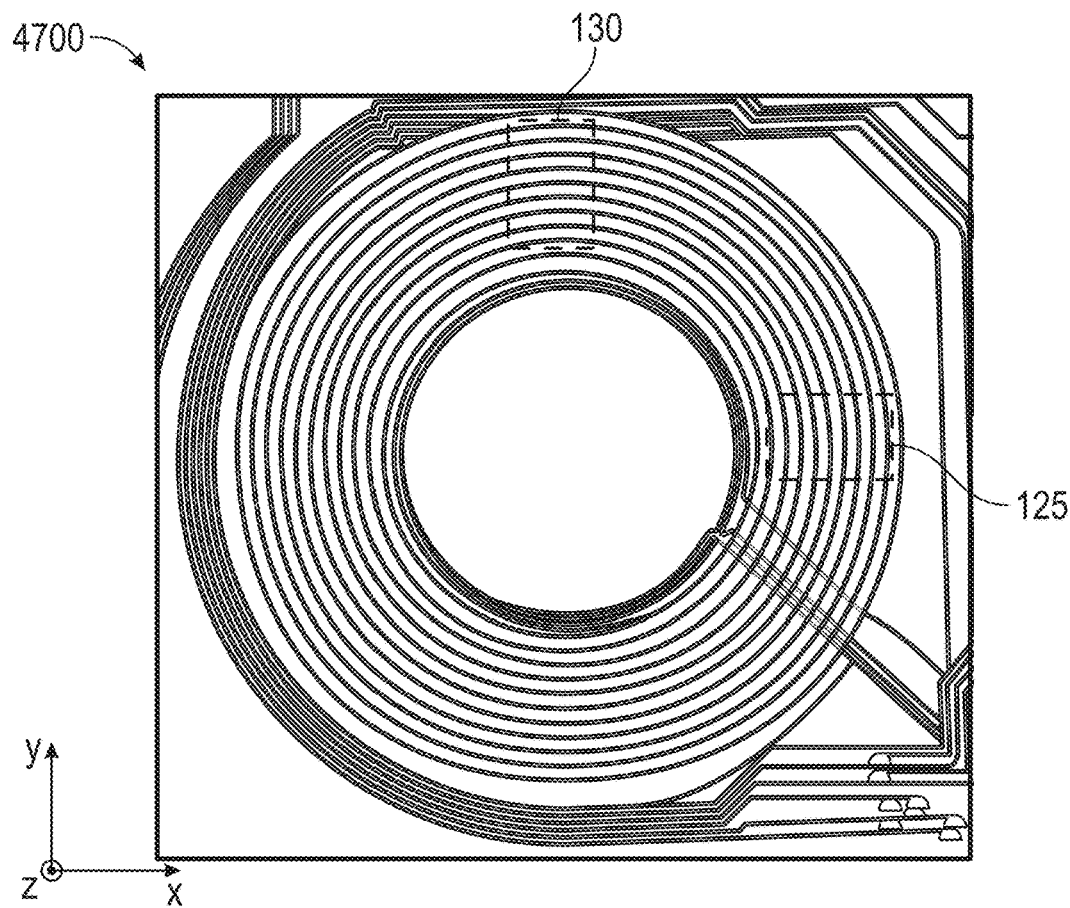
FIG. 47 is a top plan view of a coil.

FIG. 47 is a top plan view of a coil 4700 having a substantially circular shape. A comparative coil 4700 available from Samsung Electronics Co. Ltd. (South Korea) which had the shape illustrated in FIG. 47 and which is a representative example of a flexible printed circuit coil was analyzed.

Figure 48A:
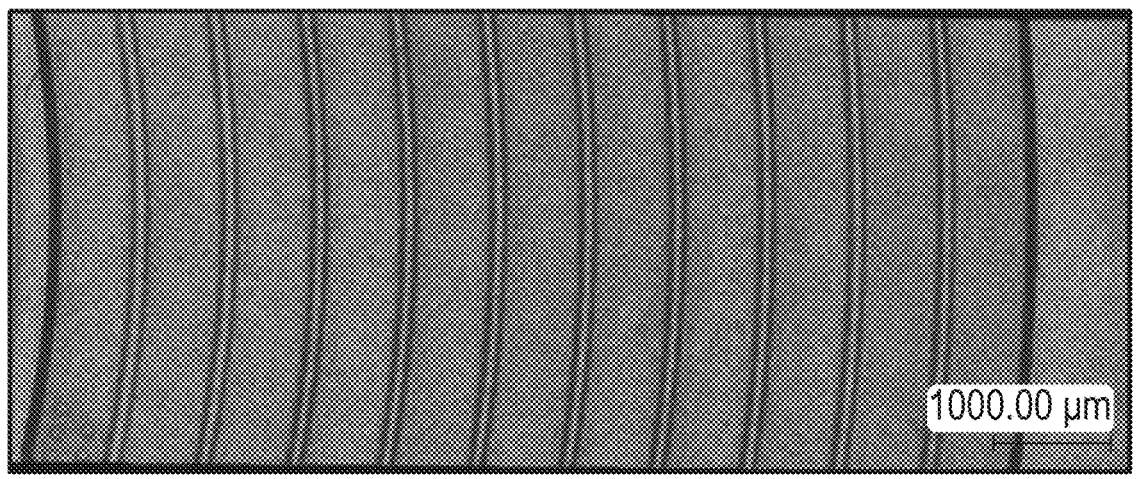
FIGS. 48A-48B are a laser intensity image and a topographical map, respectively, of a comparative coil in a first region of the coil.
Figure 48A:
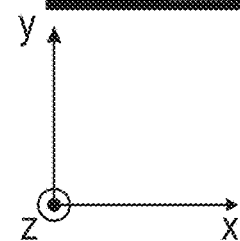
Figure 48B:
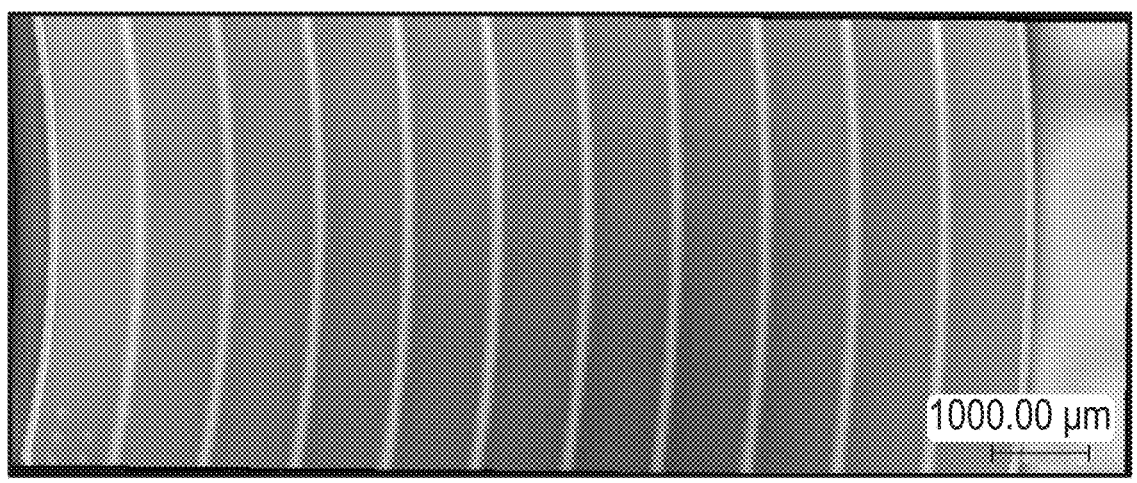
Figure 48B:
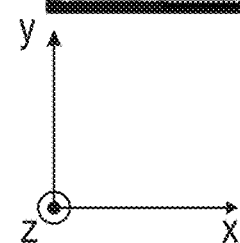
Figure 48C:
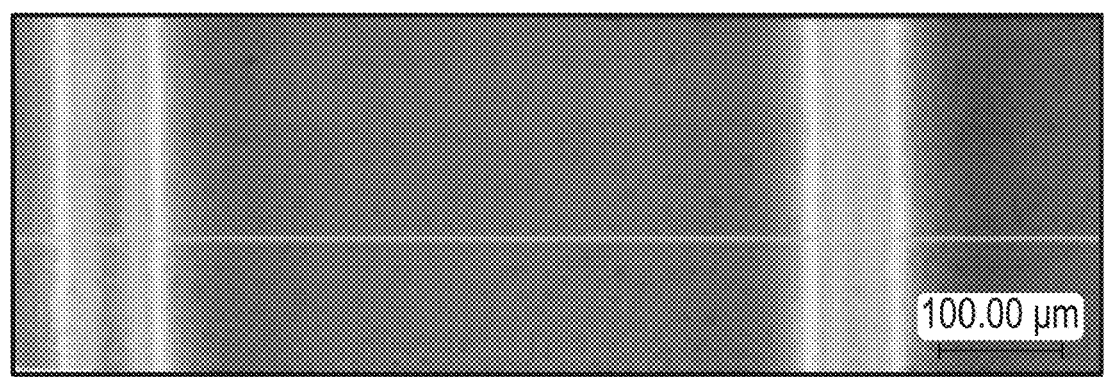
FIG. 48C is a topographical map of a portion of the first region of the coil of FIGS. 48A-48B.
Figure 49A:
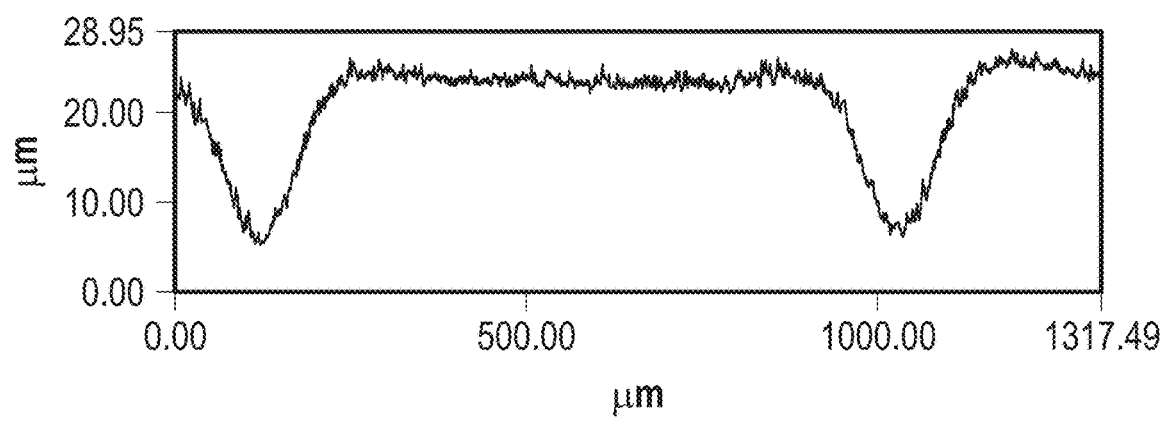
FIGS. 49A-49B are plots of topography in the first region of the coil of FIGS. 48A-48B along the first direction at smaller and larger coordinate length scales, respectively.
Figure 49B:
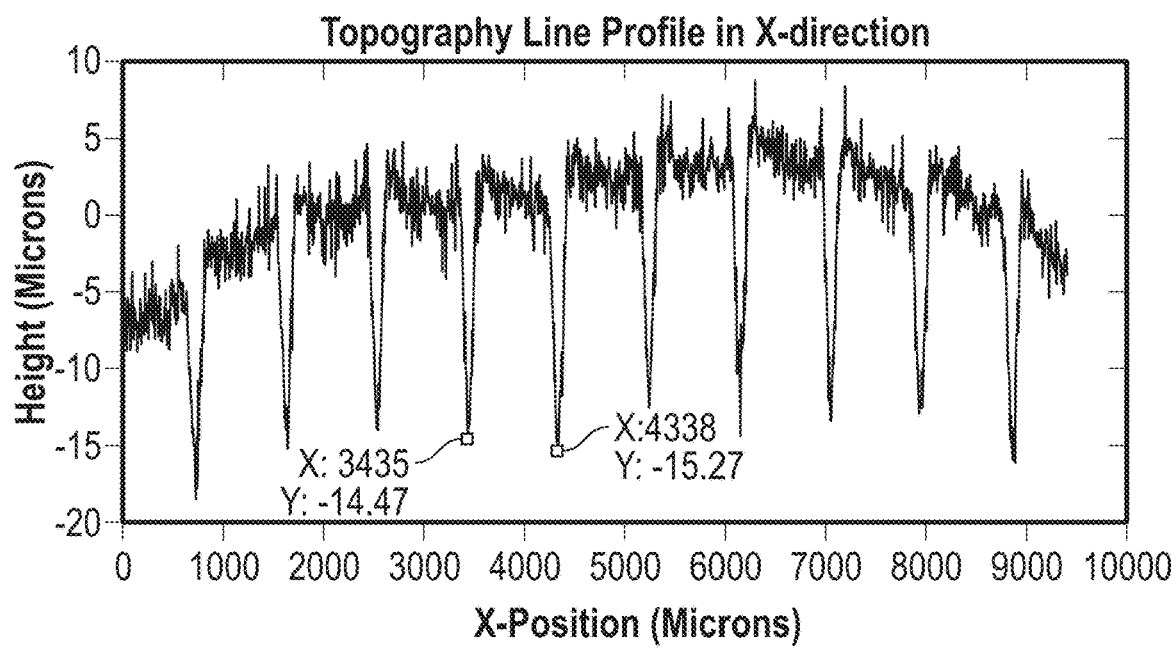
Figure 50:
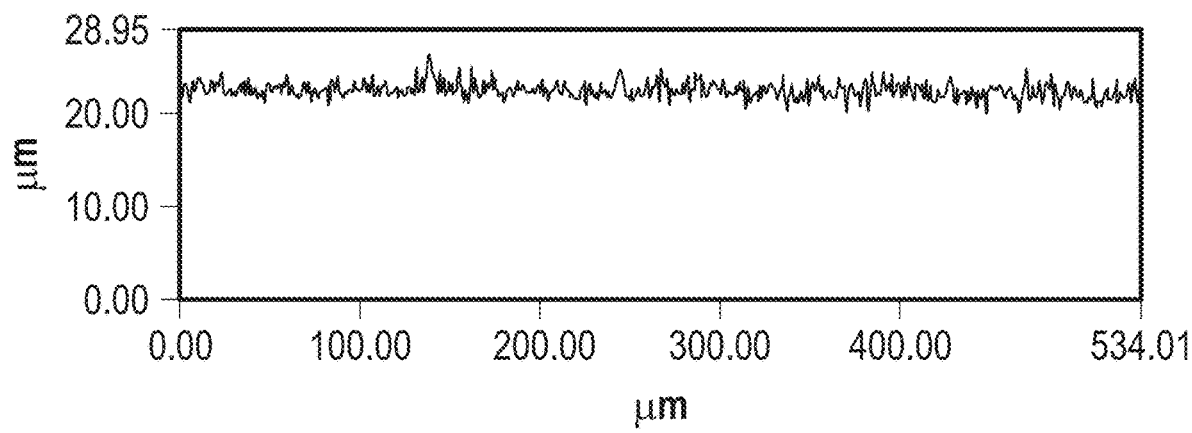
FIG. 50 is a plot of the topography in the first region of the coil of FIGS. 48A-48B along the second direction.
Figure 51:
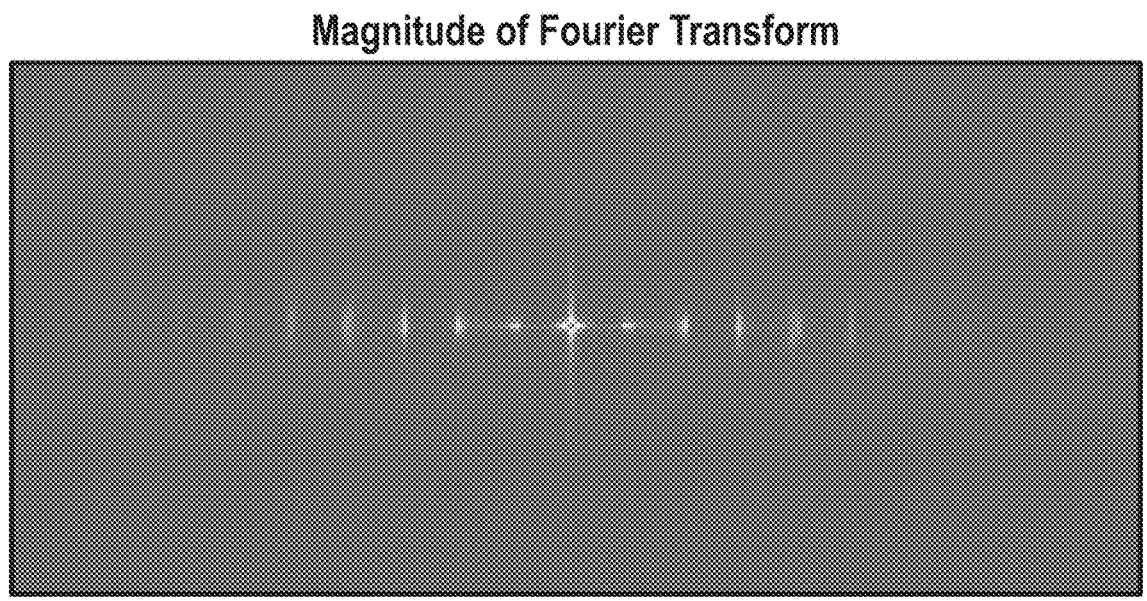
FIG. 51 is a plot of the magnitude of the Fourier transform of the surface topography in the first region of the coil of FIGS. 48A-48B.
Figure 52:
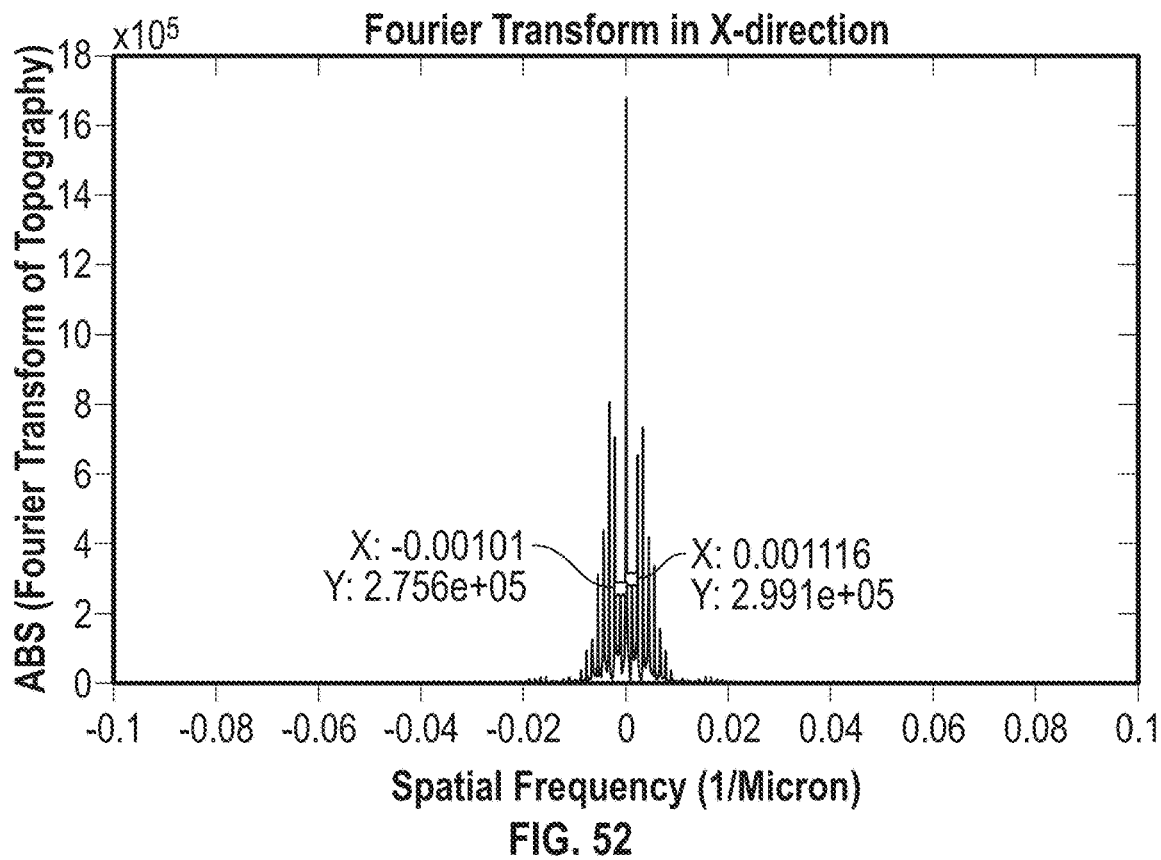
FIG. 52 is a plot of the magnitude of the Fourier transform of the surface topography in the first region of the coil of FIGS. 48A-48B along the first direction.
Figure 53:
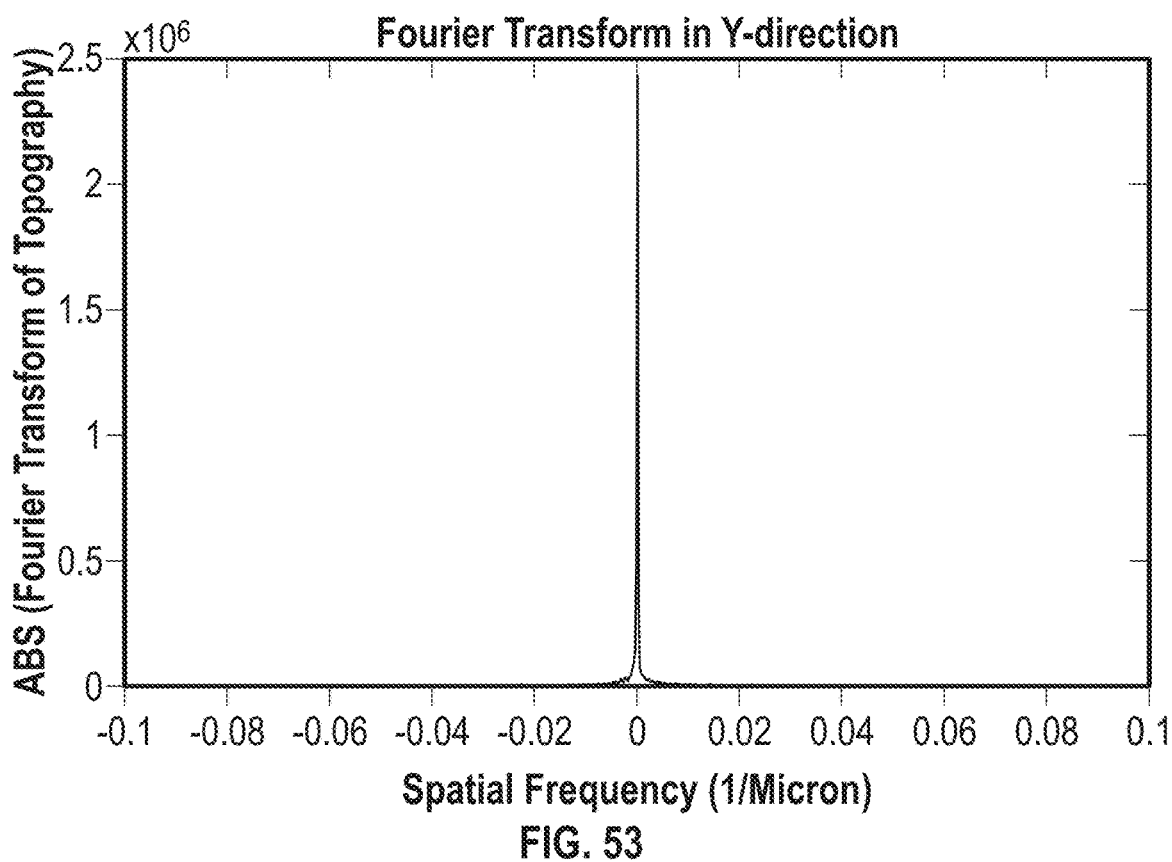
FIG. 53 is a plot of the Fourier transform of the surface topography in the first region of the coil of FIGS. 48A-48B along the second direction.

FIGS. 48A-48B are a laser intensity image and a topographical map, respectively, of the comparative coil 4700 in a first region 125 of the coil 4700 in a top plan view obtained using the Keyence VK-X200 confocal microscope. FIG. 48C is a topographical map of a portion of the first region 125. FIGS. 49A-49B are plots of the height along the x-direction at smaller and larger x-coordinate length scales, respectively, and FIG. 50 is a plot of the height along the y-direction in the first region 125. A periodic structure having an average pitch in the x-direction of about 941 microns is visible. FIG. 51 is a plot of the magnitude of the Fourier transform of the surface topography in the first region 125. FIG. 52 is a plot of the magnitude of the Fourier transform along the x-direction and FIG. 53 is a plot of the Fourier transform along the y-direction in the first region 125.

Figure 54A:
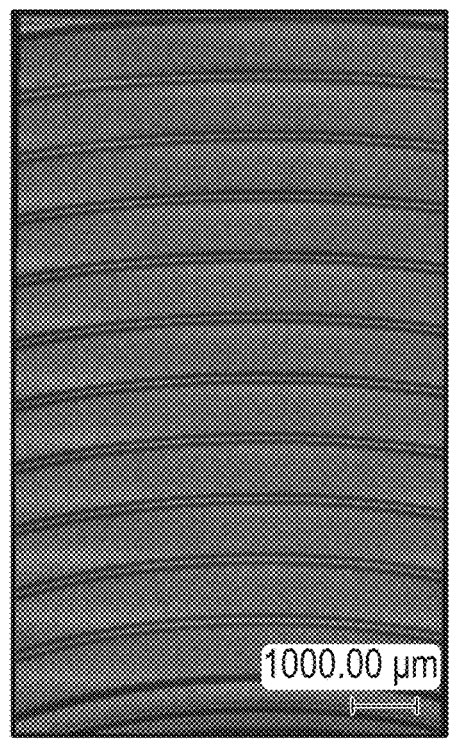
FIGS. 54A-54B are a laser intensity image and a topographical map, respectively, of a second region of the coil of FIGS. 48A-48B.
Figure 54A:
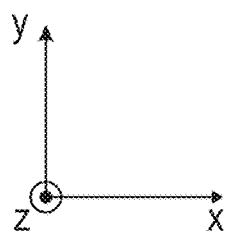
Figure 54B:
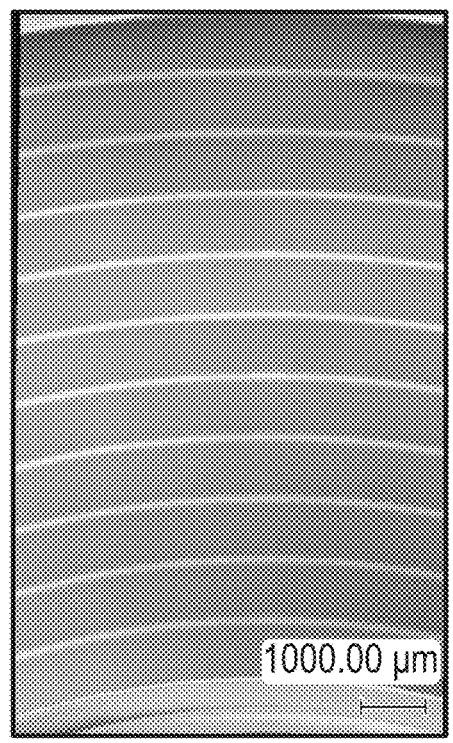
Figure 54B:
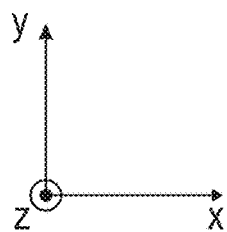
Figure 55:
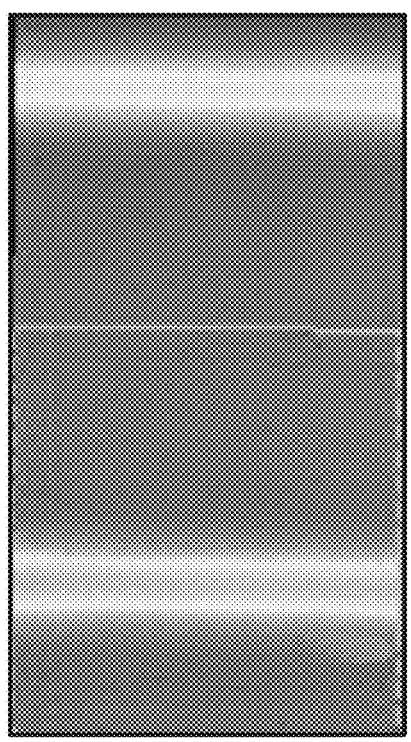
FIG. 55 is a topographical map of a portion of the second region of the coil of FIGS. 54A-54B.
Figure 56:
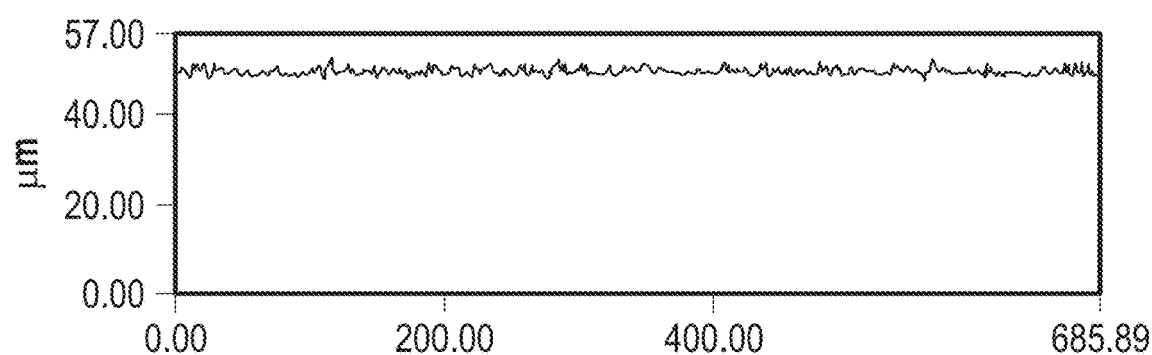
FIG. 56 is a plot of the topography in the second region of the coil of FIGS. 54A-54B along the first direction.
Figure 57A:
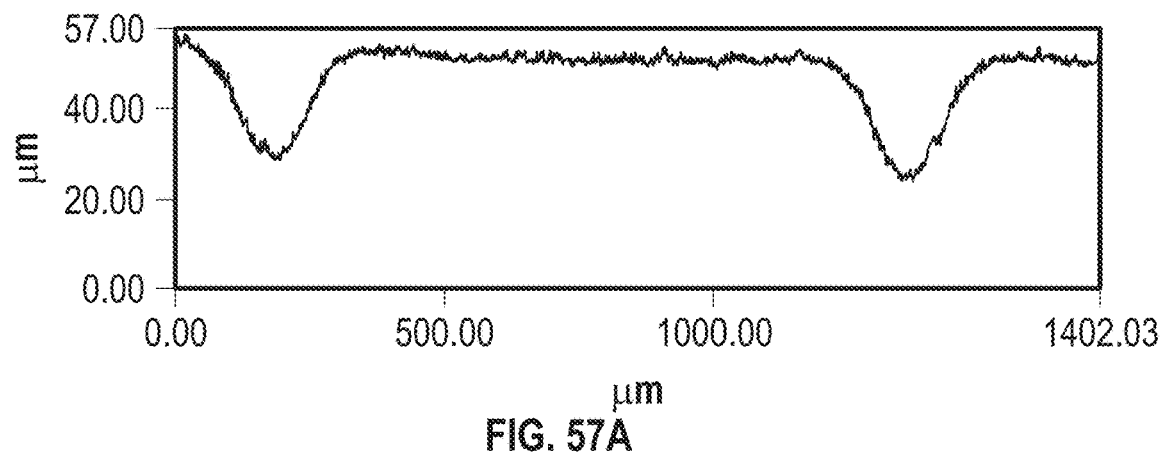
FIGS. 57A-57B are plots of the topography in the second region of the coil of FIGS. 54A-54B along the second direction at smaller and larger coordinate length scales, respectively.
Figure 57B:
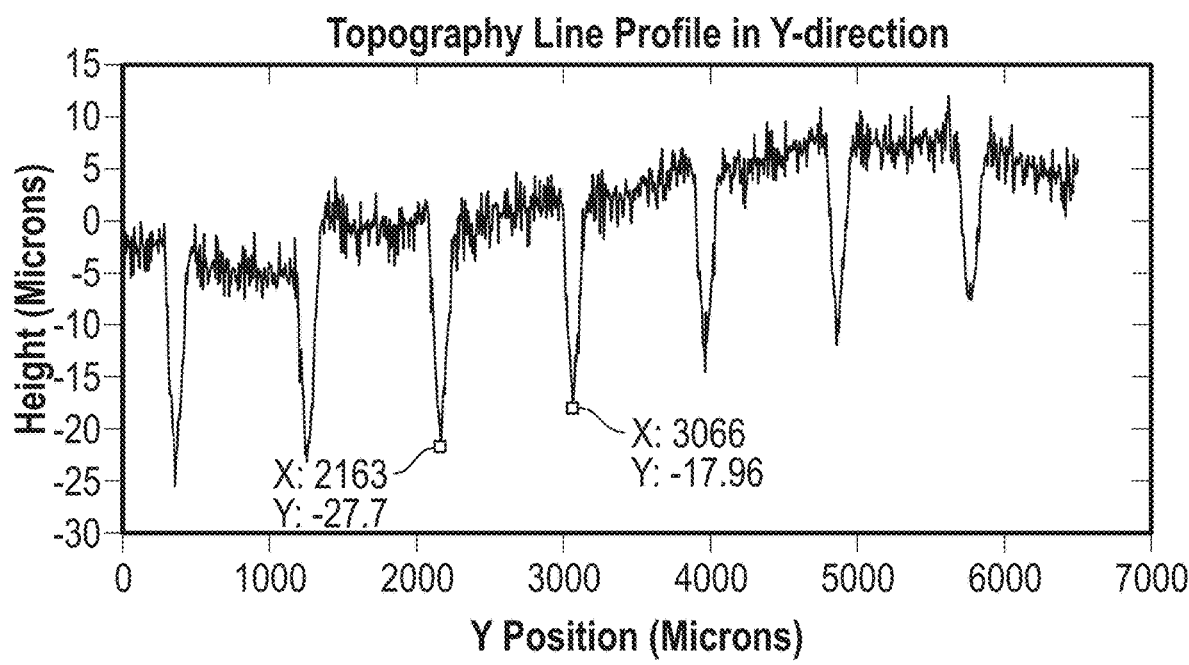
Figure 58:
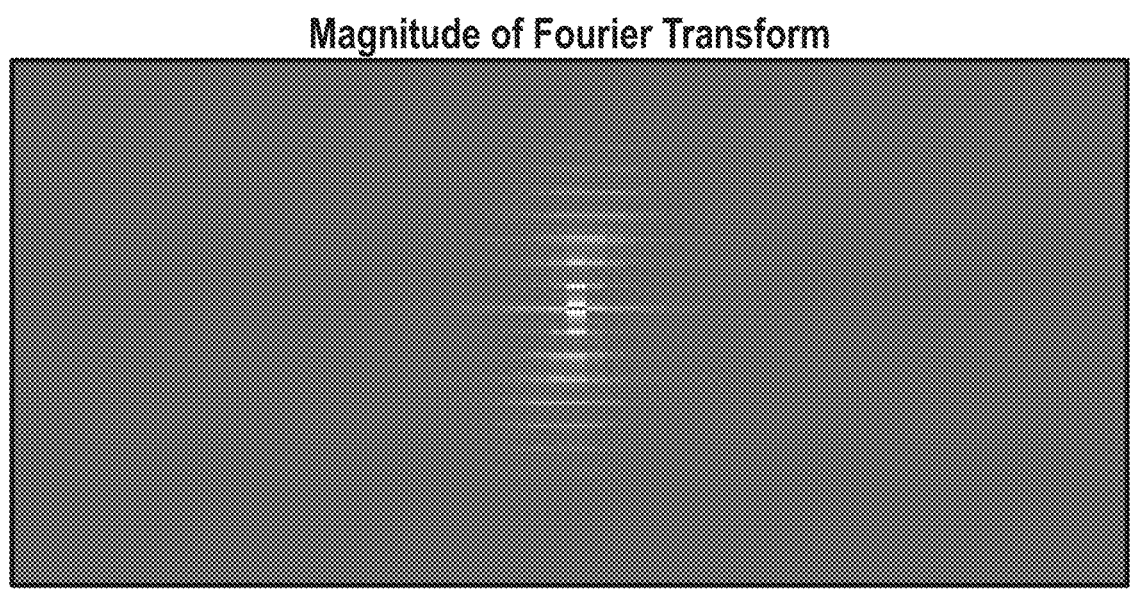
FIG. 58 is a plot of the magnitude of the Fourier transform of the surface topography in the second region of the coil of FIGS. 54A-54B.
Figure 59:
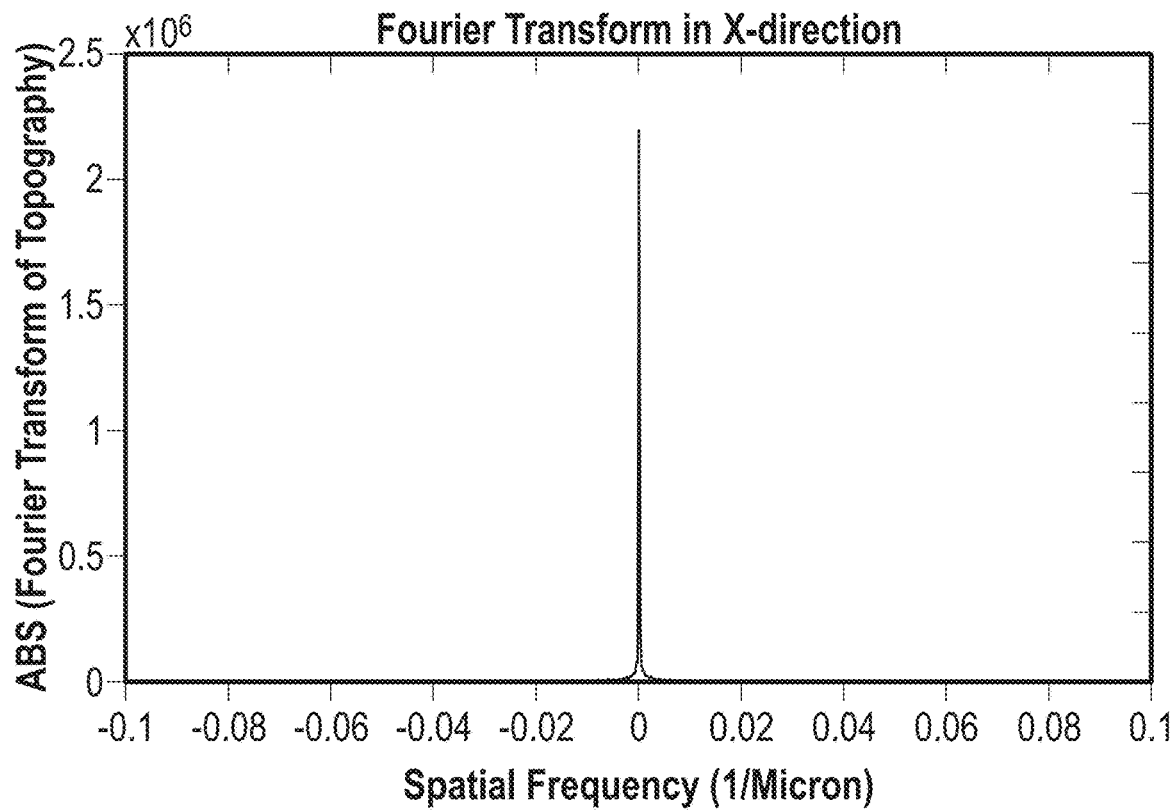
FIG. 59 is a plot of the Fourier transform of the surface topography in the second region of the coil of FIGS. 54A-54B along the first direction.
Figure 60:
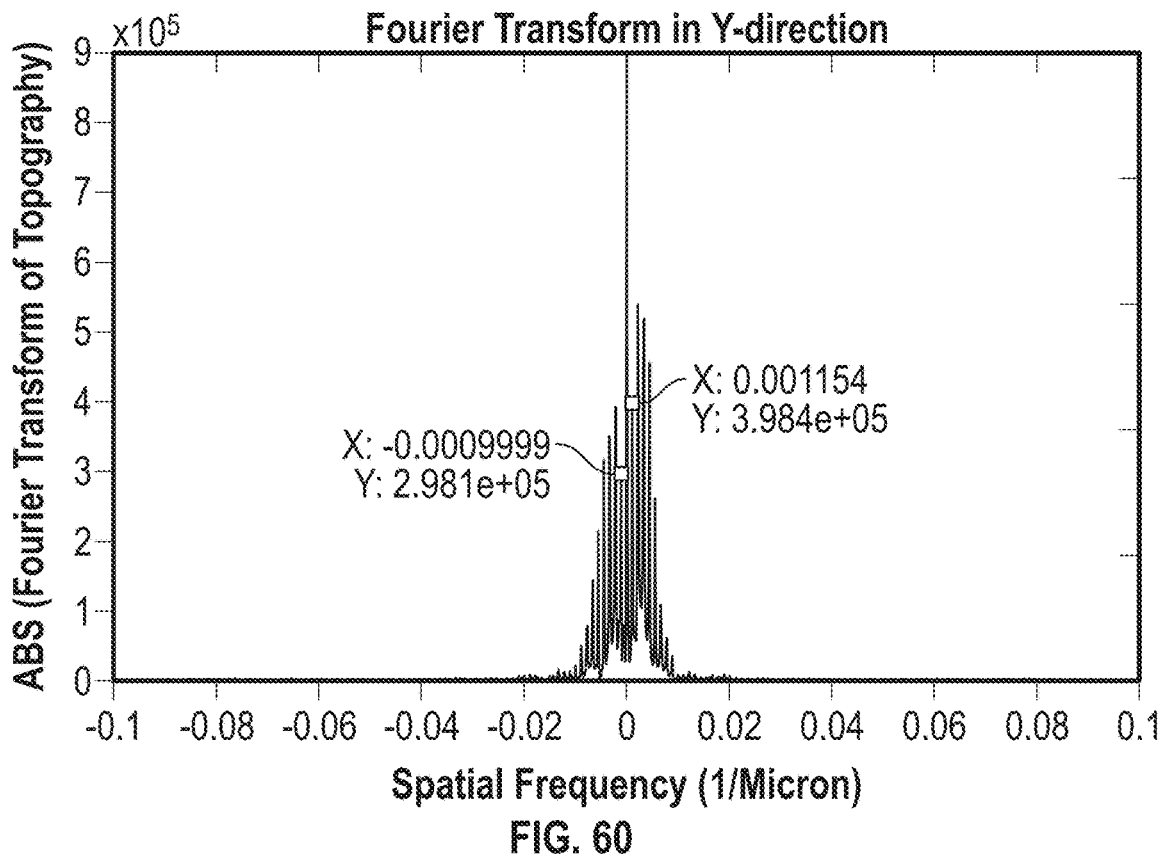
FIG. 60 is a plot of the Fourier transform of the surface topography in the second region of the coil of FIGS. 54A-54B along the second direction.

FIGS. 54A-54B are a laser intensity image and a topographical map, respectively, of the comparative coil 4700 in a second region 130 of the coil 3300 in a top plan view obtained using the Keyence VK-X200 confocal microscope. FIG. 55 is a topographical map of a portion of the second region 130. FIG. 56 is a plot of the height along the x-direction and FIGS. 57A-57B are plots of the height along the y-direction at smaller and larger y-coordinate length scales, respectively, in the second region 130. A periodic structure having an average pitch in the x-direction of about 929 microns is visible. FIG. 58 is a plot of the magnitude of the Fourier transform of the surface topography in the second region 130. FIG. 59 is a plot of the Fourier transform along the x-direction and FIG. 60 is a plot of the Fourier transform along the y-direction in the second region 130.

FIGS. 48A-60 show that the topological pattern of the comparative coil 4700 had a periodicity in the x-direction in the first region 125 and a periodicity in the y-direction in the second region 130. In each case, the topological pattern had a periodicity in the radial direction in the first and second regions and did not extend in a same direction in the two regions.

In some embodiments, a method of making a coil or antenna includes providing a rod, providing a film (e.g., a multilayer film including at least one electrically conductive layer and at least one electrically insulative thermally conductive layer, or any of the multilayer films described elsewhere herein), winding the film around the rod to form an assembly (e.g., including a plurality of consecutive turns, or substantially concentric loops, of the film substantially concentric with the rod), and cutting substantially laterally through the assembly to form the coil or antenna. For example, a segment of the assembly may be cut from the assembly and this segment includes the coil or antenna wrapped around a segment of the rod which can optionally be removed. The cutting step can create any of the regular patterns described elsewhere herein on one or both (e.g., by slicing through the assembly with parallel spaced apart diamond wires) of the opposing sides of the coil or antenna.

The rod may be extended along an axis and have a cross-section orthogonal to the axis that has any suitable shape (e.g., circle, oval, or rounded rectangle (e.g., corresponding to the rounded rectangular shape of the interior region of the coil 3300)). The rod may be composed of any suitable material. Suitable materials may include at least one of rigid polymers, crosslinked polymers, and epoxy. For example, the rod may include epoxy (e.g., the rod may be an epoxy rod).

FIGS. 61-64 schematically illustrate a method for making a coil or antenna of the present description.

Figure 61:
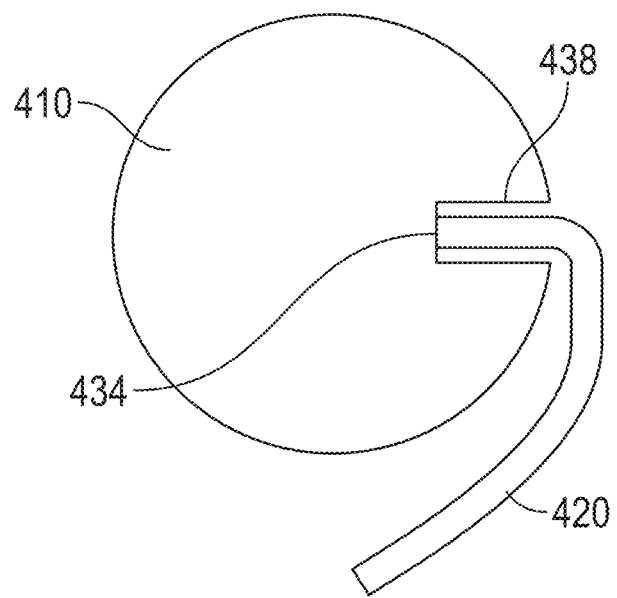
FIG. 61 is a schematic illustration of a multilayer film having an end inserted into a slit in a rod.
Figure 62:
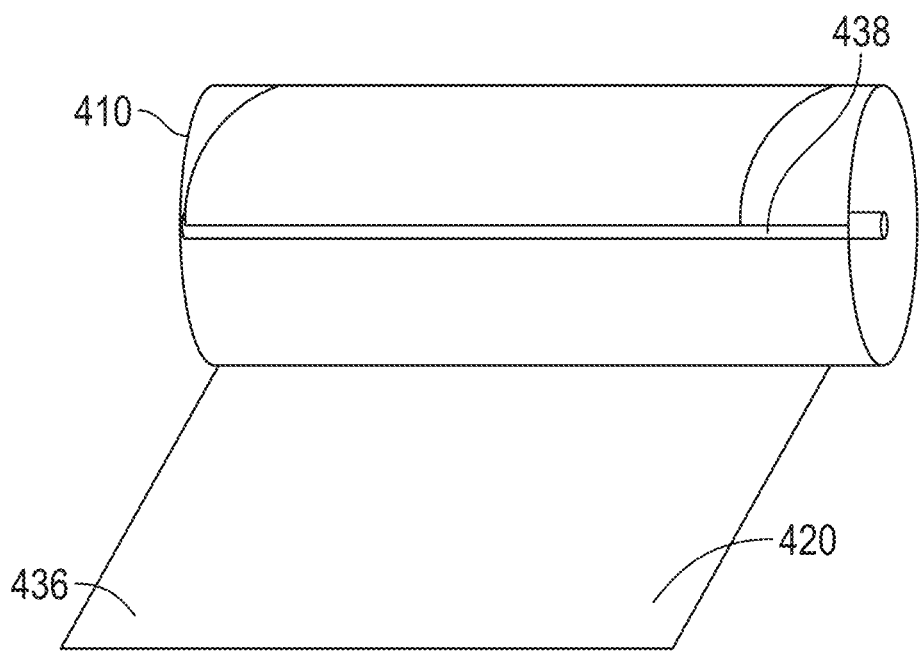
FIG. 62 is a schematic illustration of a multilayer film being wound around a rod.
Figure 63:
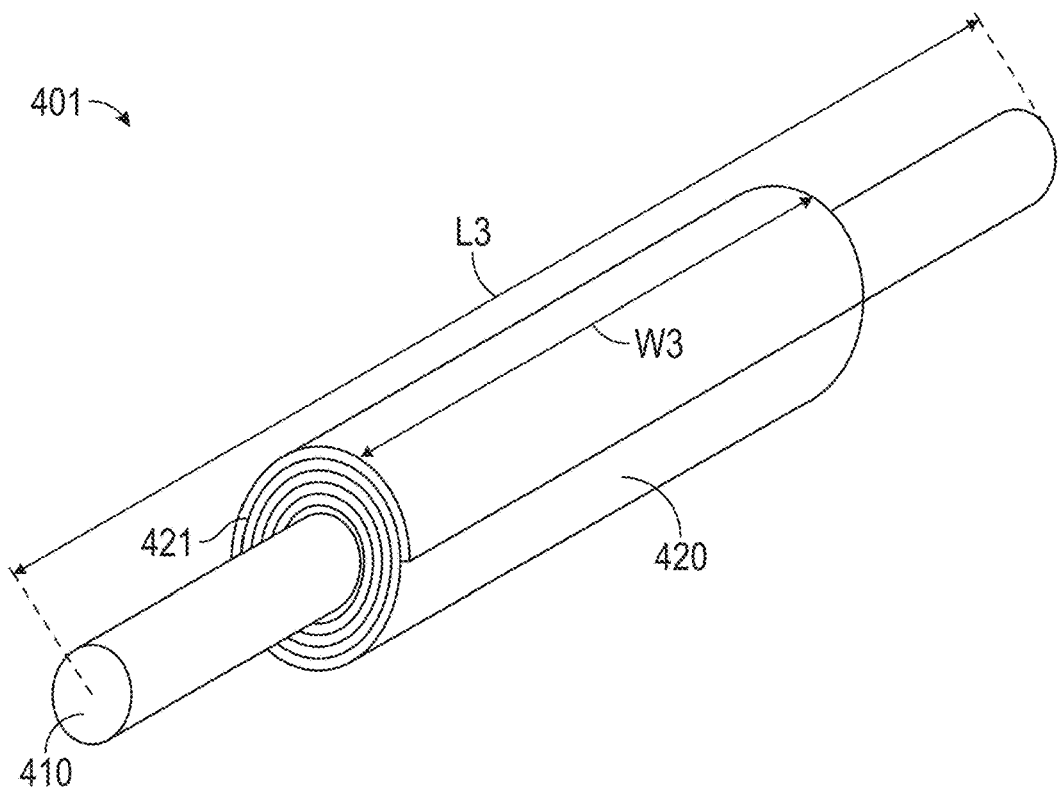
FIG. 63 is a schematic perspective view of an assembly.

A rod 410 and a film 420, which may be a multilayer film and/or a film having at least one electrically conductive layer and at least one electrically insulative thermally conductive layer, are provided. In some embodiments, the rod 410 includes a slit 438 for receiving an end 434 of the film 420. In some embodiments, the end 434 of the film 420 is placed into the slit 438 as schematically illustrated in FIG. 61 and the film 420 is wound around the rod 410 as schematically illustrated in FIG. 62 for a plurality of turns to form the assembly 401 schematically illustrated in FIG. 63. The film 420 can be wound around the rod 410 by turning the rod 410, for example. Tension can be provided along an edge 436 while turning the rod 410. The film 420 may correspond to any of the multilayer films described herein (e.g., multilayer film 202 or 402 or 502), for example. In some embodiments, the film 420 is a multilayer film including a metal first layer 10 and an electrically insulative thermally conductive second layer 20 disposed on and bonded to the metal first layer 10. In some embodiments, the film 420 includes a plurality of alternating metal 10 and first adhesive layers 30; and an electrically insulative thermally conductive second layer 20 disposed on and bonded to the plurality of alternating metal and first adhesive layers 10 and 30, for example. The film 420 can be wound around the rod 410 in either orientation. For example, in embodiments where the film 420 includes an electrically insulative thermally conductive layer 20 closer to one outermost major surface of the film 420 than to the other outermost major surface, the film 420 can be wound with the layer 20 facing towards or facing away from the rod 410.

In some embodiments, the film 420 is a multilayer film. In some embodiments, the assembly 401 includes a rod 410, and a multilayer film wound around the rod a plurality of consecutive turns substantially concentric with the rod 410. In some embodiments, a length L3 of the rod 410 is greater than a lateral width W3 of the multilayer film 420. In some embodiments, the rod 410 extends beyond at least one lateral edge 421 of the multilayer film 420.

Figure 64:
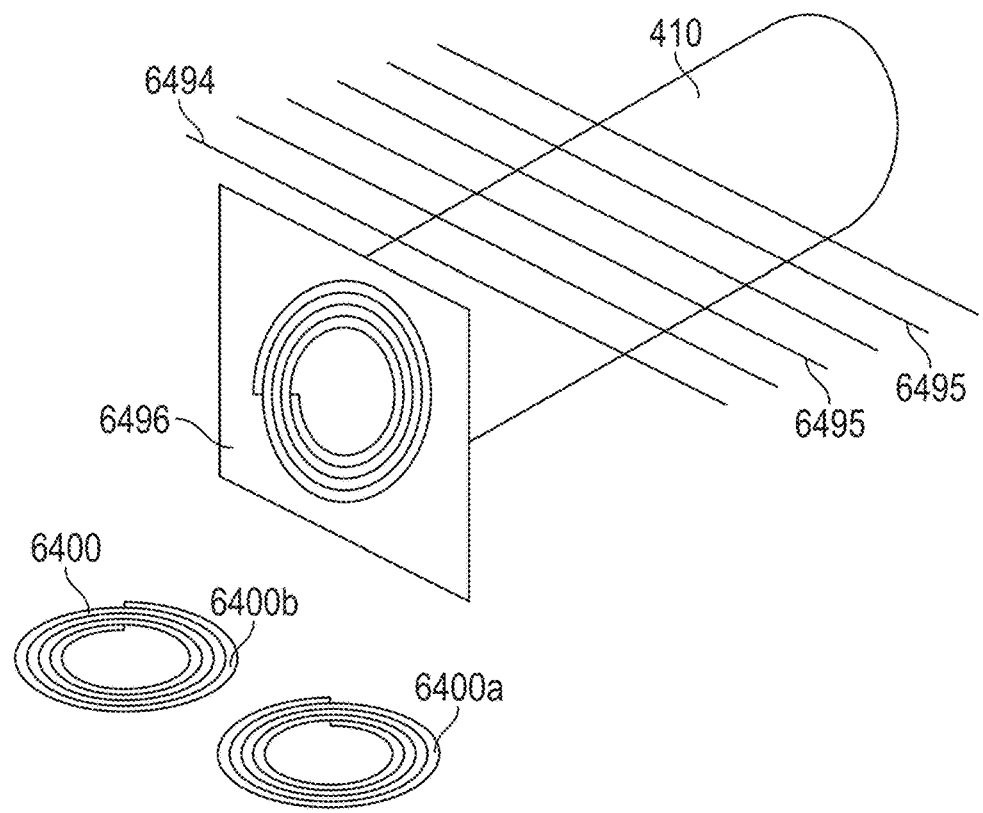
FIG. 64 is a schematic illustration of slicing an assembly to make one or more coils.

In some embodiments, the method further includes cutting the assembly 401 into sections having a desired width for a coil. FIG. 64 schematically illustrates cutting substantially laterally (e.g., in a plane 6496 having a normal making an angle with an axis of the rod of less than 45 degrees, or less than 30 degrees, or less than 20 degrees, or less than 10 degrees, or less than 5 degrees) through the assembly to form a separated portion of the assembly which includes a coil or antenna including a plurality of substantially concentric loops of a separated portion the multilayer film 420. In some embodiments, the separated portion has a substantially uniform width (e.g., variations in the width less than 20%, or less than 10%, or less than 5% of an average width). In some embodiments, the separated portion of the assembly has a substantially uniform width substantially equal (e.g., with 20%, or with 10%, or with 5%) to the widths of layers (e.g., first 10, second 20 and third 30 layers) of the film 420.

In some embodiments, a method of making a coil includes providing a rod 410; providing a multilayer film 420; winding the multilayer film around the rod to form an assembly 401 including the rod and a plurality of loops of the multilayer film substantially concentric with the rod; cutting substantially laterally through the assembly to form a separated portion 6400 of the assembly where the separated portion of the assembly includes the coil and the coil is or includes a plurality of substantially concentric loops of a separated portion the multilayer film. In some embodiments, winding the multilayer film around the rod 410 includes rotating the rod about an axis of the rod. In some embodiments, the separated portion of the assembly has opposite major surfaces and a substantially uniform (e.g., varying by less than 20%, or less than 10%, or less than 5%) width therebetween (e.g., the width W or W1 depicted in FIG. 1B). In some embodiments, the cutting step includes cutting or slicing substantially laterally through the assembly using a diamond wire saw. In some embodiments, cutting substantially laterally through the assembly includes using a plurality of spaced apart cutting wires to form a plurality of separated portions of the assembly where each separated portion of the assembly includes a coil in the plurality of coils and each coil includes a plurality of substantially concentric loops of a separated portion the multilayer film.

In some embodiments, the film 420 is a multilayer film corresponding to any multilayer film described elsewhere herein. For example, in some embodiments, the multilayer film 420 includes an electrically conductive first layer 10 and an electrically insulative thermally conductive second layer 20 disposed on the first layer. In some such embodiments, the first layer 10 is magnetically insulative and the second layer 20 is magnetically conductive. In some embodiments, the multilayer film further includes at least one electrically conductive third layer 17 disposed on the first layer 10. In some embodiments, the at least one third layer 17 is magnetically insulative. In some embodiments, a relative permeability of the second layer 20 is at least 10 times, or at least 100 times a relative permeability of the first layer 10.

In some embodiments, the multilayer film 420 includes a plurality of alternating electrically conductive 10 and first adhesive 30 layers and includes a second adhesive layer 41 including an outermost major surface 44 of the multilayer film. In some embodiments, the second adhesive layer 41 is thicker (e.g., at least by a factor of 2 or 4) than the first adhesive layer 30. In some embodiments, the second adhesive layer 41 includes a composite portion 20 and opposing first and second adhesive portions 40 and 42 disposed on opposite major surfaces of the composite portion 20. In some embodiments, the composite portion includes thermally conductive and/or magnetically conductive filler 43 dispersed in a binder.

In some embodiments, the film 420 is or includes an electrically conductive first layer 10. In some embodiments, the film 420 is a multilayer film including an electrically conductive first layer 10 and a second layer (e.g., 20 or 30 or 40 or 41 or 42) disposed on and bonded to the first layer.

In some embodiments, prior to winding the multilayer film, the multilayer film includes an uncured partially cured first adhesive layer (e.g., 30 or 40 or 41 or 42) bonding the second layer to the first layer. In some embodiments, prior to winding the multilayer film, the multilayer film includes an uncured or partially cured second adhesive layer (e.g., 41 or 42) that includes an outermost major surface 44 of the multilayer film. In some embodiments, the step of winding the multilayer film includes bonding adjacent loops in the plurality of loops through the second adhesive layer. In some embodiments, the method includes fully curing the first and second adhesive layers. For example, the first and second adhesive layers may be thermoset adhesive layers (e.g., thermoset epoxy) which can be thermally cured. In some embodiments, the fully curing step is carried out after the winding step and before the cutting step. In some embodiments, the fully curing step is carried out after the winding and cutting steps.

In some embodiments, the cutting or slicing step creates an edge surface 111 of each loop 110 of the separated portion of the multilayer film where the edge surface includes a regular pattern 120. In some embodiments, the cutting step creates opposing edge surfaces of each loop of the separated portion of the multilayer film where each of the opposing edge surface includes a regular pattern (e.g., 120 and 120b, respectively). In some embodiments, a method of making a coil includes providing an assembly 401 including a rod 410 and a film 420 wound around a plurality of consecutive turns substantially concentric with the rod 410 where the film includes an electrically conductive first layer 10 and an electrically insulative thermally conductive second layer 20; and slicing substantially laterally through the assembly using at least one cutting wire to form a separated portion of the assembly where the separated portion of the assembly includes the coil, the coil includes a plurality of substantially concentric loops of a separated portion the film 420, and the slicing step creates a first edge surface 111 of each loop 110 of the separated portion of the film including a first regular pattern 120. In some embodiments, the first regular pattern 120 extends substantially along a same first direction and across substantially the entire coil. In some embodiments, the slicing step creates opposing first and second edge surfaces 111 and 111b of each loop of the separated portion of the film including respective first and second regular patterns 120 and 120b. In some embodiments, each of the first and second regular patterns 120 and 120b extend substantially along a same first direction and across substantially the entire coil.

The regular pattern 120 and/or 120b can be any regular pattern described elsewhere herein for the coils or antennas of the present description. For example: In some embodiments, the regular pattern extends substantially along a same first direction and across substantially the entire coil. In some embodiments, the regular pattern extends along a first direction making an angle θ with a longitudinal direction of the loop where θ varies along the longitudinal direction of the loop. In some embodiments, the regular patterns of the edge surfaces of at least a plurality of adjacent loops of the separated portion of the multilayer film are substantially aligned with each other. In some embodiments, the regular pattern includes a pattern of substantially parallel grooves extending across at least a plurality of adjacent loops of the separated portion of the multilayer film. In some embodiments, the regular pattern has a first average pitch in a first region of the coil and a different second average pitch in a different second region of the coil. In some embodiments, a Fourier transform of the regular pattern has a peak at a first spatial frequency in a first region of the coil and a peak at a different second spatial frequency in a different second region of the coil. In some embodiments, in at least one first region of the coil, the coil includes a regular optical and topographical pattern along a first direction, and a regular optical, but not topographical, pattern along an orthogonal second direction.

In some embodiments, a method includes the step of providing the assembly 401. In some embodiments, the step of providing the assembly 401 includes providing the rod 410, providing the film 420, and winding the film 420 around the rod 410 to form the assembly 401. The method can further include inserting the end 434 of the film 420 into the slit 438 prior to winding the film 420, and/or can further include heating the assembly to cure any uncured or partially cured adhesive layers.

In some embodiments, a wire saw 6494 is used to cut or slice through the assembly 401. In some embodiments, the wire saw 6494 includes a plurality of spaced apart cutting wires 6495 to form a plurality of separated portions (6400a and 6400b) of the assembly 401. In some embodiments, each separated portion includes a coil in the plurality of coils, and each coil includes a plurality of substantially concentric loops of a separated portion the film 420 (e.g., a multilayer film). In some embodiments, each separated portion of the assembly has a substantially uniform width. In some embodiments, the film 420 of the assembly 401 includes an electrically conductive first layer 10 and an electrically insulative thermally conductive second layer 20. In some embodiments, each separated portion of the assembly includes a plurality of substantially concentric loops of a corresponding separated portion the film.

Figure 65:
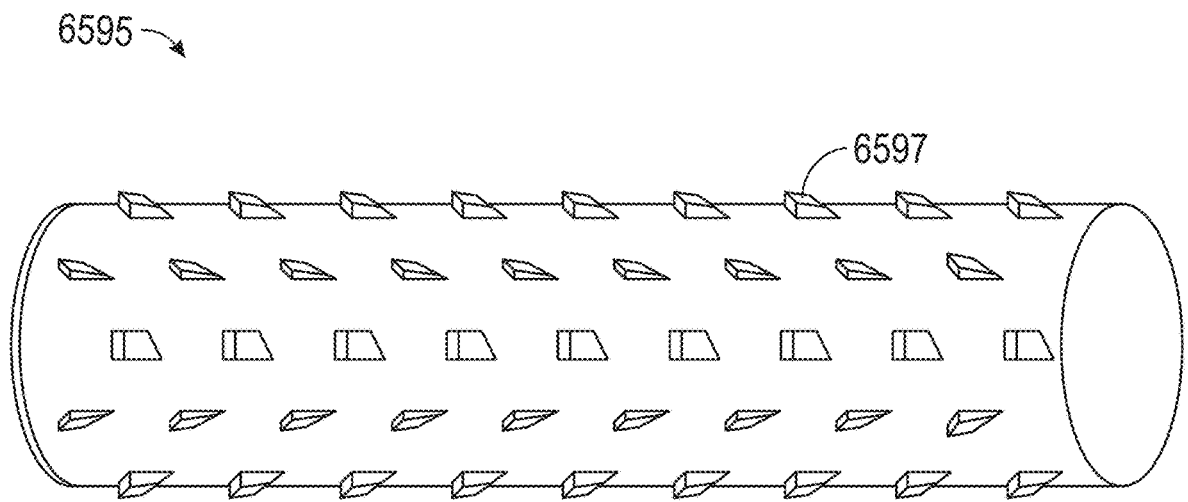
FIG. 65 is a schematic side perspective view of a diamond wire.

In some embodiments, the cutting wire(s) used to slice through the assembly is/are diamond wire(s). Diamond cutting wires can include a wire impregnated with diamond dust and have been used for slicing ceramics, for example. FIG. 65 is a schematic illustration of a diamond wire 6595 including diamond particles 6597. Suitable diamond wire saws are available from Crystal Systems Innovations (Salem, MA), for example.

Figure 66:
FIG. 66 is a schematic side view of a transceiver.

The coils or antennas of the present description can be used for the transfer of information (e.g., digital or analogue data) or energy (e.g., for wireless recharging). FIG. 66 is a schematic side view of a transceiver 303 including a coil or antenna 6100 and a first power source 6310 to energize the coil or antenna 6100. The coil or antenna 6100 can be any coil or any antenna of the present description.

EXAMPLES

Coils were made from films including a copper layer and an adhesive layer or stack using the process generally described in FIG. 64. The adhesive layer/stack included a center layer including a thermally conductive filler in an epoxy and in some cases an unfilled epoxy on each side of the center layer. The adhesive layer/stack had a total thickness of 100 micrometers. For comparison, a commercially available flexible printed circuit board coil including double layers of 50 micrometer thick copper was also tested (Comparative Example C1). The results are summarized in the following table. The number of turns of the coil is denoted N in the table. The adhesive stack refers to the center layer (filled epoxy) and unfilled epoxy layers on each side of the center layer (denoted Epoxy 1 and Epoxy 2 in the table below). The maximum temperature was measured for each sample after suppling current through the coil that resulted in a power consumption of 1.7 watts.

| Coil | Copper Thickness | Epoxy 1 | Center layer thickness/ filler | Epoxy 2 | N | Thermal Conductivity (W/(m·K)) Center layer/ Adhesive Stack | Max Temp (° C.) |
|---|---|---|---|---|---|---|---|
| C1 | 50 μm double layers | | | | 14 | | 54.0 |
| 1 | 125 μm | | 100 μm/ Al$_2$O$_3$ | | 11 | | 49.2 |
| 2 | 125 μm | 20 μm | 60 μm/ Al$_2$O$_3$ | 20 μm | 11 | 1.3/0.45 | 49.1 |
| 3 | 125 μm | 20 μm | 60 μm/ Sendust | 20 μm | 11 | 0.91/0.27 | 49.7 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" can be understood to mean within 10 percent of the specified quantity, but also includes exactly the specified quantity. For example, if it is not otherwise clear to one of ordinary skill in the art in the context in which it is used and described in the present description, a quantity having a value of about 1, means that the quantity has a value between 0.9 and 1.1, but also includes a value of exactly 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An antenna for transfer of information or energy, comprising:
    an electrically conductive first layer having a width in a thickness direction of the antenna and extending longitudinally along a length of the first layer between first and second longitudinal ends of the first layer; and
    an electrically insulative thermally conductive second layer bonded to the first layer along the length of the first layer, the first and second layers wound to form a plurality of substantially concentric loops, a width and a length of the second layer substantially co-extensive with the respective width and length of the first layer so as to expose opposing longitudinal edge surfaces of each of the first and second layers along the length of the first layer.

2. The antenna of claim 1, wherein the electrically insulative thermally conductive second layer comprises powders of one or more of an Fe—Al—Si alloy, an Fe—Ni alloy, a cobalt alloy, boron nitride, aluminum nitride, Fe—Si—Cr, a crystalline, nanocrystalline or amorphous alloy, and alumina.

3. The antenna of claim 2, wherein the crystalline, nanocrystalline or amorphous alloy comprises iron and at least one of silicon, aluminum, boron, niobium, copper, cobalt, nickel, and molybdenum.

4. The antenna of claim 1, wherein at least one of the opposing longitudinal edge surfaces of the first layer comprises a regular pattern extending substantially laterally across the edge surface, the regular patterns of the edge surfaces of at least a plurality of adjacent loops in the plurality of substantially concentric loops being substantially aligned with each other.

5. A coil comprising a multilayer film wound to form a plurality of substantially concentric loops, the multilayer film comprising:
    an electrically conductive first layer;
    an electrically insulative thermally conductive second layer bonded to the first layer, the first and second layers substantially co-extensive with each other in width and length so that opposing longitudinal edge surfaces of the first layer are not covered by the second layer.

6. A coil comprising a plurality of substantially concentric loops, each loop comprising a metal layer substantially concentric with an electrically insulative thermally conductive layer and an adhesive layer, the metal layer, the thermally conductive layer and the adhesive layer substantially co-extensive with each other in width and length, wherein in a plan view, the coil comprises a regular pattern of substantially parallel grooves extending across at least a plurality of adjacent loops in the plurality of substantially concentric loops.

7. The antenna of claim 1, wherein the electrically insulative thermally conductive second layer has a thermal conductivity of at least about 0.2 W/(m·K).

8. The antenna of claim 2, wherein the powders are dispersed in an epoxy.

9. The coil of claim 5, wherein the multilayer film further comprises an electrically conductive third layer bonded to the first layer, the first and third layers substantially co-extensive with each other in width and length so that opposing longitudinal edge surfaces of the first layer are not covered by the third layer.

10. The antenna of claim 1, wherein the first and second layers are wound around a rod.

11. The antenna of claim 1, wherein each of the first and second layers has opposing first surfaces substantially perpendicular to a radial direction of the antenna, and opposing second surfaces substantially parallel to the radial direction of the antenna,
    such that for each loop, the corresponding second surfaces of the first and second layers are substantially co-planar.

* * * * *